US011703569B2

(12) United States Patent
Hall et al.

(10) Patent No.: US 11,703,569 B2
(45) Date of Patent: *Jul. 18, 2023

(54) LIDAR DATA ACQUISITION AND CONTROL

(71) Applicant: VELODYNE LIDAR USA, INC., San Jose, CA (US)

(72) Inventors: David S. Hall, Oakland, CA (US); Raymond Liou, Cupertino, CA (US); Oren Milgrome, Richmond, CA (US); Anand Gopalan, Foster City, CA (US); Pravin Kumar Venkatesan, Fremont, CA (US)

(73) Assignee: VELODYNE LIDAR USA, INC., San Jose, CA (US)

( * ) Notice: Subject to any disclaimer, the term of this patent is extended or adjusted under 35 U.S.C. 154(b) by 334 days.

This patent is subject to a terminal disclaimer.

(21) Appl. No.: 16/748,498

(22) Filed: Jan. 21, 2020

(65) Prior Publication Data

US 2020/0166613 A1     May 28, 2020

Related U.S. Application Data

(63) Continuation of application No. 15/974,527, filed on May 8, 2018, now Pat. No. 10,545,222.

(Continued)

(51) Int. Cl.
*G01S 7/481* (2006.01)
*G01S 7/4865* (2020.01)
(Continued)

(52) U.S. Cl.
CPC ........... *G01S 7/4811* (2013.01); *G01S 7/4865* (2013.01); *G01S 7/4876* (2013.01); *G01S 17/10* (2013.01); *G01S 17/42* (2013.01)

(58) Field of Classification Search
CPC .... G01S 7/4811; G01S 7/4861; G01S 7/4865; G01S 7/487; G01S 17/10; G01S 17/105
See application file for complete search history.

(56) References Cited

U.S. PATENT DOCUMENTS 3,064,252 A   11/1962   Varela
3,373,441 A    3/1968   Zadig
(Continued)

FOREIGN PATENT DOCUMENTS

CA    2089105 A1    8/1994
CH     641583 A5    2/1984
(Continued)

OTHER PUBLICATIONS

U.S. Appl. No. 16/931,218, filed Jul. 16, 2020, Hall et al.
(Continued)

*Primary Examiner* — Eric L Bolda
(74) *Attorney, Agent, or Firm* — Goodwin Procter LLP

(57) ABSTRACT

Methods and systems for performing three dimensional LIDAR measurements with an integrated LIDAR measurement device are described herein. In one aspect, a return signal receiver generates a pulse trigger signal that triggers the generation of a pulse of illumination light and data acquisition of a return signal, and also triggers the time of flight calculation by time to digital conversion. In addition, the return signal receiver also estimates the width and peak amplitude of each return pulse, and samples each return pulse waveform individually over a sampling window that includes the peak amplitude of each return pulse waveform. In a further aspect, the time of flight associated with each return pulse is estimated based on a coarse timing estimate and a fine timing estimate. In another aspect, the time of flight is measured from the measured pulse due to internal optical crosstalk and a valid return pulse.

24 Claims, 12 Drawing Sheets

Related U.S. Application Data

(60) Provisional application No. 62/503,237, filed on May 8, 2017.

(51) Int. Cl.
  *G01S 7/487* (2006.01)
  *G01S 17/10* (2020.01)
  *G01S 17/42* (2006.01)

(56) References Cited

U.S. PATENT DOCUMENTS

| | | | |
|---|---|---|---|
| 3,551,845 A | 12/1970 | Zelina | |
| 3,636,250 A | 1/1972 | Haeff | |
| 3,686,514 A | 8/1972 | Dube et al. | |
| 3,730,633 A | 5/1973 | Kennedy | |
| 3,781,111 A | 12/1973 | Fletcher et al. | |
| 3,862,415 A | 1/1975 | Harnden, Jr. et al. | |
| 3,897,150 A | 7/1975 | Bridges et al. | |
| 3,921,081 A | 11/1975 | Lane | |
| 4,179,216 A | 12/1979 | Theurer et al. | |
| 4,199,697 A | 4/1980 | Edwards | |
| 4,201,442 A | 5/1980 | McMahon et al. | |
| 4,212,534 A | 7/1980 | Bodlaj | |
| 4,220,103 A | 9/1980 | Kasahara et al. | |
| 4,477,184 A | 10/1984 | Endo | |
| 4,516,837 A | 5/1985 | Soref et al. | |
| 4,634,272 A | 1/1987 | Endo | |
| 4,656,462 A | 4/1987 | Araki et al. | |
| 4,681,433 A | 7/1987 | Aeschlimann | |
| 4,700,301 A | 10/1987 | Dyke | |
| 4,730,932 A | 3/1988 | Iga et al. | |
| 4,742,337 A | 5/1988 | Haag | |
| 4,834,531 A | 5/1989 | Ward | |
| 4,862,257 A | 8/1989 | Ulich | |
| 4,895,440 A | 1/1990 | Cain et al. | |
| 4,896,343 A | 1/1990 | Saunders | |
| 4,902,126 A | 2/1990 | Koechner | |
| 4,916,536 A | 4/1990 | Kerr et al. | |
| 4,944,036 A | 7/1990 | Hyatt | |
| 4,952,911 A | 8/1990 | D'Ambrosia et al. | |
| 4,967,183 A | 10/1990 | D'Ambrosia et al. | |
| 5,004,916 A | 4/1991 | Collins, Jr. | |
| 5,006,721 A | 4/1991 | Cameron et al. | |
| 5,023,888 A | 6/1991 | Bayston | |
| 5,026,156 A | 6/1991 | Bayston et al. | |
| 5,033,819 A | 7/1991 | Tanaka | |
| 5,059,008 A | 10/1991 | Flood et al. | |
| 5,175,694 A | 12/1992 | Amato | |
| 5,177,768 A | 1/1993 | Crespo et al. | |
| 5,210,586 A | 5/1993 | Grage et al. | |
| 5,212,533 A | 5/1993 | Shibuya et al. | |
| 5,241,315 A | 8/1993 | Spinhirne | |
| 5,241,481 A | 8/1993 | Olsen | |
| 5,249,157 A | 9/1993 | Taylor | |
| 5,291,261 A | 3/1994 | Dahl et al. | |
| 5,309,212 A | 5/1994 | Clark | |
| 5,314,037 A | 5/1994 | Shaw et al. | |
| 5,319,201 A | 6/1994 | Lee | |
| 5,357,331 A | 10/1994 | Flockencier | |
| 5,365,218 A | 11/1994 | Otto | |
| 5,463,384 A | 10/1995 | Juds | |
| 5,465,142 A | 11/1995 | Krumes et al. | |
| 5,515,156 A | 5/1996 | Yoshida et al. | |
| 5,546,188 A | 8/1996 | Wangler et al. | |
| 5,563,706 A | 10/1996 | Shibuya et al. | |
| 5,572,219 A | 11/1996 | Silverstein et al. | |
| 5,691,687 A | 11/1997 | Kumagai et al. | |
| 5,710,417 A | 1/1998 | Joseph et al. | |
| 5,742,384 A | 4/1998 | Farmer | |
| 5,745,050 A | 4/1998 | Nakagawa | |
| 5,757,472 A | 5/1998 | Wangler et al. | |
| 5,757,501 A | 5/1998 | Hipp | |
| 5,757,677 A | 5/1998 | Lennen | |
| 5,789,739 A | 8/1998 | Schwarz | |
| 5,793,163 A | 8/1998 | Okuda | |
| 5,793,491 A | 8/1998 | Wangler et al. | |
| 5,805,468 A | 9/1998 | Blohbaum | |
| 5,808,728 A | 9/1998 | Uehara | |
| 5,847,815 A | 12/1998 | Albouy et al. | |
| 5,847,817 A | 12/1998 | Zediker et al. | |
| 5,877,688 A | 3/1999 | Morinaka et al. | |
| 5,889,479 A | 3/1999 | Tabel | |
| 5,895,984 A | 4/1999 | Renz | |
| 5,903,355 A | 5/1999 | Schwarz | |
| 5,903,386 A | 5/1999 | Mantravadi et al. | |
| 5,923,910 A | 7/1999 | Nakahara et al. | |
| 5,942,688 A | 8/1999 | Kimura et al. | |
| 5,949,530 A | 9/1999 | Wetteborn | |
| 5,953,110 A | 9/1999 | Burns | |
| 5,991,011 A | 11/1999 | Damm | |
| 6,034,803 A | 3/2000 | Sullivan et al. | |
| 6,043,868 A | 3/2000 | Dunne | |
| 6,069,565 A | 5/2000 | Stern et al. | |
| 6,088,085 A | 7/2000 | Wetteborn | |
| 6,091,071 A | 7/2000 | Franz et al. | |
| 6,100,539 A | 8/2000 | Blumcke et al. | |
| 6,137,566 A | 10/2000 | Leonard et al. | |
| 6,153,878 A | 11/2000 | Jakob et al. | |
| 6,157,294 A | 12/2000 | Urai et al. | |
| 6,201,236 B1 | 3/2001 | Juds | |
| 6,259,714 B1 | 7/2001 | Kinbara | |
| 6,297,844 B1 | 10/2001 | Schatz et al. | |
| 6,321,172 B1 | 11/2001 | Jakob et al. | |
| 6,327,806 B1 | 12/2001 | Paige | |
| 6,329,800 B1 | 12/2001 | May | |
| 6,335,789 B1 | 1/2002 | Kikuchi | |
| 6,365,429 B1 | 4/2002 | Kneissl et al. | |
| 6,396,577 B1 | 5/2002 | Ramstack | |
| 6,420,698 B1 | 7/2002 | Dimsdale | |
| 6,441,363 B1 | 8/2002 | Cook, Jr. et al. | |
| 6,441,889 B1 | 8/2002 | Patterson | |
| 6,442,476 B1 | 8/2002 | Poropat | |
| 6,473,079 B1 | 10/2002 | Kacyra et al. | |
| 6,504,712 B2 | 1/2003 | Hashimoto et al. | |
| 6,509,958 B2 | 1/2003 | Pierenkemper | |
| 6,593,582 B2 | 7/2003 | Lee et al. | |
| 6,621,764 B1 | 9/2003 | Smith | |
| 6,636,300 B2 | 10/2003 | Doemens et al. | |
| 6,646,725 B1 | 11/2003 | Eichinger et al. | |
| 6,650,402 B2 | 11/2003 | Sullivan et al. | |
| 6,664,529 B2 | 12/2003 | Pack et al. | |
| 6,665,063 B2 | 12/2003 | Jamieson et al. | |
| 6,670,905 B1 | 12/2003 | Orr | |
| 6,682,478 B2 | 1/2004 | Nakamura | |
| 6,687,033 B2 | 2/2004 | Pierenkemper | |
| 6,687,373 B1 | 2/2004 | Yeh et al. | |
| 6,710,324 B2 | 3/2004 | Hipp | |
| 6,742,707 B1 | 6/2004 | Tsikos et al. | |
| 6,747,747 B2 | 6/2004 | Hipp | |
| 6,759,649 B2 | 7/2004 | Hipp | |
| 6,789,527 B2 | 9/2004 | Sauler et al. | |
| 6,798,527 B2 | 9/2004 | Fukumoto et al. | |
| 6,812,450 B2 | 11/2004 | Hipp | |
| 6,876,790 B2 | 4/2005 | Lee | |
| 6,879,419 B2 | 4/2005 | Richman et al. | |
| 6,969,558 B2 | 11/2005 | Walston et al. | |
| 7,030,968 B2 | 4/2006 | D'Aligny et al. | |
| 7,041,962 B2 | 5/2006 | Dollmann et al. | |
| 7,089,114 B1 | 8/2006 | Huang | |
| 7,106,424 B2 | 9/2006 | Meneely et al. | |
| 7,129,971 B2 | 10/2006 | McCutchen | |
| 7,130,672 B2 | 10/2006 | Pewzner et al. | |
| 7,131,586 B2 | 11/2006 | Tsikos et al. | |
| 7,190,465 B2 | 3/2007 | Froehlich et al. | |
| 7,240,314 B1 | 7/2007 | Leung | |
| 7,248,342 B1 | 7/2007 | Degnan | |
| 7,281,891 B2 | 10/2007 | Smith et al. | |
| 7,295,298 B2 | 11/2007 | Willhoeft et al. | |
| 7,313,424 B2 | 12/2007 | Mayevsky et al. | |
| 7,315,377 B2 | 1/2008 | Holland et al. | |
| 7,319,777 B2 | 1/2008 | Morcom | |
| 7,345,271 B2 | 3/2008 | Boehlau et al. | |
| 7,358,819 B2 | 4/2008 | Rollins | |
| 7,373,473 B2 | 5/2008 | Bukowski et al. | |

(56) References Cited

U.S. PATENT DOCUMENTS

| | | |
|---|---|---|
| 7,388,655 B2 | 6/2008 | Mori |
| 7,408,462 B2 | 8/2008 | Pirkl et al. |
| 7,477,360 B2 | 1/2009 | England et al. |
| 7,480,031 B2 | 1/2009 | Mack |
| 7,544,945 B2 | 6/2009 | Tan et al. |
| 7,570,793 B2 | 8/2009 | Lages et al. |
| 7,583,364 B1 | 9/2009 | Mayor et al. |
| 7,589,826 B2 | 9/2009 | MacK et al. |
| 7,619,477 B2 | 11/2009 | Segarra |
| 7,623,222 B2 | 11/2009 | Benz et al. |
| 7,640,068 B2 | 12/2009 | Johnson et al. |
| 7,642,946 B2 | 1/2010 | Wong et al. |
| 7,684,590 B2 | 3/2010 | Kampchen et al. |
| 7,697,581 B2 | 4/2010 | Walsh et al. |
| 7,741,618 B2 | 6/2010 | Lee et al. |
| 7,746,271 B2 | 6/2010 | Furstenberg |
| 7,868,665 B2 | 1/2011 | Tumer et al. |
| 7,944,548 B2 | 5/2011 | Eaton |
| 7,969,558 B2 | 6/2011 | Hall |
| 8,031,331 B2 | 10/2011 | Meier et al. |
| 8,042,056 B2 | 10/2011 | Wheeler et al. |
| 8,072,582 B2 | 12/2011 | Meneely |
| 8,077,047 B2 | 12/2011 | Humble et al. |
| 8,107,056 B1 | 1/2012 | Riza |
| 8,139,685 B2 | 3/2012 | Simic et al. |
| 8,203,702 B1 | 6/2012 | Kane et al. |
| 8,274,037 B2 | 9/2012 | Ritter et al. |
| 8,310,653 B2 | 11/2012 | Ogawa et al. |
| 8,451,432 B2 | 5/2013 | Crawford et al. |
| 8,605,262 B2 | 12/2013 | Campbell et al. |
| 8,675,181 B2 | 3/2014 | Hall |
| 8,736,818 B2 | 5/2014 | Weimer et al. |
| 8,767,190 B2 | 7/2014 | Hall |
| 8,875,409 B2 | 11/2014 | Kretschmer et al. |
| 8,976,340 B2 | 3/2015 | Gilliland et al. |
| 8,995,478 B1 | 3/2015 | Kobtsev et al. |
| 9,059,562 B2 | 6/2015 | Priest et al. |
| 9,063,549 B1 | 6/2015 | Pennecot et al. |
| 9,069,061 B1 | 6/2015 | Harwit |
| 9,069,080 B2 | 6/2015 | Stettner et al. |
| 9,086,273 B1 | 7/2015 | Gruver et al. |
| 9,093,969 B2 | 7/2015 | Gebeyehu et al. |
| 9,110,154 B1 | 8/2015 | Bates et al. |
| 9,128,190 B1 | 9/2015 | Ulrich et al. |
| 9,151,940 B2 | 10/2015 | Chuang et al. |
| 9,191,260 B1 | 11/2015 | Grund |
| 9,194,701 B2 | 11/2015 | Bosch |
| RE45,854 E | 1/2016 | Gittinger et al. |
| 9,239,959 B1 | 1/2016 | Evans et al. |
| 9,246,041 B1 | 1/2016 | Clausen et al. |
| 9,250,327 B2 | 2/2016 | Kelley et al. |
| 9,285,477 B1 | 3/2016 | Smith et al. |
| 9,286,538 B1 | 3/2016 | Chen et al. |
| 9,310,197 B2 | 4/2016 | Gogolla et al. |
| 9,383,753 B1 | 7/2016 | Templeton et al. |
| 9,453,914 B2 | 9/2016 | Stettner et al. |
| 9,529,079 B1 | 12/2016 | Droz et al. |
| 9,634,156 B2 | 4/2017 | Pavlov et al. |
| 9,735,885 B1 | 8/2017 | Sayyah et al. |
| 9,772,607 B2 | 9/2017 | Decoux et al. |
| 9,778,362 B2 | 10/2017 | Rondeau et al. |
| RE46,672 E | 1/2018 | Hall |
| 9,964,632 B1 | 5/2018 | Droz et al. |
| 9,983,297 B2 | 5/2018 | Hall et al. |
| 9,989,629 B1 | 6/2018 | LaChapelle |
| 10,003,168 B1 | 6/2018 | Villeneuve |
| 10,018,726 B2 | 7/2018 | Hall et al. |
| 10,048,374 B2 | 8/2018 | Hall et al. |
| 10,094,925 B1 | 10/2018 | Lachapelle |
| 10,109,183 B1 | 10/2018 | Franz et al. |
| 10,120,079 B2 | 11/2018 | Pennecot et al. |
| 10,126,412 B2 | 11/2018 | Eldada et al. |
| 10,132,928 B2 | 11/2018 | Eldada et al. |
| 10,244,187 B2 | 3/2019 | Stettner et al. |
| 10,309,213 B2 | 6/2019 | Barfoot et al. |
| 10,330,780 B2 | 6/2019 | Hall et al. |
| 10,386,465 B2 | 8/2019 | Hall et al. |
| 10,393,874 B2 | 8/2019 | Schmidtke et al. |
| 10,393,877 B2 | 8/2019 | Hall et al. |
| 10,436,904 B2 | 10/2019 | Moss et al. |
| 10,545,222 B2 * | 1/2020 | Hall ............... G01S 7/4865 |
| RE47,942 E | 4/2020 | Hall |
| 10,613,203 B1 | 4/2020 | Rekow et al. |
| 10,627,490 B2 | 4/2020 | Hall et al. |
| 10,627,491 B2 | 4/2020 | Hall et al. |
| 10,712,434 B2 | 7/2020 | Hall et al. |
| 10,754,034 B1 | 8/2020 | Chamberlain et al. |
| 10,782,392 B2 | 9/2020 | Ishikawa et al. |
| 10,983,218 B2 | 4/2021 | Hall et al. |
| 11,073,617 B2 | 7/2021 | Hall et al. |
| 11,137,480 B2 | 10/2021 | Hall et al. |
| 2001/0011289 A1 | 8/2001 | Davis et al. |
| 2001/0017718 A1 | 8/2001 | Ikeda et al. |
| 2001/0035946 A1 | 11/2001 | Nakase et al. |
| 2002/0003617 A1 | 1/2002 | Doemens et al. |
| 2002/0060784 A1 | 5/2002 | Pack et al. |
| 2002/0109074 A1 | 8/2002 | Uchida |
| 2002/0117545 A1 | 8/2002 | Tsikos et al. |
| 2002/0175294 A1 | 11/2002 | Lee et al. |
| 2003/0041079 A1 | 2/2003 | Bellemore et al. |
| 2003/0043363 A1 | 3/2003 | Jamieson et al. |
| 2003/0043364 A1 | 3/2003 | Jamieson et al. |
| 2003/0057533 A1 | 3/2003 | Lemmi et al. |
| 2003/0066977 A1 | 4/2003 | Hipp et al. |
| 2003/0076485 A1 | 4/2003 | Ruff et al. |
| 2003/0090646 A1 | 5/2003 | Riegl et al. |
| 2003/0163030 A1 | 8/2003 | Arriaga |
| 2004/0021852 A1 | 2/2004 | DeFlumere |
| 2004/0066500 A1 | 4/2004 | Gokturk et al. |
| 2004/0134879 A1 | 7/2004 | Kochergin et al. |
| 2004/0150810 A1 | 8/2004 | Muenter et al. |
| 2004/0213463 A1 | 10/2004 | Morrison |
| 2004/0240706 A1 | 12/2004 | Wallace et al. |
| 2004/0240710 A1 | 12/2004 | Lages et al. |
| 2004/0247157 A1 | 12/2004 | Lages et al. |
| 2005/0023353 A1 | 2/2005 | Tsikos et al. |
| 2005/0168720 A1 | 8/2005 | Yamashita et al. |
| 2005/0211893 A1 | 9/2005 | Paschalidis |
| 2005/0232466 A1 | 10/2005 | Kampchen et al. |
| 2005/0246065 A1 | 11/2005 | Ricard |
| 2005/0248749 A1 | 11/2005 | Kiehn et al. |
| 2005/0279914 A1 | 12/2005 | Dimsdale et al. |
| 2006/0007350 A1 | 1/2006 | Gao et al. |
| 2006/0073621 A1 | 4/2006 | Kneissel et al. |
| 2006/0089765 A1 | 4/2006 | Pack et al. |
| 2006/0100783 A1 | 5/2006 | Haberer et al. |
| 2006/0115113 A1 | 6/2006 | Lages et al. |
| 2006/0132635 A1 | 6/2006 | Land |
| 2006/0176697 A1 | 8/2006 | Arruda |
| 2006/0186326 A1 | 8/2006 | Ito |
| 2006/0197867 A1 | 9/2006 | Johnson et al. |
| 2006/0231771 A1 | 10/2006 | Lee et al. |
| 2006/0290920 A1 | 12/2006 | Kampchen et al. |
| 2007/0024956 A1 | 2/2007 | Coyle |
| 2007/0035624 A1 | 2/2007 | Lubard et al. |
| 2007/0071056 A1 | 3/2007 | Chen |
| 2007/0121095 A1 | 5/2007 | Lewis |
| 2007/0181810 A1 | 8/2007 | Tan et al. |
| 2007/0201027 A1 | 8/2007 | Doushkina et al. |
| 2007/0219720 A1 | 9/2007 | Trepagnier et al. |
| 2007/0241955 A1 | 10/2007 | Brosche |
| 2007/0272841 A1 | 11/2007 | Wiklof |
| 2008/0002176 A1 | 1/2008 | Krasutsky |
| 2008/0013896 A1 | 1/2008 | Salzberg et al. |
| 2008/0074640 A1 | 3/2008 | Walsh et al. |
| 2008/0079371 A1 | 4/2008 | Kang et al. |
| 2008/0154495 A1 | 6/2008 | Breed |
| 2008/0170826 A1 | 7/2008 | Schaafsma |
| 2008/0186501 A1 | 8/2008 | Xie |
| 2008/0258695 A1 | 10/2008 | Kumar et al. |
| 2008/0302971 A1 | 12/2008 | Hyde et al. |
| 2009/0010644 A1 | 1/2009 | Varshneya et al. |
| 2009/0026503 A1 | 1/2009 | Tsuda |
| 2009/0045359 A1 | 2/2009 | Kumahara et al. |

(56) References Cited

U.S. PATENT DOCUMENTS

| | | |
|---|---|---|
| 2009/0085901 A1 | 4/2009 | Antony |
| 2009/0122295 A1 | 5/2009 | Eaton |
| 2009/0142053 A1 | 6/2009 | Varshneya et al. |
| 2009/0168045 A1 | 7/2009 | Lin et al. |
| 2009/0218475 A1 | 9/2009 | Kawakami et al. |
| 2009/0245788 A1 | 10/2009 | Varshneya et al. |
| 2009/0299633 A1 | 12/2009 | Hawes et al. |
| 2009/0323737 A1 | 12/2009 | Ensher et al. |
| 2010/0006760 A1 | 1/2010 | Lee et al. |
| 2010/0020306 A1 | 1/2010 | Hall |
| 2010/0045965 A1 | 2/2010 | Meneely |
| 2010/0046953 A1 | 2/2010 | Shaw et al. |
| 2010/0067070 A1 | 3/2010 | Mamada et al. |
| 2010/0073780 A1 | 3/2010 | Ito |
| 2010/0074532 A1 | 3/2010 | Gordon et al. |
| 2010/0134596 A1 | 6/2010 | Becker |
| 2010/0188722 A1 | 7/2010 | Yamada et al. |
| 2010/0198487 A1 | 8/2010 | Vollmer et al. |
| 2010/0204964 A1 | 8/2010 | Pack et al. |
| 2010/0239139 A1 | 9/2010 | Hunt et al. |
| 2010/0258708 A1 | 10/2010 | Meyers et al. |
| 2010/0265077 A1 | 10/2010 | Humble et al. |
| 2010/0271615 A1 | 10/2010 | Sebastian et al. |
| 2010/0302528 A1 | 12/2010 | Hall |
| 2011/0028859 A1 | 2/2011 | Chian |
| 2011/0040482 A1 | 2/2011 | Brimble et al. |
| 2011/0176183 A1 | 7/2011 | Ikeda et al. |
| 2011/0211188 A1 | 9/2011 | Juenemann et al. |
| 2011/0216304 A1 | 9/2011 | Hall |
| 2011/0228068 A1 | 9/2011 | Park |
| 2011/0228073 A1 | 9/2011 | Lee et al. |
| 2011/0235018 A1 | 9/2011 | Mori et al. |
| 2011/0280265 A1 | 11/2011 | Desbiens et al. |
| 2011/0305250 A1 | 12/2011 | Chann et al. |
| 2011/0316494 A1 | 12/2011 | Kitamura et al. |
| 2012/0038903 A1 | 2/2012 | Weimer et al. |
| 2012/0195597 A1 | 8/2012 | Malaney |
| 2012/0287417 A1 | 11/2012 | Mimeault |
| 2013/0024176 A2 | 1/2013 | Woodford |
| 2013/0038915 A1 | 2/2013 | Kusaka et al. |
| 2013/0050144 A1 | 2/2013 | Reynolds |
| 2013/0050486 A1 | 2/2013 | Omer et al. |
| 2013/0070239 A1 | 3/2013 | Crawford et al. |
| 2013/0093583 A1 | 4/2013 | Shapiro |
| 2013/0094960 A1 | 4/2013 | Bowyer et al. |
| 2013/0151198 A1 | 6/2013 | Brown |
| 2013/0168673 A1 | 7/2013 | Yu et al. |
| 2013/0206967 A1 | 8/2013 | Shpunt et al. |
| 2013/0241761 A1 | 9/2013 | Cooper et al. |
| 2013/0242283 A1 | 9/2013 | Bailey et al. |
| 2013/0258312 A1 | 10/2013 | Lewis |
| 2013/0286404 A1 | 10/2013 | Cenko et al. |
| 2013/0300479 A1 | 11/2013 | Thibault |
| 2013/0314711 A1 | 11/2013 | Cantin et al. |
| 2013/0336375 A1 | 12/2013 | Ranki et al. |
| 2013/0342366 A1 | 12/2013 | Kiefer et al. |
| 2014/0043309 A1 | 2/2014 | Go et al. |
| 2014/0063189 A1 | 3/2014 | Zheleznyak et al. |
| 2014/0063483 A1 | 3/2014 | Li |
| 2014/0071234 A1 | 3/2014 | Millett |
| 2014/0078519 A1 | 3/2014 | Steffey et al. |
| 2014/0104592 A1 | 4/2014 | Tien et al. |
| 2014/0152975 A1 | 6/2014 | Ko |
| 2014/0176657 A1 | 6/2014 | Nemoto |
| 2014/0240317 A1 | 8/2014 | Go et al. |
| 2014/0240721 A1 | 8/2014 | Herschbach |
| 2014/0253369 A1 | 9/2014 | Kelley et al. |
| 2014/0259715 A1 | 9/2014 | Engel |
| 2014/0267848 A1 | 9/2014 | Wu |
| 2014/0274093 A1 | 9/2014 | Abdelmonem |
| 2014/0293263 A1 | 10/2014 | Justice et al. |
| 2014/0347650 A1 | 11/2014 | Bosch |
| 2015/0002852 A1 | 1/2015 | de Groot et al. |
| 2015/0015895 A1 | 1/2015 | Bridges et al. |
| 2015/0035437 A1 | 2/2015 | Panopoulos et al. |
| 2015/0055117 A1 | 2/2015 | Pennecot et al. |
| 2015/0101234 A1 | 4/2015 | Priest et al. |
| 2015/0116695 A1 | 4/2015 | Bartolome et al. |
| 2015/0131080 A1 | 5/2015 | Retterath et al. |
| 2015/0144806 A1 | 5/2015 | Jin et al. |
| 2015/0185325 A1 | 7/2015 | Park et al. |
| 2015/0202939 A1 | 7/2015 | Stettner et al. |
| 2015/0219764 A1 | 8/2015 | Lipson |
| 2015/0219765 A1 | 8/2015 | Mead et al. |
| 2015/0226853 A1 | 8/2015 | Seo et al. |
| 2015/0260843 A1 | 9/2015 | Lewis |
| 2015/0293224 A1 | 10/2015 | Eldada et al. |
| 2015/0293228 A1 | 10/2015 | Retterath et al. |
| 2015/0303216 A1 | 10/2015 | Tamaru |
| 2015/0316368 A1 | 11/2015 | Moench et al. |
| 2015/0346325 A1 | 12/2015 | Giacotto et al. |
| 2016/0003946 A1 | 1/2016 | Gilliland et al. |
| 2016/0009410 A1 | 1/2016 | Derenick et al. |
| 2016/0014309 A1 | 1/2016 | Ellison et al. |
| 2016/0021713 A1 | 1/2016 | Reed |
| 2016/0041266 A1 | 2/2016 | Smits |
| 2016/0049058 A1 | 2/2016 | Allen et al. |
| 2016/0098620 A1 | 4/2016 | Geile |
| 2016/0117431 A1 | 4/2016 | Kim et al. |
| 2016/0154105 A1 | 6/2016 | Sigmund et al. |
| 2016/0161600 A1 | 6/2016 | Eldada et al. |
| 2016/0191173 A1 | 6/2016 | Malaney |
| 2016/0209499 A1 | 7/2016 | Suzuki |
| 2016/0210487 A1 | 7/2016 | Jiang |
| 2016/0245919 A1 | 8/2016 | Kalscheur et al. |
| 2016/0259038 A1 | 9/2016 | Retterath et al. |
| 2016/0262228 A1 | 9/2016 | Huang et al. |
| 2016/0279808 A1 | 9/2016 | Doughty et al. |
| 2016/0300484 A1 | 10/2016 | Torbett |
| 2016/0306032 A1 | 10/2016 | Schwarz et al. |
| 2016/0313445 A1 | 10/2016 | Bailey et al. |
| 2016/0327646 A1 | 11/2016 | Scheim et al. |
| 2016/0345820 A1 | 12/2016 | Frisken et al. |
| 2016/0363659 A1 | 12/2016 | Mindell et al. |
| 2016/0365846 A1 | 12/2016 | Wyland |
| 2017/0005465 A1 | 1/2017 | Wyland et al. |
| 2017/0026633 A1 | 1/2017 | Riza |
| 2017/0146639 A1 | 5/2017 | Carothers |
| 2017/0146640 A1 | 5/2017 | Hall et al. |
| 2017/0153319 A1 | 6/2017 | Villeneuve et al. |
| 2017/0214861 A1 | 7/2017 | Rachlin et al. |
| 2017/0219695 A1 | 8/2017 | Hall et al. |
| 2017/0219713 A1 | 8/2017 | Gruver et al. |
| 2017/0220876 A1 | 8/2017 | Gao et al. |
| 2017/0242102 A1 | 8/2017 | Dussan et al. |
| 2017/0269198 A1 | 9/2017 | Hall et al. |
| 2017/0269209 A1 | 9/2017 | Hall et al. |
| 2017/0269215 A1 | 9/2017 | Hall et al. |
| 2017/0299721 A1 | 10/2017 | Eichenholz et al. |
| 2017/0307736 A1 | 10/2017 | Donovan |
| 2017/0329010 A1 | 11/2017 | Warke et al. |
| 2017/0350983 A1 | 12/2017 | Hall et al. |
| 2018/0019155 A1 | 1/2018 | Tsang et al. |
| 2018/0058197 A1 | 3/2018 | Barfoot et al. |
| 2018/0059219 A1 | 3/2018 | Irish et al. |
| 2018/0074382 A1 | 3/2018 | Lee et al. |
| 2018/0081041 A1 | 3/2018 | Niclass et al. |
| 2018/0100924 A1 | 4/2018 | Brinkmeyer |
| 2018/0106902 A1 | 4/2018 | Mase et al. |
| 2018/0131449 A1 | 5/2018 | Kare et al. |
| 2018/0168539 A1 | 6/2018 | Singh et al. |
| 2018/0188360 A1 | 7/2018 | Berger et al. |
| 2018/0261975 A1 | 9/2018 | Pavlov et al. |
| 2018/0267151 A1 | 9/2018 | Hall et al. |
| 2018/0275249 A1 | 9/2018 | Campbell et al. |
| 2018/0284227 A1 | 10/2018 | Hall et al. |
| 2018/0284274 A1 | 10/2018 | LaChapelle |
| 2018/0321360 A1 | 11/2018 | Hall et al. |
| 2018/0364098 A1 | 12/2018 | McDaniel et al. |
| 2019/0001442 A1 | 1/2019 | Unrath et al. |
| 2019/0011563 A1 | 1/2019 | Hall et al. |
| 2019/0056498 A1 | 2/2019 | Sonn et al. |
| 2019/0178991 A1 | 6/2019 | Hall et al. |
| 2019/0293764 A1 | 9/2019 | Van Nieuwenhove et al. |

(56) References Cited

U.S. PATENT DOCUMENTS

| | | | |
|---|---|---|---|
| 2019/0302266 A9 | 10/2019 | Hall et al. |
| 2019/0339365 A1 | 11/2019 | Hall et al. |
| 2019/0361092 A1 | 11/2019 | Hall et al. |
| 2019/0369257 A1 | 12/2019 | Hall et al. |
| 2019/0369258 A1 | 12/2019 | Hall et al. |
| 2020/0025879 A1 | 1/2020 | Pacala et al. |
| 2020/0025896 A1 | 1/2020 | Gunnam |
| 2020/0064452 A1 | 2/2020 | Avlas et al. |
| 2020/0088851 A1 | 3/2020 | Hall et al. |
| 2020/0142070 A1 | 5/2020 | Hall et al. |
| 2020/0144971 A1 | 5/2020 | Pinto et al. |
| 2020/0166613 A1 | 5/2020 | Hall et al. |
| 2020/0191915 A1 | 6/2020 | Hall et al. |
| 2020/0249321 A1 | 8/2020 | Hall et al. |
| 2020/0292678 A1 | 9/2020 | Hall et al. |
| 2020/0319311 A1 | 10/2020 | Hall et al. |
| 2020/0319343 A1 | 10/2020 | Hall et al. |
| 2020/0348401 A1 | 11/2020 | Hall et al. |
| 2022/0026575 A1 | 1/2022 | Hall et al. |

FOREIGN PATENT DOCUMENTS

| | | |
|---|---|---|
| CN | 1106534 A | 8/1995 |
| CN | 1576123 A | 2/2005 |
| CN | 2681085 Y | 2/2005 |
| CN | 2773714 Y | 4/2006 |
| CN | 103278808 B | 12/2015 |
| CN | 107037444 A | 8/2017 |
| CN | 206773192 U | 12/2017 |
| CN | 108061884 A | 5/2018 |
| CN | 207457499 U | 6/2018 |
| CN | 207457508 U | 6/2018 |
| CN | 109116367 A | 1/2019 |
| CN | 106443699 B | 2/2019 |
| CN | 106597471 B | 5/2019 |
| CN | 208902906 U | 5/2019 |
| DE | 930909 C | 7/1955 |
| DE | 3134815 A1 | 3/1983 |
| DE | 3216312 A1 | 11/1983 |
| DE | 3216313 A1 | 11/1983 |
| DE | 3701340 A1 | 7/1988 |
| DE | 3741259 A1 | 6/1989 |
| DE | 3808972 A1 | 10/1989 |
| DE | 3821892 C1 | 2/1990 |
| DE | 4040894 C1 | 4/1992 |
| DE | 4115747 A1 | 11/1992 |
| DE | 4124192 A1 | 1/1993 |
| DE | 4127168 A1 | 2/1993 |
| DE | 4137550 A1 | 3/1993 |
| DE | 4215272 A1 | 11/1993 |
| DE | 4243631 A1 | 6/1994 |
| DE | 4340756 A1 | 6/1994 |
| DE | 4411448 A1 | 10/1995 |
| DE | 4412044 A1 | 10/1995 |
| DE | 19512644 A1 | 10/1996 |
| DE | 19512681 A1 | 10/1996 |
| DE | 4345446 C2 | 7/1998 |
| DE | 4345448 C2 | 7/1998 |
| DE | 19727792 A1 | 2/1999 |
| DE | 19741730 A1 | 4/1999 |
| DE | 19741731 A1 | 4/1999 |
| DE | 19752145 A1 | 5/1999 |
| DE | 19717399 A1 | 6/1999 |
| DE | 19757847 A1 | 7/1999 |
| DE | 19757848 A1 | 7/1999 |
| DE | 19757849 A1 | 7/1999 |
| DE | 19757840 C1 | 9/1999 |
| DE | 19815149 A1 | 10/1999 |
| DE | 19828000 A1 | 1/2000 |
| DE | 19902903 C1 | 5/2000 |
| DE | 19911375 A1 | 9/2000 |
| DE | 19919925 A1 | 11/2000 |
| DE | 19927501 A1 | 11/2000 |
| DE | 19936440 A1 | 3/2001 |
| DE | 19953006 A1 | 5/2001 |
| DE | 19953007 A1 | 5/2001 |
| DE | 19953009 A1 | 5/2001 |
| DE | 19953010 A1 | 5/2001 |
| DE | 10025511 C1 | 12/2001 |
| DE | 10110420 A1 | 9/2002 |
| DE | 10114362 A1 | 10/2002 |
| DE | 10127417 A1 | 12/2002 |
| DE | 10128954 A1 | 12/2002 |
| DE | 10141055 A1 | 3/2003 |
| DE | 10143060 A1 | 3/2003 |
| DE | 10146692 A1 | 4/2003 |
| DE | 10148070 A1 | 4/2003 |
| DE | 10151983 A1 | 4/2003 |
| DE | 10162668 A1 | 7/2003 |
| DE | 10217295 A1 | 11/2003 |
| DE | 10222797 A1 | 12/2003 |
| DE | 10229408 A1 | 1/2004 |
| DE | 10244638 A1 | 4/2004 |
| DE | 10244640 A1 | 4/2004 |
| DE | 10244643 A1 | 4/2004 |
| DE | 10258794 A1 | 6/2004 |
| DE | 10303015 A1 | 8/2004 |
| DE | 10331529 A1 | 1/2005 |
| DE | 10341548 A1 | 3/2005 |
| DE | 102004010197 A1 | 9/2005 |
| DE | 102004014041 A1 | 10/2005 |
| DE | 102005050824 A1 | 5/2006 |
| DE | 102005003827 A1 | 7/2006 |
| DE | 102005019233 A1 | 11/2006 |
| DE | 102007013023 A1 | 9/2008 |
| DE | 102011089636 A1 | 6/2012 |
| DE | 202015009250 U1 | 1/2017 |
| EP | 0185816 A1 | 7/1986 |
| EP | 0361188 A2 | 4/1990 |
| EP | 0396865 A2 | 11/1990 |
| EP | 0412395 A1 | 2/1991 |
| EP | 0412398 A1 | 2/1991 |
| EP | 0412399 A1 | 2/1991 |
| EP | 0412400 A1 | 2/1991 |
| EP | 0468175 A2 | 1/1992 |
| EP | 0486430 A2 | 5/1992 |
| EP | 0653720 A2 | 5/1995 |
| EP | 0656868 A1 | 6/1995 |
| EP | 0665446 A2 | 8/1995 |
| EP | 0897120 A2 | 2/1999 |
| EP | 0913707 A1 | 5/1999 |
| EP | 0937996 A2 | 8/1999 |
| EP | 0967492 A1 | 12/1999 |
| EP | 1046938 A2 | 10/2000 |
| EP | 1055937 A2 | 11/2000 |
| EP | 1148345 A1 | 10/2001 |
| EP | 1160718 A2 | 12/2001 |
| EP | 1174733 A2 | 1/2002 |
| EP | 1267177 A1 | 12/2002 |
| EP | 1267178 A1 | 12/2002 |
| EP | 1286178 A2 | 2/2003 |
| EP | 1286181 A1 | 2/2003 |
| EP | 1288677 A2 | 3/2003 |
| EP | 1291673 A2 | 3/2003 |
| EP | 1291674 A2 | 3/2003 |
| EP | 1298012 A2 | 4/2003 |
| EP | 1298453 A2 | 4/2003 |
| EP | 1298454 A2 | 4/2003 |
| EP | 1300715 A2 | 4/2003 |
| EP | 1302784 A2 | 4/2003 |
| EP | 1304583 A2 | 4/2003 |
| EP | 1306690 A2 | 5/2003 |
| EP | 1308747 A2 | 5/2003 |
| EP | 1355128 A1 | 10/2003 |
| EP | 1403657 A1 | 3/2004 |
| EP | 1408318 A1 | 4/2004 |
| EP | 1418444 A1 | 5/2004 |
| EP | 1460454 A2 | 9/2004 |
| EP | 1475764 A2 | 11/2004 |
| EP | 1515157 A1 | 3/2005 |
| EP | 1531342 A1 | 5/2005 |
| EP | 1531343 A1 | 5/2005 |
| EP | 1548351 A2 | 6/2005 |
| EP | 1557691 A1 | 7/2005 |

(56) References Cited

FOREIGN PATENT DOCUMENTS

| | | |
|---|---|---|
| EP | 1557692 A1 | 7/2005 |
| EP | 1557693 A1 | 7/2005 |
| EP | 1557694 A1 | 7/2005 |
| EP | 1700763 A2 | 9/2006 |
| EP | 1914564 A1 | 4/2008 |
| EP | 1927867 A1 | 6/2008 |
| EP | 1939652 A1 | 7/2008 |
| EP | 1947377 A1 | 7/2008 |
| EP | 1983354 A1 | 10/2008 |
| EP | 2003471 A1 | 12/2008 |
| EP | 2157445 A2 | 2/2010 |
| EP | 2177931 A2 | 4/2010 |
| EP | 2503360 A1 | 9/2012 |
| EP | 2963445 A2 | 1/2016 |
| EP | 3185038 A1 | 6/2017 |
| GB | 2041687 A | 9/1980 |
| JP | H05240940 A | 9/1993 |
| JP | H03-006407 | 2/1994 |
| JP | H6-288725 A | 10/1994 |
| JP | H06-289136 A | 10/1994 |
| JP | H07-167609 A | 7/1995 |
| JP | H09-097925 A | 4/1997 |
| JP | 11264871 | 9/1999 |
| JP | 2001050723 A | 2/2001 |
| JP | 2001216592 A | 8/2001 |
| JP | 2001-256576 A | 9/2001 |
| JP | 2002-031528 A | 1/2002 |
| JP | 2003-336447 A | 11/2003 |
| JP | 2004241915 A | 8/2004 |
| JP | 2004-348575 A | 12/2004 |
| JP | 2005-070840 A | 3/2005 |
| JP | 2005-297863 A | 10/2005 |
| JP | 2006-177843 A | 7/2006 |
| JP | 2008102000 A | 5/2008 |
| JP | 20080258695 A | 10/2008 |
| JP | 2010-060309 A | 3/2010 |
| JP | 2011-069726 A | 4/2011 |
| JP | 2013-104771 A | 5/2013 |
| JP | 2013187528 A | 9/2013 |
| JP | 2014-190736 A | 10/2014 |
| JP | 2015-169491 A | 9/2015 |
| JP | 2016164983 A | 9/2016 |
| RU | 2061224 C1 | 5/1996 |
| RU | 2554279 C2 | 6/2015 |
| RU | 2567469 C2 | 11/2015 |
| RU | 2575766 C1 | 2/2016 |
| WO | WO-1999/003080 A1 | 1/1999 |
| WO | WO-2000/025089 A1 | 5/2000 |
| WO | WO-01/31608 A1 | 5/2001 |
| WO | WO-03/019234 A1 | 3/2003 |
| WO | WO-03/040755 A1 | 5/2003 |
| WO | WO-2004/019293 A2 | 3/2004 |
| WO | WO-2004/036245 A2 | 4/2004 |
| WO | WO-2008/008970 A2 | 1/2008 |
| WO | WO-2009/120706 A2 | 10/2009 |
| WO | WO-2012/153309 A2 | 11/2012 |
| WO | WO-2012/172526 A1 | 12/2012 |
| WO | WO-2013/191133 A1 | 12/2013 |
| WO | WO-2015/079300 A1 | 6/2015 |
| WO | WO-2015/104572 A1 | 7/2015 |
| WO | WO-2016/056545 A1 | 4/2016 |
| WO | WO-2016/162568 A1 | 10/2016 |
| WO | WO-2017/033419 A1 | 3/2017 |
| WO | WO-2017/089063 A1 | 6/2017 |
| WO | WO-2017/132703 A1 | 8/2017 |
| WO | WO-2017/149370 A1 | 9/2017 |
| WO | WO-2017/164989 A1 | 9/2017 |
| WO | WO-2017/165316 A1 | 9/2017 |
| WO | WO-2017/193269 A1 | 11/2017 |
| WO | WO-2017/210418 A1 | 12/2017 |
| WO | WO-2018/125823 A1 | 7/2018 |
| WO | WO-2018/196001 A1 | 11/2018 |
| WO | WO-2020001535 A1 | 1/2020 |

OTHER PUBLICATIONS

U.S. Appl. No. 16/134,068, filed Sep. 18, 2018, Hall et al.
U.S. Appl. No. 16/890,951, filed Jun. 2, 2020, Hall et al.
U.S. Appl. No. 17/255,948, filed Dec. 23, 2020, Xiang et al.
*Quanergy Systems, Inc.* v. *Velodyne Lidar, Inc.* (Fed. Cir.), Docket No. 20-2070, filed Jul. 27, 2020., U.S. Pat. No. 7,969,558.
*Quanergy Systems, Inc.* v. *Velodyne Lidar, Inc.* (Fed. Cir.), Docket No. 20-2072, filed Jul. 27, 2020., U.S. Pat. No. 7,969,558.
Canadian Patent Office, Office Action, App. No. CA 3,012,003 (dated Sep. 18, 2020), 4 pages.
Canadian Patent Office, Office Action, App. No. CA 3,024,510 (dated Oct. 16, 2020), 6 pages.
European Patent Office, Communication Pursuant to Rules 70(2) and 70a(2) EPC, App. No. 18771534.7 (dated Jan. 14, 2021), 1 page.
European Patent Office, Examination Report, Appl. No. 17745112.7 (dated Jul. 1, 2020), 6 pages.
European Patent Office, Office Action, App. No. 17770748.6 (dated Sep. 14, 2020), 10 pages.
European Patent Office, Office Action, App. No. 17770926.8 (dated Sep. 9, 2020), 5 pages.
European Patent Office, Office Action, App. No. 18886541.4 (dated Jun. 3, 2020), 3 pages.
Extended Search Report, EP App. No. 18774795.1, dated Nov. 11, 2020, 9 pages.
Extended Search Report, EP App. No. 18798447.1, dated Dec. 10, 2020, 7 pages.
Glennie, C., et al., "A Comparison of Laser Scanners for Mobile Mapping Applications," Abstract and slides for a presentation given in 2011, 22 pages.
Glennie, C., et al., "Static Calibration and Analysis of the Velodyne Hdl-64E S2 for High Accuracy Mobile Scanning," Remote Sensing 2010, 2: pp. 1610-1624.
International Search Report of PCT/CN2019/093266 dated Sep. 30, 2019, 3 pages.
Japanese Patent Office, Notice of Reasons for Rejections, App. No. 2018-549918 (dated Jan. 26, 2021), 4 pages.
Japanese Patent Office, Office Action, App. No. 2019-500215 (dated Dec. 8, 2020), 5 pages.
Merriam-Webster, Aperture definition, https://web.archive.org/web/20170817144540/https://www.merriam-webster.com/dictionary/aperture (Aug. 17, 2017), 4 pages.
Milenkovic, "Introduction to LIDAR," NEWFOR2014 Summer School (Jul. 2014), 77 pages (Ipr. Nos. '255 and '256, Exhibit 2166).
Neff, "The Laser That's Changing the World," Prometheus Books (2018), pp. 193-204 and 270-271.
Russian Patent Office, Office Action, App. No. 2020121407 (dated Jul. 23, 2020), 5 pages.
Satterfield, B., et al., "Advancing Robotics: The Urban Challenge Effect," Journal of Aerospace Computing, Information, and Communication, vol. 5, Dec. 2008, pp. 530-542.
Sick, "Distance Sensors," https://web.archive.org/web/20041213053807/http://www.Ipc-uk.com:80/sick/sickdist.htm (Dec. 13, 2004), 3 pages.
U.S. International Trade Commission, Investigation No. 337-TA-1173, Appendix B to Respondents Response to the Complaint and Notice of Investigation, Oct. 21, 2019, pp. 1-4.
U.S. International Trade Commission, Investigation No. 337-TA-1173, "Complainant Velodyne and Respondent Hesai's Joint Notice," Jul. 9, 2020, 3 pages.
U.S. International Trade Commission, Investigation No. 337-TA-1173, "Complainant Velodyne Lidar Inc.'s Motion for Summary Determination," Public Version, Mar. 6, 2020, 168 pages.
U.S. International Trade Commission, Investigation No. 337-TA-1173, "Complainant Velodyne Lidar Inc.'s Opposition to Respondent Hesai's Motion for Summary Determination of Invalidity of U.S. Pat. No. 7,969,558," Public Version, Mar. 18, 2020, 184 pages.
U.S. International Trade Commission, Investigation No. 337-TA-1173, "Complainant Velodyne Lidar Inc.'s Opposition to Respondent Hesai's Motion to Amend," Public Version, Feb. 28, 2020, 108 pages.

(56) References Cited

OTHER PUBLICATIONS

U.S. International Trade Commission, Investigation No. 337-TA-1173, "Complainant Velodyne Lidar, Inc.'s Disclosure of Domestic Industry Products," Nov. 8, 2019, 3 pages.
U.S. International Trade Commission, Investigation No. 337-TA-1173, "Complainant Velodyne Lidar, Inc.'s Motion in Limine No. 3 to Exclude Evidence and Testimony that Krumes Discloses any Limitations of Claims 2 and 9 of the '558 Patent," Sep. 2, 2020, 26 pages.
U.S. International Trade Commission, Investigation No. 337-TA-1173, "Complainant Velodyne's Motion in Limine No. 1 to Limit the Testimony of Robosense's Expert, Jason Janet, PhD.," Public Version, Sep. 2, 2020, 34 pages.
U.S. International Trade Commission, Investigation No. 337-TA-1173, "Complainant Velodyne's Motion in Limine No. 2 to Exclude any Testimony from Dr. Janet Regarding an Alleged Motivation to Combine or Reasonable Expectation of Success," Public Version, Sep. 2, 2020, 22 pages.
U.S. International Trade Commission, Investigation No. 337-TA-1173, "Complainant Velodyne's Supplemental Motion for Summary Determination Regarding Inventorship," Public Version, Sep. 10, 2020, 26 pages.
U.S. International Trade Commission, Investigation No. 337-TA-1173, "Complaint of Velodyne Lidar, Inc. Under Section 337 of the Tariff Act of 1930, as Amended," Aug. 15, 2019, 45 pages.
U.S. International Trade Commission, Investigation No. 337-TA-1173, "Hesai's Motion for Leave to Amend Its Response to the Complaint and Notice of Investigation," Public Version, Feb. 18, 2020, 82 pages.
U.S. International Trade Commission, Investigation No. 337-TA-1173, "Hesai's Unopposed Motion for Leave to File a Reply in Support of Its Motion to Amend Its Response to the Complaint and Notice of Investigation," Public Version, Mar. 6, 2020, 30 pages.
U.S. International Trade Commission, Investigation No. 337-TA-1173, "Initial Determination Granting Joint Motion for Termination of the Investigation as to Respondent Hesai Based on a Settlement and Request for Limited Service of Settlement Agreement under CFR §210.21(b)," Public Version, Jul. 13, 2020, 4 pages.
U.S. International Trade Commission, Investigation No. 337-TA-1173, "Joint Chart of Substantive Legal Issues Being Litigated," Sep. 17, 2020, 5 pages.
U.S. International Trade Commission, Investigation No. 337-TA-1173, "Joint Chart of Substantive Legal Issues Being Litigated," Sep. 8, 2020, 6 pages.
U.S. International Trade Commission, Investigation No. 337-TA-1173, "Joint Motion for and Memorandum in Support of Termination of the Investigation as to Respondent Hesai Based on a Settlement and Request for Limited Service of Settlement Agreement under 19 CFR §210.21(b)," Public Version, Jul. 8, 2020, 77 pages.
U.S. International Trade Commission, Investigation No. 337-TA-1173, "Order No. 26: Granting Hesai's Motion for Leave to Amend Its Response to the Complaint and Notice of Investigation," May 7, 2020, 6 pages.
U.S. International Trade Commission, Investigation No. 337-TA-1173, "Order No. 27: Denying without Prejudice Velodyne's Motion for Summary Determination," Public Version, May 12, 2020, 11 pages.
U.S. International Trade Commission, Investigation No. 337-TA-1173, "Respondent Hesai's Motion for Summary Determination of Invalidity of U.S. Pat. No. 7,969,558," Public Version, Mar. 6, 2020, 109 pages.
U.S. International Trade Commission, Investigation No. 337-TA-1173, "Respondent Robosense's Opposition to Complainant Velodyne's Motion in Limine No. 3 to Exclude Evidence and Testimony That Krumes Discloses Any Limitations of Claims 2 and 9 of the '558 Patent," Sep. 9, 2020, 10 pages.
U.S. International Trade Commission, Investigation No. 337-TA-1173, "Respondent Robosense's Response in Opposition to Complainant Velodyne Lidar, Inc.'s Motion in Limine No. 1," Sep. 9, 2020, 11 pages.
U.S. International Trade Commission, Investigation No. 337-TA-1173, "Respondent RoboSense's Response in Opposition to Complainant Velodyne Lidar, Inc.'s Renewed Motion for Summary Determination Regarding Inventorship," Public Version, Sep. 8, 2020, 12 pages.
U.S. International Trade Commission, Investigation No. 337-TA-1173, "Respondent Robosense's Response in Opposition to Complainant's Motion in Limine No. 2," Sep. 9, 2020, 13 pages.
U.S. International Trade Commission, Investigation No. 337-TA-1173, "Respondent Suteng Innovation Technology Co., Ltd.'s Response to the Complaint and Notice of Investigation," Public Version, Oct. 21, 2019, 31 pages.
U.S. International Trade Commission, Investigation No. 337-TA-1173, "Respondents' Memorandum in Opposition to Complainant Velodyne Lidar Inc.'s Motion for Summary Determination," Public Version, Mar. 18, 2020, 190 pages.
U.S. International Trade Commission, Investigation No. 337-TA-1173, "Respondents' Response to the Complaint and Notice of Investigation," Public Version, Oct. 21, 2019, 36 pages.
Velodyne Lidar, Excerpts of Business Records (2007-2012), 2 pages. (IPR Nos. '255 and '256 Exhibit 2084).
Wikipedia, "Cassegrain reflector," Dec. 12, 2014, 5 pages (downloaded from Internet Archive, Sep. 29, 2020).
Written Opinion for PCT/CN2019/093266 dated Sep. 23, 2019, 4 pages.
U.S. Appl. No. 15/941,302, filed Mar. 30, 2018, Hall et al.
U.S. Appl. No. 16/510,680, filed Jul. 12, 2019, Hall et al.
U.S. Appl. No. 16/510,710, filed Jul. 12, 2019, Hall et al.
U.S. Appl. No. 16/510,749, filed Jul. 12, 2019, Hall et al.
U.S. Appl. No. 11/777,802, filed Jul. 13, 2007, Hall.
U.S. Appl. No. 13/109,901, filed May 17, 2011, Hall et al.
U.S. Appl. No. 15/180,580, filed Jun. 13, 2016, Hall et al.
U.S. Appl. No. 15/700,543, filed Sep. 11, 2017, Hall et al.
U.S. Appl. No. 15/700,558, filed Sep. 11, 2017, Hall et al.
U.S. Appl. No. 15/700,571, filed Sep. 11, 2017, Hall et al.
U.S. Appl. No. 15/700,836, filed Sep. 11, 2017, Hall et al.
U.S. Appl. No. 15/700,844, filed Sep. 11, 2017, Hall et al.
U.S. Appl. No. 15/700,959, filed Sep. 11, 2017, Hall et al.
U.S. Appl. No. 15/700,965, filed Sep. 11, 2017, Hall et al.
U.S. Appl. No. 16/912,648, filed Jun. 25, 2020, Hall et al.
U.S. Appl. No. 15/926,095, filed Mar. 30, 2018, Hall et al.
U.S. Appl. No. 15/464,227, filed Mar. 30, 2017, Hall et al.
U.S. Appl. No. 15/464,221, filed Mar. 30, 2017, Hall et al.
U.S. Appl. No. 15/610,975, filed Jun. 1, 2017, Hall et al.
U.S. Appl. No. 16/546,131, filed Aug. 20, 2019, Hall et al.
U.S. Appl. No. 16/842,491, filed Apr. 7, 2020, Hall et al.
U.S. Appl. No. 16/546,184, filed Aug. 20, 2019, Hall et al.
U.S. Appl. No. 16/546,206, filed Aug. 20, 2019, Hall et al.
U.S. Appl. No. 16/909,306, filed Jun. 23, 2020, Hall et al.
U.S. Appl. No. 15/339,790, filed Oct. 31, 2016, Hall et al.
U.S. Appl. No. 16/854,755, filed Apr. 21, 2020, Hall et al.
U.S. Appl. No. 16/905,843, filed Jun. 18, 2020, Hall et al.
U.S. Appl. No. 16/905,849, filed Jun. 18, 2020, Hall et al.
U.S. Appl. No. 16/909,846, filed Jun. 23, 2020, Hall et al.
U.S. Appl. No. 15/835,983, filed Dec. 8, 2017, Hall et al.
U.S. Appl. No. 16/459,557, filed Jul. 1, 2019, Rekow et al.
U.S. Appl. No. 16/841,506, filed Apr. 6, 2020, Rekow et al.
U.S. Appl. No. 16/112,273, filed Aug. 24, 2018, Avlas et al.
U.S. Appl. No. 16/181,523, filed Nov. 6, 2018, Pinto et al.
U.S. Appl. No. 16/241,849, filed Jan. 7, 2019, Hall et al.
U.S. Appl. No. 16/241,963, filed Jan. 7, 2019, Hall et al.
*Quanergy Systems, Inc.* v. *Velodyne Lidar, Inc.* (N.D. Cal.), Docket No. 5-16-cv-05251, filed Sep. 13, 2015., U.S. Pat. No. 7,969,558.
*Velodyne Lidar, Inc.* v. *Hesai Photonics Technology Co., Ltd.* (N.D. Cal.), Docket No. 5:16-cv-04742, filed Aug. 13, 2019., U.S. Pat. No. 7,969,558.
*Velodyne Lidar, Inc.* v. *Suteng Innovation Technology Co., Ltd.* (N.D. Cal.), Docket No. 5:16-cv-04746, filed Aug. 13, 2019., U.S. Pat. No. 7,969,558.

(56) References Cited

OTHER PUBLICATIONS

In re Certain Rotating 3-D Lidar Devices, Components Thereof, and Sensing Systems Containing the Same (ITC), Investigation No. ITC-337-TA-1173, filed Aug. 15, 2019., U.S. Pat. No. 7,969,558.
Petition for Inter Partes Review (USPTO Patent Trial and Appeal Board), Case No. IPR2018-00255, filed Nov. 29, 2017., U.S. Pat. No. 7,969,558.
Petition for Inter Partes Review (USPTO Patent Trial and Appeal Board), Case No. IPR2018-000255, filed Nov. 29, 2017., U.S. Pat. No. 7,969,558.
Accetta et al., Active Electro-Optical Systems, The Infrared and Electro-Optical Systems Handbook (1993, ed. by Clifton Fox), pp. 3-76. (IPR Nos. '255 and '256 Exhibit 2158).
Acuity Laser, Principles of Measurement Used by Laser Sensors, https://www.acuitylaser.com/measurement-principles (2018), 4 pages. (IPR Nos. '255 and '256 Exhibit 1075).
Acuity, Acuity Aluminum Billet Scalping Production Information webpage (Brennan Deposition Exhibit 14) (last visited Dec 28, 2018), 2 pages. (IPR Nos. '255 and '256 Exhibit 2184).
Acuity, Acuity AR700 Laser Displacement Sensor Product Information webpage (Brennan Deposition Exhibit 13) (last visited Dec 28, 2018), 9 pages. (IPR Nos. '255 and '256 Exhibit 2183).
Acuity, Acuity Drill Pipe Runout Product Information webpage (Brennan Deposition Exhibit 12) (last visited Dec 28, 2018), 2 pages. (IPR Nos. '255 and '256 Exhibit 2182).
Acuity, Acuity Short Range Sensors Product Information webpage (Brennan Deposition Exhibit 11) (last visited Dec 30, 2018), 3 pages. (IPR Nos. '255 and '256 Exhibit 2181).
Aiestaran et al. "A Fluorescent Linear Optical Fiber Position Sensor" Elsevier B.V. May 21, 2008 (4 pages).
Albota, "Three-dimensional imaging laser RADAR with a photon-counting avalanche photodiode array and microchip laser," Applied optics, vol. 41, No. 36 (Dec. 20, 2002), 8 pages.
Alhashimi, et al, Statistical Modeling and Calibration of Triangulation Lidars, Scitepress—Science and Technology Publications (2016), pp. 308-317. (IPR Nos. '255 and '256 Exhibit 1069).
Amann, Laser ranging: a critical review of usual techniques for distance measurement, 40(1) Society of Photo-Optical Instrumentation Engineers (Jan. 2001), pp. 10-19. (IPR Nos. '255 and '256 Exhibit 2148).
American National Standard for Safe Use of Lasers, ANSI Z136. 1-2014, Laser Institute of America (Dec. 10, 2013), pp. 27-34 and 216-219. (IPR Nos. '255 and '256 Exhibit 1142).
American National Standard for Safe Use of Lasers, Laser Institute of America (Jun. 28, 2000), 184 pages. (IPR Nos. '255 and '256 Exhibit 2005).
American National Standards Institute, "Procedures for the Development and Coordination of American National Standards" (Mar. 22, 1995), 50 pages. (IPR Nos. '255 and '256 Exhibit 1040).
American Petroleum Institute, "Specification for Line Pipe," API Specification 5L, 43rd Ed. (2004), 166 pages. (IPR Nos. '255 and '256 Exhibit 1139).
Aood Technology Limited, "Electrical Slip Rings vs. Rotating Electrical Connectors" (2013), 3 pages. (IPR Nos. '255 and '256 Exhibit 1032).
Aufrere, et al., Perception for collision avoidance and autonomous driving, The Robots Institute, Carnegie Mellon University (2003), 14 pages (IPR Nos. '255 and '256 Exhibit 2140).
Aull, et al., "Geiger-Mode Avalanche Photodiodes for Three Dimensional Imaging," Lincoln Laboratory Journal (2002), 16 pages. (IPR Nos. '255 and '256 Exhibit 1021), Lincoln Laboratory Journal, vol. 13, No. 2, 2002, pp. 335-350.
Automotive Lidar, Market Presentation titled "Robotic Cars LiDAR Market in Million Dollars" (Apr. 2018), 86 pages. (IPR Nos. '255 and '256 Exhibit 2113).
Avalanche Photodiode: A User Guide (2011), 8 pages. (IPR Nos. '255 and '256 Exhibit 1019).
Beer, et al, Mechanics of Materials, McGraw Hill Companies, 4th Ed. (2006), pp. 750 and 752. (IPR Nos. '255 and '256 Exhibit 1140).
Berkovic et al., Optical Methods for Distance and Displacement Measurements, Advances in Optics and Photonics (Sep. 11, 2012), pp. 441-471. (IPR Nos. '255 and '256 Exhibit 2007).
Besl, Active, Optical Range Imaging Sensors Machine Visions and Applications (1988), Springer-Verlag New York Inc., pp. 1:127-152 (IPR Nos. '255 and '256 Exhibit 1015).
Blais, NRC-CNRC, Review of 20 Years of Range Sensor Development, National Research Council Canada (Jan. 2004), pp. 231-243 (IPR Nos. '255 and '256 Exhibit 2141).
Bordone, et al., "Development of a high-resolution laser radar for 3D imaging in artwork cataloging," Proceedings of SPIE, vol. 5131 (2003), 6 pages. (IPR Nos. '255 and '256 Exhibit 1016).
Bornstein, "Where am I? Sensors and Methods for Mobile Robot Positioning" (1996), pp. 95-112.
Brennan, Drawing of I-beam by Dr. Brennan (Brennan Deposition Exhibit 16), (Jan. 4, 2019), 1 page. (IPR Nos. '255 and '256 Exhibit 2186).
Brustein et al., How a Billion-Dollar Autonomous Vehicle Startup Lost Its Way, Bloomberg https://www.bloomberg.com/news/features/2018-08-13/how-a-billiondollar-autonomous-vehicle-startup-lost-its-way (Aug. 13, 2018), 7 pages. (IPR Nos. '255 and '256 Exhibit 2098).
Business Wire, Press Release Distribution webpage, https://services.businesswire.com/press-release-distribution (Dec. 21, 2018), 2 pages. (IPR Nos. '255 and '256 Exhibit 1143).
Businesswire, Velodyne Displays Solid State, Highest Performing LiDAR for ADAS, Businesswire https://www.businesswire.com/news/home/20180107005088/en/Velodyne-Displays-Solid-State-Highest-Performing-LiDAR (Jan. 7, 2018), 2 pages. (IPR Nos. '255 and '256 Exhibit 2097).
Businesswire, Velodyne LiDar Awarded "Industry Choice Company of the Year" at TU-Automotive Detroit Conference, Businesswire, https://www.businesswire.com/news/home/20180608005700/en/Velodyne-LiDAR-Awarded-%E2%80%9CIndustry-Choice-Company-Year%E2%80%9D (Jun. 8, 2018), 1 page. (IPR Nos. '255 and '256 Exhibit 2096).
Cameron, An Introduction to LIDAR: The Key Self-Driving Car Sensor, Voyage https://news.voyage.auto/an-introduction-to-lidar-the-key-self-drivingcar-sensor-a7e405590cff (May 9, 2017), 14 pages. (IPR Nos. '255 and '256 Exhibit 2074).
Canadian Patent Office, Office Action, App. No. CA 3,012,003 (dated Aug. 28, 2019), 3 pages.
Canadian Patent Office, Office Action, App. No. CA 3,017,735 (dated Aug. 28, 2019), 3 pages.
Canadian Patent Office, Office Action, App. No. CA 3,017,811 (dated Aug. 28, 2019), 3 pages.
Canbus, https://web.archive.org/web/20040520021138/ http:/canbus.us:80/ (May 20, 2004), 3 pages. (IPR Nos. '255 and '256 Exhibit 1088).
Carson, N. "Defending Gps against the Spoofing Threat using Network Based Detection and 3,15,20 Successive Interference Cancellation". Auburn University. Nov. 2015, 35 pages.
Chapman, "Introduction to Laser Safety" (Sep. 10, 2007), 19 pages.
Chellapilla, Lidar: The Smartest Sensor on a Self Driving Car, LinkedIn.com https://www.linkedin.com/pulse/lidar-smartest-sensor-self-driving-carkumar-chellapill (Jul. 31, 2017), 8 pages. (IPR Nos. '255 and '256 Exhibit 2075).
Cheung, Spinning laser maker is the real winner of the Urban Challenge, Tech Guru Daily, available at http://www.tgdaily.com/trendwatch-features/34750-spinning-laser-maker-is-the-real-winner (Nov. 7, 2007), 7 pages. (IPR Nos. '255 and '256 Exhibit 2091).
Code of Federal Regulations, Food and Drugs Rule—Performance Standards for Light-Emitting Products, 21 C.F.R. § 1040.10 (2005).
Copper Development Association Inc., Copper Tube Handbook—Industry Standard Guide for the Design and Installation of Copper Piping Systems, CDA Publication A4015-14.17: Copper Tube Handbook (2016), 96 pages. (IPR Nos. '255 and '256 Exhibit 2139).
Cravotta, "Operating alone," EDN (Dec. 5, 2005), 6 pages.
D'Allegro, Meet the Inventor Trying to Bring LiDAR to the Masses, The Drive http://www.thedrive.com/sheetmetal/15567/meet-the-inventor-trying-to bring-lidar-to-the-masses (Oct. 28, 2017), 5 pages. (IPR Nos. '255 and '256 Exhibit 2072).

(56) References Cited

OTHER PUBLICATIONS

Daido, Daido Special Steel Co. home page, https://web.archive.org/web/20051227070229/http:/daido.co.jp/ (Dec. 27, 2005), 1 page. (IPR Nos. '255 and '256 Exhibit 1087).

Daido, Daido steel drilling equipment page, https://web.archive.org/web/20050406120958/ http:/www.daido.co.jp:80/english/products/applipro/energy/dri.html (Apr. 6, 2005), 1 page. (IPR Nos. '255 and '256 Exhibit 1083).

Daido, Daido steel petroleum components, https://web.archive.org/web/20050406121643/ http:/www.daido.co.jp:80/english/products/applipro/energy/petro.htm (Apr. 6, 2005), 1 page. (IPR Nos. '255 and '256 Exhibit 1084).

Daido, Daido steel rebar page, https://web.archive.org/web/20051201010951/ http:/www.daido.co.jp:80/products/stainless/ik_shokai.html (Dec. 1, 2005), 2 pages. (IPR Nos. '255 and '256 Exhibit 1086).

DARPA, 2005 DARPA Challenge Info page https://web.archive.org/web/20051214033009/ http:/www.darpa.mil:80/grandchallenge/ (Nov. 17, 2005), 1 page. (IPR Nos. '255 and '256 Exhibit 1092).

DARPA, 2005 DARPA Team Papers https://web.archive.org/web/20051213010211/ http:/www.darpa.mil:80/grandchallenge/techpapers.html (Dec. 13, 2005), 2 pages. (IPR Nos. '255 and '256 Exhibit 1093).

DARPA, Grand Challenge '05—Frequently Asked Questions, DARPA.com, http://archive.darpa.mil/grandchallenge05/qa.html) (2005), 3 pages. (IPR Nos. '255 and '256 Exhibit 2143).

DARPA, Grand Challenge Media—Frequently Asked Questions (Media),DARPA.com, http://archive.darpa.mil/grandchallenge04/media_faq.htm (2004), 3 pages. (IPR Nos. '255 and '256 Exhibit 2142).

DARPA, PDF found on Team DAD paper URL, https://web.archive.org/web/20051213015642/ http:/www.darpa.mil:80/grandchallenge/TechPapers/TeamDAD.pdf (Aug. 6, 2005), pp. 1-12. (IPR Nos. '255 and '256 Exhibit 1094).

DARPA, Urban Challenge, DARPA.com, http://archive.darpa.mil/grandchallenge/ ("DARPA Archive") (2007), 4 pages. (IPR Nos. '255 and '256 Exhibit 2144).

Dehong, et al, Design and Implementation of LiDAR Navigation System Based on Triangulation Measurement, 29th Chinese Control and Decision Conference (CCDC) (May 2017), 59 pages. (IPR Nos. '255 and '256 Exhibit 1136).

Doyle, Velodyne HDL-64E Laser Rangefinder (LIDAR) Pseudo-Disassembled, Hizook (Jan. 4, 2009), 7 pages. (IPR Nos. '255 and '256 Exhibit 2046).

Engineering Toolbox, The Engineering Toolbox Copper Tubes—ASTM B88 Datasheet (last accessed Jul. 10, 2018), 4 pages. (IPR Nos. '255 and '256 Exhibit 2137).

English, et al., The Complementary Nature of triangulation and ladar technologies, 5791 Proceedings of SPIE (May 19, 2005), pp. 29-41. (IPR Nos. '255 and '256 Exhibit 2162).

Esacademy, Betting on CAN, https://web.archive.org/web/20040609170940/ http:/www.esacademy.com:80/faq/docs/bettingcan/traditional.htm (Jun. 9, 2004), 1 page. (IPR Nos. '255 and '256 Exhibit 1089).

European Patent Office, Office Action, App. No. EP 07840406.8 (dated Mar. 15, 2011) 7 pages.

European Patent Office, Office Action, App. No. EP 11166432.2 (dated Jan. 29, 2019), 3 pages.

European Patent Office, Office Action, App. No. EP 11166432.2 (dated Oct. 14, 2016), 4 pages.

European Patent Office, Office Action, App. No. EP 11166432.2 (dated Oct. 5, 2015), 4 pages.

European Patent Office, Office Action, App. No. EP 11166432.2 (dated Oct. 7, 2019), 6 pages.

Ewald et al., Object Detection with Laser Scanners for Automotive Applications, IFAC Control in Transportation Systems (2000), pp. 369-372. (IPR Nos. '255 and '256 Exhibit 2191).

Excelitas Technologies, "Avalanche Photodiode. A User Guide", 2011 Excelitas Technologies Corp., pp. 1-8.

Fast Company, The World's 50 Most Innovative Companies 2017, https://www.fastcompany.com/most-innovative-companies/2017 (last visited Feb. 26, 2018), 5 pages. (IPR Nos. '255 and '256 Exhibit 2077).

Fischer, "Rapid Measurement and Mapping of Tracer Gas Concentrations in a Large Indoor Space" (May 2000), 27 pages.

Ford Media Center, Ford Tripling Autonomous Vehicle Development Fleet, Accelerating on-road Testing of Sensors and Software (Jan. 5, 2016), 4 pages. (IPR Nos. '255 and '256 Exhibit 2066).

Fox, "Active electro-optical systems," The infrared and electro-optical systems handbook, vol. 6 (1993), pp. 1-80.

Frost et al., Driving the Future of Autonomous Navigation—Whitepaper for Analysis of LIDAR technology for advanced safety, https://velodynelidar.com/docs/papers/FROST-ON-LiDAR.pdf (2016), 30 pages. (IPR Nos. '255 and '256 Exhibit 1130).

Fuerstenberg, et al, Multilayer Laserscanner for Robust Object Tracking and Classification in Urban Traffic Scenes, 9th World Congress on Intelligent Transport Systems (2002), 14 pages. (IPR Nos. '255 and '256 Exhibit 1079), pp. 1-10.

Fuerstenberg, et al., Pedestrian Recognition and Tracking of Vehicles using a vehicle based Multilayer Laserscanner, IEEE (2002), 12 pages. (IPR Nos. '255 and '256 Exhibit 2192).

Fuerstenberg, Pedestrian detection and classification by laserscanners, (2003), 8 pages.

Furstenberg, et al., New Sensor for 360 Vehicle Surveillance—Innovative Approach to Stop & Go, Lane Assistance and Pedestrian Recognition (May 2001), 5 pages. (IPR Nos. '255 and '256 Exhibit 2190).

Gargiulo, Velodyne Lidar Tops Winning Urban Challenge Vehicles, Business Wire (Nov. 6, 2007), 2 pages. (IPR Nos. '255 and '256 Exhibit 2082).

Garmin, How the LIDAR-Lite v3/v3HP works with reflective surfaces, GARMIN.com, https://support.garmin.com/en-US/?faq=IVeHYIKwChAY0qCVhQiJ67 (last visited Aug. 24, 2018), 2 pages. (IPR Nos. '255 and '256 Exhibit 2145).

Glennie et al., Temporal Stability of the Velodyne HDL-64E S2 Scanner for High Accuracy Scanning Applications, MDPI Remote Sensing (Mar. 14, 2011), 15 pages. (IPR Nos. '255 and '256 Exhibit 2057).

Glennie, Performance analysis of a kinematic terrestrial LiDAR scanning system, MAPPS/ASPRS 2006 fall conference (Nov. 6-10, 2006), 9 pages.

Glennie, Reign of Point Clouds: A Kinematic Terrestrial LiDAR Scanning System (2007), pp. 22-31.

Gustavson, "Diode-laser radar for low-cost weapon guidance," SPIE vol. 1633, Laser radar VII (1992), pp. 1-12.

Hall, et al., Team DAD Technical Paper, DARPA Grand Challenge 2005, XP-002543336, Aug. 26, 2005, pp. 1-12. (IPR Nos. '255 and '256 Exhibit 1081).

Hamamatsu, CCD area image sensor S7030/S7031 Series Back-thinned FFT-CCD Datasheet (2006), 8 pages. (IPR Nos. '255 and '256 Exhibit 2123).

Hamamatsu, CCD Image Sensors Webpage ("CCD Image Sensors") (Feb. 2, 2006), 1 page. (IPR Nos. '255 and '256 Exhibit 2124).

Hamamatsu, Image Sensor Selection guide (Dec. 2003), 20 pages. (IPR Nos. '255 and '256 Exhibit 2128).

Hamamatsu, Image Sensors Webpage (Mar. 17, 2006), 1 page. (IPR Nos. '255 and '256 Exhibit 2160).

Hamamatsu, One-dimensional PSD Plastic package, 1-D PSD with plastic package Datasheet ("1-D PSD Datasheet") (2004), 5 pages. (IPR Nos. '255 and '256 Exhibit 2118).

Hamamatsu, One-Dimensional PSD Webpage, One-dimensional (Mar. 17, 2006), 1 page. (IPR Nos. '255 and '256 Exhibit 2119).

Hamamatsu, Photodiode Technical Information, 18 pages. (IPR Nos. '255 and '256 Exhibit 2129).

Hamamatsu, Position Sensitive Detectors ("PSDs") Webpage, One-dimensional and Two-dimensional (Mar. 17, 2006), 1 page. (IPR Nos. '255 and '256 Exhibit 2117).

Hamamatsu, S4111-46Q Si Photodiode Array Webpage (Oct. 22, 2005), 1 page. (IPR Nos. '255 and '256 Exhibit 2135).

Hamamatsu, Si photodiode array—S4111/S4114 series 16, 35, 46 element Si photodiode array for UV to NIR Datasheet (Jul. 2004), 4 pages. (IPR Nos. '255 and '256 Exhibit 2134).

(56) References Cited

OTHER PUBLICATIONS

Hamamatsu, Silicon Photodiode Array Webpage (Feb. 2, 2006), 1 page. (IPR Nos. '255 and '256 Exhibit 2130).
Hamamatsu, Technical Information, SD-25—Characteristics and use of FFT-CCD area image sensor (Aug. 2003), 27 pages. (IPR Nos. '255 and '256 Exhibit 2126).
Hamamatsu, Technical Information, SD-28—Characteristics and use of Si APD (Avalanche Photodiode) (Aug. 2001), 12 pages. (IPR Nos. '255 and '256 Exhibit 2127).
Hamamatsu, Two-dimensional PSD S1300 Datasheet (Dec. 19, 2005), 1 page. (IPR Nos. '255 and '256 Exhibit 2121).
Hamamatsu, Two-dimensional PSDs S1200, S1300, S1880, S1881, S2044—Non-discrete position sensor utilizing photodiode surface resistance Datasheet (2003), 6 pages. (IPR Nos. '255 and '256 Exhibit 2120).
Hamamatsu, Two-dimensional PSDs Webpage (Mar. 17, 2006), 1 page. (IPR Nos. '255 and '256 Exhibit 2122).
Hamatsu, Opto-Semiconductor Handbook, Si APD, MMPC (Chapter 3), "APD Handbook"), available at https://www.hamamatsu.com/us/en/hamamatsu/overview/bsd/solid_state_division/related_documents.html (2014), 25 pages. (IPR Nos. '255 and '256 Exhibit 2006).
Hancock, "Laser Intensity Based Obstacle Detecting and Tracking" (Jan. 1999), pp. 45-65.
Haran et al., Infrared Reflectivy of Pedestrian Mannequin for Autonomous Emergency Braking Testing, IEEE 19th International Conference on Intelligent Transportation Systems (ITSC) (2016), 6 pages. (IPR Nos. '255 and '256 Exhibit 2168).
Heenan, et al., Feature-Level Map Building and Object Recognition for Intersection Safety Applications, in Advanced Microsystems for Automotive Applications (Jurgen Valldorf and Wolfgang Gessner eds.) (2005), pp. 505-519. (IPR Nos. '255 and '256 Exhibit 2199).
Hergert et al., The WITS$ guide to selecting a photodetector, Hamamatsu.com, https://hub.hamamatsu.com/us/en/technical-note/WITS-guide-detectorselection/index.html (Jul. 2015), 16 pages. (IPR Nos. '255 and '256 Exhibit 2133).
IBEO, "IBEO about," https://web.archive.org/web/20040606111631/http:/www.ibeoas.de:80/html/about/about (2004).
IBEO, "IBEO data and prices," https://web.archive.org/web/20041209025137/http://www.ibeoas.de:80/html/prod/prod_dataprices.html (2004), 2 pages.
IBEO, "IBEO history," https://web.archive.org/web/20040807161657/, http:/www.ibeoas.de:80/html/about/ab_history.html (2004), 1 page.
IBEO, "IBEO LD Multilayer data sheet," https://web.archive.org/web/20031003201743/http://www.ibeoas.de:80/html/prod/prod_Id_multi.html (2003), 1 page.
IBEO, "IBEO Motiv sensor," https://web.archive.org/web/20040113062910/, http://www.ibeoas.de:80/html/rd/rd_rs_motiv.htm (1997-2000), 1 page.
IBEO, "IBEO multilayer tech" (2004), 1 page.
IBEO, "IBEO multitarget capability," https://web.archive.org/web/20040323030746/, http:/www.ibeoas.de:80/html/knho/knho-senstech-mlc.html (2004), 1 page.
IBEO, "IBEO products," https://web.archive.org/web/20040606115118/http:/www.ibeoas.de:80/html/prod/prod.html (2004), 1 page.
IBEO, "IBEO products," https://web.archive.org/web/20041011011528/http://www.ibeoas.de:80/html/prod/prod.html (2004), 1 page.
IBEO, "IBEO publications," https://web.archive.org/web/20031208175052/ http://www.ibeoas.de:80/html/public/public.html (2003), 2 pages.
IBEO, "IBEO roadmap," https://web.archive.org/web/20041209032449/http:/www.ibeoas.de:80/html/prod/prod_roadmap.html (2004), 1 page.
IBEO, "IBEO Time of Flight" (2004), 1 page.
IBEO, "IBEO," https://web.archive.org/web/20040202131331/http:/www.ibeo-as.de:8 (2004), 1 page.
IBEO, IBEO about page, https://web.archive.org/web/20040606111631/http:/www.ibeoas.de:80/html/about/about (Jun. 6, 2004), 1 page. (IPR Nos. '255 and '256 Exhibit 1103).

IBEO, IBEO Alasca, https://web.archive.org/web/20031001091407/http:/www.ibeoas.de:80/html/prod/prod_alasca.html (Oct. 1, 2003), 1 page. (IPR Nos. '255 and '256 Exhibit 1099).
IBEO, IBEO Automobile Sensor GmbH—Scanner Technology webpage (Brennan Deposition Exhibit 1) (Mar. 23, 2004), 1 page. (IPR Nos. '255 and '256 Exhibit 2171).
IBEO, IBEO Automobile Sensor GmbH—The Alasca project webpage (Brennan Deposition Exhibit 2) (Oct. 6, 2003), 1 page. (IPR Nos. '255 and '256 Exhibit 2172).
IBEO, IBEO Available products, https://web.archive.org/web/20041011011528/ http://www.ibeoas.de:80/html/prod/prod.html (Oct. 11, 2004), 1 page. (IPR Nos. '255 and '256 Exhibit 1108).
IBEO, IBEO data sheet re available products, https://web.archive.org/web/20041209025137/http://www.ibeoas.de:80/html/prod/prod_dataprices.html (Dec. 9, 2004), 2 pages. (IPR Nos. '255 and '256 Exhibit 1107).
IBEO, IBEO history, https://web.archive.org/web/20040807161657/http:/www.ibeoas.de:80/html/about/ab_history.html (Aug. 7, 2004), 1 page. (IPR Nos. '255 and '256 Exhibit 1104).
IBEO, IBEO home page, https://web.archive.org/web/20040202131331/http:/www.ibeo-as.de:8 (Feb. 2, 2004), 1 page. (IPR Nos. '255 and '256 Exhibit 1102).
IBEO, IBEO LD Multilayer data sheet, https://web.archive.org/web/20031003201743/http://www.ibeoas.de:80/html/prod/prod_ld_multi.html (Oct. 3, 2003), 1 page. (IPR Nos. '255 and '256 Exhibit 1111).
IBEO, IBEO Motiv sensor, https://web.archive.org/web/20040113062910/ http://www.ibeoas.de:80/html/rd/rd_rs_motiv.htm (Jan. 13, 2004), 1 page. (IPR Nos. '255 and '256 Exhibit 1110).
IBEO, IBEO multilayer tech, (Jan. 8, 2004), 1 page. (IPR Nos. '255 and '256 Exhibit 1097).
IBEO, IBEO multilayer technology page with moving graphic, Archive.org (Jan. 8, 2004), 1 page. (IPR Nos. '255 and '256 Exhibit 1096).
IBEO, IBEO multitarget capability, https://web.archive.org/web/20040323030746/ http:/www.ibeoas.de:80/html/knho/knho_senstech_mlc.html (Mar. 23, 2004), 1 page. (IPR Nos. '255 and '256 Exhibit 1101).
IBEO, IBEO products page, https://web.archive.org/web/20040606115118/ http:/www.ibeoas.de:80/html/prod/prod.html (Jun. 6, 2004), 1 page. (IPR Nos. '255 and '256 Exhibit 1100).
IBEO, IBEO publications page, https://web.archive.org/web/20031208175052/ http://www.ibeoas.de:80/html/public/public.html (Dec. 8, 2003), 2 pages. (IPR Nos. '255 and '256 Exhibit 1109).
IBEO, IBEO Roadmap, https://web.archive.org/web/20041209032449/http:/www.ibeoas.de:80/html/prod/prod_roadmap.html (Dec. 9, 2004), 1 page. (IPR Nos. '255 and '256 Exhibit 1105).
IBEO, IBEO time of flight with moving graphic, (Jan. 8, 2004), 1 page. (IPR Nos. '255 and '256 Exhibit 1095).
IBEO, IBEO Time of Flight, (Jan. 8, 2004), 1 page. (IPR Nos. '255 and '256 Exhibit 1098).
Informed Infrastructure, Velodyne LiDAR Division Announces Agreement with Caterpillar for Laser Imaging Technology, Informed Infrastructure http://informedinfrastructure.com/25630/velodynes-lidar-divisionannounces-agreement-with-caterpillar-for-laser-imaging-technology-2/ (Aug. 8, 2012), 3 pages. (IPR Nos. '255 and '256 Exhibit 2079).
Inter Parties Review Decision Denying Petitioner's Request for Rehearing (May 21, 2020), 26 pages. (IPR No. 2018-00255).
Inter Parties Review Decision: Institution of Inter Partes Review (May 25, 2018), 11 pages. (IPR No. 2018-00255).
Inter Parties Review Decision: Petitioner's Motion to Submit Supplemental Information Pursuant to 37 C.F.R. § 42.123(b) (Aug. 8, 2018), 4 pages. (IPR No. 2018-00255).
Inter Parties Review Declaration of Dr. James F. Brennan III (Nov. 29, 2017), 172 pages. (IPR Nos. '255 and '256 Exhibit 1002).
Inter Parties Review Final Written Decision (May 23, 2019), 40 pages. (IPR No. 2018-00255).
Inter Parties Review Patent Owner's Contingent Motion to Amend (Public Version—Redacted) (Sep. 28, 2018), 56 pages. (IPR No. 2018-00255).
Inter Parties Review Patent Owner's Preliminary Response (Public Version—Redacted) (Mar. 7, 2018), 72 pages. (IPR No. 2018-00255).

(56) References Cited

OTHER PUBLICATIONS

Inter Parties Review Patent Owner's Reply in Support of Its Contingent Motion to Amend (Jan. 16, 2019), 33 pages. (IPR No. 2018-00255).
Inter Parties Review Patent Owner's Response (Public Version—Redacted) (Sep. 28, 2018), 92 pages. (IPR No. 2018-00255).
Inter Parties Review Patent Owner's Surreply (Jan. 16, 2019), 50 pages. (IPR No. 2018-00255).
Inter Parties Review Patent Owner's Updated Exhibit List (Feb. 11, 2019), 21 pages. (IPR No. 2018-00255).
Inter Parties Review Petition for Inter Partes Review of U.S. Pat. No. 7,969,558 (Claims 1-4, 8, and 9) (IPR No. 2018-00255, *Quanergy Systems, Inc.* v. *Velodyne Lidar, Inc.*) (Nov. 29, 2017), 67 pages. (IPR No. 2018-00255).
Inter Parties Review Petitioner Quanergy's Opposition to Patent Owner's Contingent Motion to Amend (Dec. 21, 2018), 35 pages. (IPR No. 2018-00255).
Inter Parties Review Petitioner Quanergy's Sur-Surreply (Jan. 30, 2019), 9 pages. (IPR No. 2018-00255).
Inter Parties Review Petitioner Quanergy's Surreply to Patent Owner's Contingent Motion to Amend (Jan. 30, 2019), 17 pages. (IPR No. 2018-00255).
Inter Parties Review Petitioner's Motion to Submit Supplemental Information Pursuant to 37 C.F.R. § 42.123(b) (Aug. 6, 2018), 16 pages. (IPR No. 2018-00255).
Inter Parties Review Petitioner's Reply to Patent Owner's Response (Dec. 21, 2018), 38 pages. (IPR No. 2018-00255).
Inter Parties Review Petitioner's Request for Rehearing (Jun. 24, 2019), 20 pages. (IPR No. 2018-00255).
Inter Parties Review Petitioner's Unopposed Motion to Submit Replacement Petition and Supplemental Declaration (Nov. 5, 2018), 9 pages. (IPR No. 2018-00255).
Inter Parties Review Petitioner's Updated Exhibit List (Jan. 30, 2019), 13 pages. (IPR No. 2018-00255).
Inter Parties Review Record of Oral Hearing (Feb. 27, 2019), 126 pages. (IPR Nos. 2018-00255 and 2018-00256).
Inter Parties Review Replacement Petition for Inter Partes Review of U.S. Pat. No. 7,969,558 (Claims 1-4, 8, and 9), 71 pages. (IPR No. 2018-00255).
Inter Parties Review, Chris Butler Affidavit and Exhibit (Dec. 18, 2018), 33 pages. (IPR Nos. '255 and '256 Exhibit 1066).
Inter Parties Review, Chris Butler Affidavit and Exhibit (Dec. 20, 2018), 52 pages. (IPR Nos. '255 and '256 Exhibit 1067).
Inter Parties Review, Decision Denying Petitioner's Request for Rehearing (May 21, 2020), 26 pages. (IPR No. 2018-00256).
Inter Parties Review, Decision: Institution of Inter Partes Review (May 25, 2018), 12 pages. (IPR No. 2018-00256).
Inter Parties Review, Decision: Petitioner's Motion to Submit Supplemental Information Pursuant to 37 C.F.R. § 42.123(b) (Aug. 8, 2018), 4 pages. (IPR No. 2018-00256).
Inter Parties Review, Declaration of Dr. Sylvia Hall-Ellis (Nov. 29, 2017), 93 pages. (IPR Nos. '255 and '256 Exhibit 1041).
Inter Parties Review, Declaration of J. Gary Eden, Ph.D. In Support of Patent Owner's Preliminary Responses (Public Version—Redacted) (Mar. 7, 2018), 120 pages. (IPR Nos. '255 and '256 Exhibit 2003).
Inter Parties Review, Declaration of J. Gary Eden, Ph.D. In Support of Patent Owner's Reply in Support of Its Motion to Amend (Jan. 16, 2019), 71 pages. (IPR Nos. '255 and '256 Exhibit 2202).
Inter Parties Review, Declaration of J. Gary Eden, Ph.D. In Support of Patent Owner's Responses and Motions to Amend (Public Version—Redacted) (Sep. 27, 2018), 202 pages. (IPR Nos. '255 and '256 Exhibit 2115).
Inter Parties Review, Declaration of James F. Brennan, III in Support of Petitioner's Replies and Oppositions to Motions to Amend (Dec. 21, 2018), 93 pages. (IPR Nos. '255 and '256 Exhibit 1063).
Inter Parties Review, Declaration of Sylvia Hall-Ellis (Dec. 21, 2018), 146 pages. (IPR Nos. '255 and '256 Exhibit 1065).
Inter Parties Review, Defendant Velodyne's Answer and Counterclaim, *Quanergy Systems, Inc.*, v. *Velodyne Lidar, Inc.*, No. 5:16-cv-05251-EJD (N.D. Cal.) ECF No. 36 (Dec. 5, 2016), 56 pages. (IPR Nos. '255 and '256 Exhibit 2080).
Inter Parties Review, Deposition of James F. Brennan, III, *Quanergy Systems, Inc.* v. *Velodyne Lidar, Inc.*, Nos. IPR2018-00255 and IPR2018-00256 (Aug. 23, 2018), 241 pages. (IPR Nos. '255 and '256 Exhibit 2156).
Inter Parties Review, Deposition of James F. Brennan, III, *Quanergy Systems, Inc.* v. *Velodyne Lidar, Inc.*, Nos. IPR2018-00255 and IPR2018-00256 (Jan. 4, 2019), 267 pages. (IPR Nos. '255 and '256 Exhibit 2194).
Inter Parties Review, Deposition Transcript of J. Gary Eden, Ph.D (taken Nov. 27, 2018), 285 pages. (IPR Nos. '255 and '256 Exhibit 1064).
Inter Parties Review, Deposition Transcript of J. Gary Eden, Ph.D (taken on Jan. 22, 2019), 368 pages. (IPR Nos. '255 and '256 Exhibit 1150).
Inter Parties Review, Eden Deposition Exhibit 1—Unmanned Vehicles Come of Age: The DARPA Grand Challenge (2006), pp. 26-29. (IPR Nos. '255 and '256 Exhibit 1151).
Inter Parties Review, Eden Deposition Exhibit 10—Are processor algorithms key to safe self-driving cars?—EDN Asia (https: //www.ednasia.com/ news /article/areprocessor-algorithms-key-to-safe-self-driving-cars) (Jul. 7, 2016), 7 pages. (IPR Nos. '255 and '256 Exhibit 1160).
Inter Parties Review, Eden Deposition Exhibit 11—Steve Taranovich's profile (https://www.edn.com/user/steve.taranovich) (Jan. 22, 2019), 4 pages. (IPR Nos. '255 and '256 Exhibit 1161).
Inter Parties Review, Eden Deposition Exhibit 12—Instrumentation and Control (http://www.Instrumentation.co.za /article.aspx?pklarticleid=1664) (Feb. 2002), 4 pages. (IPR Nos. '255 and '256 Exhibit 1162).
Inter Parties Review, Eden Deposition Exhibit 13—IBEO on board: ibeo LUX 4L / ibeo LUX 8L / ibeo LUX HD Data Sheet (Jul. 2017), 2 pages. (IPR Nos. '255 and '256 Exhibit 1163).
Inter Parties Review, Eden Deposition Exhibit 2—Driver Reaction Time in Crash Avoidance Research: validation of a Driving Simulator Study on a Test Track; Article in Human Factors and Ergonomics Society Annual Meeting Proceedings, Jul. 2000, 5 pages. (IPR Nos. '255 and '256 Exhibit 1152).
Inter Parties Review, Eden Deposition Exhibit 3—Axis of Rotation diagram (Jan. 22, 2019), 1 page. (IPR Nos. '255 and '256 Exhibit 1153).
Inter Parties Review, Eden Deposition Exhibit 4—Parallel Line and Plane—from Wolfram MathWorld (http://mathworld.wolfram.com/ParallelLineandPlane.html) (Jan. 22, 2019), 1 page. (IPR Nos. '255 and '256 Exhibit 1154).
Inter Parties Review, Eden Deposition Exhibit 5—Quasi-3D Scanning with Laserscanners: Introduction from 2D to 3D (2001), 7 pages. (IPR Nos. '255 and '256 Exhibit 1155).
Inter Parties Review, Eden Deposition Exhibit 6—L-Gage LT3 Long-Range Time-of-Flight Laser Distance-Gauging Sensors (2002), 12 pages. (IPR Nos. '255 and '256 Exhibit 1156).
Inter Parties Review, Eden Deposition Exhibit 7—About Ibeo: Our Mission (https://www.ibeoas.com/aboutibeo) (Jan. 21, 2019), 10 pages. (IPR Nos. '255 and '256 Exhibit 1157).
Inter Parties Review, Eden Deposition Exhibit 8—Automotive Industry; Explore Our Key Industries (https://velodynelidar.com/industry.html) (2019), 6 pages. (IPR Nos. '255 and '256 Exhibit 1158).
Inter Parties Review, Eden Deposition Exhibit 9—Leddar Tech, Solid-State LiDARs: Enabling the Automotive Industry Towards Autonomous Driving (2018), 6 pages. (IPR Nos. '255 and '256 Exhibit 1159).
Inter Parties Review, Excerpt from Beautiful Data, Edited by Toby Segaran and Jeff Hammerbacher (Jul. 2009), pp. 150-153. (IPR Nos. '255 and '256 Exhibit 2014).
Inter Parties Review, Excerpt from James T. Luxon and David E. Parker, Industrial Lasers and Their Applications, Prentice-Hall (1985), pp. 56, 68-70, 124-125, 145, 150-151, and 154-159. (IPR Nos. '255 and '256 Exhibit 2009).

(56) References Cited

OTHER PUBLICATIONS

Inter Parties Review, Excerpt from Peter W. Milonni and Joseph Eberly, Lasers (1988), pp. 585-589. (IPR Nos. '255 and '256 Exhibit 2011).
Inter Parties Review, Excerpt from Raymond T. Measures, Laser Remote Sensing, Fundamentals and Applications (1992), pp. 205 and 213-214. (IPR Nos. '255 and '256 Exhibit 2010).
Inter Parties Review, Excerpt from Stephan Lugomer, Laser Technology, Laser Driven Processes, Prentice-Hall (1990), pp. 302-311. (IPR Nos. '255 and '256 Exhibit 2008).
Inter Parties Review, Excerpt from William V. Smith, Laser Applications (1970), pp. 23-27. (IPR Nos. '255 and '256 Exhibit 2012).
Inter Parties Review, Excerpts of Deposition of Craig L. Glennie, Ph.D., *Quanergy Systems, Inc.*, v. *Velodyne Lidar, Inc.*, No. 5:16-cv-05251-EJD (N.D. Cal.) (Jun. 27, 2017), 6 pages. (IPR Nos. '255 and '256 Exhibit 2016).
Inter Parties Review, Final Written Decision (May 23, 2019), 41 pages. (IPR No. 2018-00256).
Inter Parties Review, Images of Generator Rotors (Brennan Deposition Exhibit 8) (2018), 2 pages. (IPR Nos. '255 and '256 Exhibit 2178).
Inter Parties Review, Listing of Labelled Substitute Claims (2018), 17 pages. (IPR Nos. '255 and '256 Exhibit 1076).
Inter Parties Review, Patent Owner's Contingent Motion to Amend (Public Version—Redacted) (Sep. 28, 2018), 57 pages. (IPR No. 2018-00256).
Inter Parties Review, Patent Owner's Preliminary Response (Public Version—Redacted) (Mar. 7, 2018), 73 pages. (IPR No. 2018-00256).
Inter Parties Review, Patent Owner's Reply in Support of Its Contingent Motion to Amend (Jan. 16, 2019), 33 pages. (IPR No. 2018-00256).
Inter Parties Review, Patent Owner's Response (Public Version—Redacted) (Sep. 28, 2018), 92 pages. (IPR No. 2018-00256).
Inter Parties Review, Patent Owner's Surreply (Jan. 16, 2019), 50 pages. (IPR No. 2018-00256).
Inter Parties Review, Patent Owner's Updated Exhibit List (Feb. 11, 2019), 20 pages. (IPR No. 2018-00256).
Inter Parties Review, Petition for Inter Partes Review of U.S. Pat. No. 7,969,558 (Claims 16-19 and 23-25) (IPR No. 2018-00256, *Quanergy Systems, Inc.* v. *Velodyne Lidar, Inc.*) (Nov. 29, 2017), 73 pages. (IPR No. 2018-00256).
Inter Parties Review, Petitioner Quanergy's Opposition to Patent Owner's Contingent Motion to Amend (Dec. 21, 2018), 35 pages. (IPR No. 2018-00256).
Inter Parties Review, Petitioner Quanergy's Sur-Surreply (Jan. 30, 2019), 9 pages. (IPR No. 2018-00256).
Inter Parties Review, Petitioner Quanergy's Surreply to Patent Owner's Contingent Motion to Amend (Jan. 30, 2019), 17 pages. (IPR No. 2018-00256).
Inter Parties Review, Petitioner's Motion to Submit Supplemental Information Pursuant to 37 C.F.R. § 42.123(b) (Aug. 6, 2018), 16 pages. (IPR No. 2018-00256).
Inter Parties Review, Petitioner's Reply to Patent Owner's Response (Dec. 21, 2018), 37 pages. (IPR No. 2018-00256).
Inter Parties Review, Petitioner's Request for Rehearing (Jun. 24, 2019), 20 pages. (IPR No. 2018-00256).
Inter Parties Review, Petitioner's Unopposed Motion to Submit Replacement Petition and Supplemental Declaration (Nov. 5, 2018), 9 pages. (IPR No. 2018-00256).
Inter Parties Review, Petitioner's Updated Exhibit List (Jan. 30, 2019), 15 pages. (IPR No. 2018-00256).
Inter Parties Review, Ptab Conference Call, *Quanergy Systems, Inc.* v. *Velodyne Lidar, Inc.*, Nos. IPR2018-00255 and 2018-00256 (Jan. 11, 2019), 27 pages. (IPR Nos. '255 and '256 Exhibit 2204).
Inter Parties Review, Quanergy Invalidity Contentions Claim Chart, U.S. Pat. No. 7,969,558 (Mizuno), *Quanergy Systems, Inc.* v. *Velodyne LiDAR, Inc.*, Case No. 5:16-cv-5251-EJD (Mar. 27, 2017), 17 pages. (IPR Nos. '255 and '256 Exhibit 1127).
Inter Parties Review, Quanergy Invalidity Contentions Claim Chart, U.S. Pat. No. 7,969,558 (Pilar), *Quanergy Systems, Inc.* v. *Velodyne LiDAR, Inc.*, Case No. 5:16-cv-5251-EJD (Mar. 27, 2017), 13 pages. (IPR Nos. '255 and '256 Exhibit 1128).
Inter Parties Review, Quanergy M8 Lidar Sensor Datasheet, 2 pages. (IPR Nos. '255 and '256 Exhibit 2071).
Inter Parties Review, Quanergy Systems Inc.'s Invalidity Contentions and Production of Documents Pursuant to Patent Local Rules 3-3 and 3-4, *Quanergy Systems, Inc.* v. *Velodyne LiDAR, Inc.*, Case No. 5:16-cv-5251-EJD (Mar. 27, 2017), 24 pages. (IPR Nos. '255 and '256 Exhibit 1126).
Inter Parties Review, Quanergy's Objected-to Demonstrative Slides of Patent Owner (2019), 16 pages. (IPR Nos. '255 and '256 Exhibit 1164).
Inter Parties Review, Redlined Supplemental Declaration of Dr. James F. Brennan III (2018), 171 pages. (IPR Nos. '255 and '256 Exhibit 1062).
Inter Parties Review, Replacement Petition for Inter Partes Review of U.S. Pat. No. 7,969,558 (Claims 16-19 and 23-25) (2018) 76 pages. (IPR No. 2018-00256).
Inter Parties Review, Transcript of Sep. 13, 2018 Conference Call, *Quanergy Systems, Inc.* v. *Velodyne Lidar, Inc.*, Nos. IPR2018-00255 and IPR2018-00256 (Sep. 13, 2018), 21 pages. (IPR Nos. '255 and '256 Exhibit 2116).
International Electrotechnical Commission, "Safety of laser products—part 1: equipment classification and requirements," International Standard IEC 60825-1, edition 1.2 (Aug. 2001), 122 pages.
International Electrotechnical Commission, "Safety of laser products—part 1: equipment classification and requirements," International Standard IEC 60825-1, edition 2.0 (2007), 104 pages.
Internet Archive Web Page: Laser Components (2004), 1 page. (IPR Nos. '255 and '256 Exhibit 1023).
Internet Archive Web Page: Laser Components: High Powered Pulsed Laser Diodes 905D3J08-Series (2004), 6 pages. (IPR Nos. '255 and '256 Exhibit 1024).
Internet Archive Webpage: Mercotac 3-Conductor Rotary Electrical Connectors (Mar. 2006), 1 page. (IPR Nos. '255 and '256 Exhibit 1031).
IPO Education Foundation, Inventor of the Year Award, https://www.ipoef.org/inventor-of-the-year/ (2018), 5 pages. (IPR Nos. '255 and '256 Exhibit 2207).
irdajp.org, IrDA Infrared Data Association, http://www.irdajp.org/irdajp.info (2018), 3 pages. (IPR Nos. '255 and '256 Exhibit 1134).
Janocha, Actuators: Basics and Applications, Springer (2004), pp. 85-153. (IPR Nos. '255 and '256 Exhibit 1080).
Japanese Patent Office, Petitioner's Translation of Mizuno Japanese Patent Publication No. H3-6407 (1991), 15 pages. (IPR Nos. '255 and '256 Exhibit 1058).
Jelalian, "Laser Radar Systems" (1992), 1 page.
Juberts, et al., "Status report on next generation LADAR for driving unmanned ground vehicles" Mobile Robots XVII, edited by Douglas W. Gage, Proceedings of SPIE, vol. 5609, 2004, pp. 1-12.
Kaempchen, Feature-Level Fusion of Laser Scanner and Video Data for Advanced Drive Assistance Systems (Ph.D. Dissertation, Ulm University) (2007), 248 pages. (IPR Nos. '255 and '256 Exhibit 2198).
Kaufmann, Choosing Your Detector, OE Magazine (Mar. 2005), 3 pages. (IPR Nos. '255 and '256 Exhibit 2150).
Kaufmann, Light Levels and Noise—Guide Detector Choices, Photonics Spectra 149 (Jul. 2000), 4 pages. (IPR Nos. '255 and '256 Exhibit 2151).
Kawata, "Development of ultra-small lightweight optical range sensor system", 2005 IEEE/RSJ International Conference on Intelligent Robots and Systems, Edmonton, AB, Canada, Aug. 2-6, 2005, pp. 58-63 (IPR Nos. '255 and '256 Exhibit 1033).
Kilpela, Excerpt of Pulsed Time-of-Flight Laser Range Finder Techniques for Fast, High Precision Measurement Applications, at Fig. 24 (Academic dissertation, University of Oulu (Brennan Deposition Exhibit 15) (2004), 1 page. (IPR Nos. '255 and '256 Exhibit 2185).

(56) References Cited

OTHER PUBLICATIONS

Kilpela, Pulsed Time-of-Flight Laser Range Finder Techniques for Fast, High Precision Measurement Applications (Academic dissertation, University of Oulu) (2004), 98 pages. (IPR Nos. '255 and '256 Exhibit 2152).

Kilpelä, "Precise pulsed time-of-flight laser range finder for industrial distance measurements," Review of Scientific Instruments (Apr. 2001), 13 pages. (IPR Nos. '255 and '256 Exhibit 1005).

Kluge, Laserscanner for Automotive Applications (May 2001), 5 pages. (IPR Nos. '255 and '256 Exhibit 2196).

Kohanbash, "LIDAR fundamentals—robots for roboticists" (May 5, 2014), 6 pages.

Lages, Laserscanner for Obstacle Detection in Advanced Microsystems for Automotive Applications Yearbook (S. Kruger et al. eds.) (2002), pp. 136-140. (IPR Nos. '255 and '256 Exhibit 2200).

Lamon, "The SmarTer for ELROB 2006—a vehicle for fully autonomous navigation and mapping in outdoor environments" (2005), 14 pages.

Langheim, et al., Sensing of Car Environment at Low Speed Driving, Carsense (2002), 14 pages. (IPR Nos. '255 and '256 Exhibit 2193).

Laser Components Produkte, Laser Components IG, Inc., 2004, 1 page.

Laser Components, "High Power Pulsed Laser Diodes 905D3J08-Series", Laser Components IG, Inc., 2004, 6 pages.

Laser Components, https:/web.archive.org/web/20041205172904/http:www.lasercomponents.com (2004), 1 page. (IPR Nos. '255 and '256 Exhibit 1023).

Liu, et al., "Coupling Study of a Rotary Capacitive Power Transfer System" Industrial Technology, 2009. ICIT 2009. IEEE International Conference, IEEE, Piscataway, NJ, USA, Feb. 10, 2009, pp. 1-6.

Maatta et al., a High-Precision Time-to-Digital Converter for Pulsed Time-of-Flight Laser Radar Applications, 47 IEEE No. 2, 521 (Apr. 1998), pp. 521-536. (IPR Nos. '255 and '256 Exhibit 2161).

Macadam, Understanding and Modeling the Human Driver, 40 Vehicle System Dynamics, Nos. 1-3 (2003), pp. 101-134. (IPR Nos. '255 and '256 Exhibit 2205).

Makynen, Position-Sensitive Devices and Sensor System for Optical Tracking and Displacement Sensing Applications (Academic Dissertation, University of Oulu (2000), 121 pages. (IPR Nos. '255 and '256 Exhibit 2153).

Manandhar, "Auto-Extraction of Urban Features from Vehicle-Borne Laser Data", Centre for Spatial Information Science, The University of Tokyo, Japan; Symposium on Geospatial Theory, Processing Applications, Ottawa (2002) 6 pages. (IPR Nos. '255 and '256 Exhibit 1017).

Marino, "A compact 3D imaging laser RADAR system using Geiger-mode APD arrays: system and measurements," Proceedings of SPIE—The international society for optical engineering (Aug. 2003), 16 pages.

Marino, "Jigsaw: A Foliage-Penetrating 3D Imaging Laser Radar System" (2005), pp. 23-36.

McManamon, "Optical Phased Array Technology," Proceedings of the IEEE, vol. 84, No. 2 (Feb. 1996), pp. 268-298.

Melle, et al., "How to select avalanche photodiodes," Laser Focus World (Oct. 1, 1995), 9 pages. (IPR Nos. '255 and '256 Exhibit 1020).

Mercotac Model 305, Electrical Slip Rings, https://web.archive.org/web/200602100652519/www.mercotac.com/html/305.htm (Feb. 2006), 3 pages.

Mercotac, 3-Conductor Rotary Electrical Connectors https://web.archive.org/web/20060317120209/http://www.mercotac.com:80/html/threeconductor.html (Mar. 2006), 1 page.

Merriam, How to Use Lidar with the raspberry PI, Hackaday, https://hackaday.com/2016/01/22/how-to-use-lidar-with-the-raspberry-pi/ (Jan. 22, 2016), 13 pages. (IPR Nos. '255 and '256 Exhibit 1072).

Morsy et al., "Multispectral LiDAR Data for Land Cover Classification of Urban Areas," Sensors 17(5), 958 (2017), 21 pages.

MTI Instruments Inc., An Introduction to Laser Triangulation Sensors, https://www.azosensors.com/article.aspx?ArticleID=523 (Aug. 28, 2014), 9 pages. (IPR Nos. '255 and '256 Exhibit 2154).

Nagappan, "Adaptive Cruise Control: Laser Diodes as an Alternative to Millimeter Wave Radars" (Sep. 2005), pp. 1-5.

National Highway Traffic Safety Administration (NHTSA), DOT, Final Rule Federal Motor Vehicle Safety Standards; Tire Pressure Monitoring Systems Controls and Displays (2005), 222 pages. (IPR Nos. '255 and '256 Exhibit 1141).

Office of the Federal Register National Archives and Records Administration, "Code of Federal Regulations, 21, Parts 800 to 1299, Revised as of Apr. 1, 2005, Food and Drugs", Apr. 1, 2005, pp. 1-23.

Ogurtsov, et al., "High Accuracy ranging with Yb3+-doped fiber-ring frequency-shifted feedback laser with phase-modulated seed," Optics Communications (2006), pp. 266-273. (IPR Nos. '255 and '256 Exhibit 1042).

Ohnsman, How a 34-Year-Old Audio Equipment Company is Leading the Self-Driving Car Revolution, Forbes (Aug. 8, 2017), 7 pages. (IPR Nos. '255 and '256 Exhibit 2040).

Ohr, "War raises stakes of next DARPA bot race," EDN (Aug. 15, 2005), 3 pages.

Omron, Technical Explanation for Displacement Sensors and Measurement Sensors, CSM_Displacemente_LineWidth_TG_E_2_1 (2018), 8 pages. (IPR Nos. '255 and '256 Exhibit 2149).

Oshkosh, "Team Terramax: DARPA Grand Challenge 2005" (Oct. 2005), pp. 1-14.

Ou-Yang, et al., "High-dynamic-range laser range finders based on a novel multimodulated frequency method," Optical Engineering (Dec. 2006), 6 pages. (IPR Nos. '255 and '256 Exhibit 1043).

Overton, First Sensor expands supply agreement for APDs used in Velodyne lidar systems, Laser Focus World (Feb. 15, 2017), 2 pages. (IPR Nos. '255 and '256 Exhibit 2039).

Ozguner, "Team TerraMax and the Darpa Grand Challenge: a General Overview," IEEE Intelligent Vehicles Symposium (2004), 6 pages.

Panasonic, Measurement Sensors: Specular vs Diffuse, Panasonic Blog, https://na.industrial.panasonic.com/blog/measurement-sensorsspecular-vs-diffuse (Dec. 7, 2011), 2 pages. (IPR Nos. '255 and '256 Exhibit 2155).

PCT International Search Report and Written Opinion, App. No. PCT/US2007/073490, (2008), 10 pages.

PCT International Search Report and Written Opinion, App. No. PCT/US2010/037129, dated Jul. 27, 2010, 6 pages.

PCT International Search Report and Written Opinion, App. No. PCT/US2017/015869, dated Apr. 10, 2017, 12 pages.

PCT International Search Report and Written Opinion, App. No. PCT/US2017/015874, dated May 23, 2017, 12 pages.

PCT International Search Report and Written Opinion, App. No. PCT/US2017/015877, dated Apr. 13, 2017, 13 pages.

PCT International Search Report and Written Opinion, App. No. PCT/US2017/023259, dated May 31, 2017, 10 pages.

PCT International Search Report and Written Opinion, App. No. PCT/US2017/023261, dated May 26, 2017, 11 pages.

PCT International Search Report and Written Opinion, App. No. PCT/US2017/023262, dated Jun. 5, 2017, 9 pages.

PCT International Search Report and Written Opinion, App. No. PCT/US2017/035427, dated Aug. 29, 2017, 10 pages.

PCT International Search Report and Written Opinion, App. No. PCT/US2017/036865, dated Sep. 26, 2017, 10 pages.

PCT International Search Report and Written Opinion, App. No. PCT/US2017/047543, dated Nov. 27, 2017, 11 pages.

PCT International Search Report and Written Opinion, App. No. PCT/US2018/023283, dated Jun. 1, 2018, 9 pages.

PCT International Search Report and Written Opinion, App. No. PCT/US2018/025395, dated Jun. 25, 2018, 14 pages.

PCT International Search Report and Written Opinion, App. No. PCT/US2018/031682, dated Sep. 17, 2018, 12 pages.

PCT International Search Report and Written Opinion, App. No. PCT/US2018/050934, dated Nov. 20, 2018, 10 pages.

PCT International Search Report and Written Opinion, App. No. PCT/US2018/051497, dated Nov. 28, 2018, 11 pages.

(56) References Cited

OTHER PUBLICATIONS

PCT International Search Report and Written Opinion, App. No. PCT/US2018/059062, dated Jan. 16, 2019, 6 pages.
PCT International Search Report and Written Opinion, App. No. PCT/US2018/059452, dated Jan. 16, 2019, 12 pages.
PCT International Search Report and Written Opinion, App. No. PCT/US2019/016259, dated Apr. 26, 2019, 6 pages.
PCT International Search Report and Written Opinion, App. No. PCT/US2019/046412, dated Jun 24, 2020, 10 pages.
PCT International Search Report and Written Opinion, App. No. PCT/US2019/046419, dated Oct 29, 2019, 14 pages.
PCT International Search Report and Written Opinion, App. No. PCT/US2019/046422, dated Dec. 3, 2019, 9 pages.
PCT International Search Report and Written Opinion, App. No. PCT/US2019/046573, dated Nov. 15, 2019, 9 pages.
PCT International Search Report and Written Opinion, App. No. PCT/US2019/051729, dated Nov. 20, 2019, 7 pages.
PCT Search Report and Written Opinion (Corrected), App. No. PCT/US2020/026925, dated May 12, 2020, 5 pages.
PCT Search Report and Written Opinion, App. No. PCT/US2020/012633, dated Jun. 2, 2020, 13 pages.
PCT Search Report and Written Opinion, App. No. PCT/US2020/012635, dated Jun. 4, 2020, 10 pages.
Piatek et al., LiDAR: A photonics guide to autonomous vehicle market, Hamamatsu.com, https://hub.hamamatsu.com/us/en/application-note/LiDAR-competingtechnologies-automotive/index.html (Nov. 18, 2017), 6 pages. (IPR Nos. '255 and '256 Exhibit 2136).
Piatek, Measuring distance with light, Hamamatsu.com, https://hub.hamamatsu.com/us/en/application-note/measuringdistance-with-light/index.html (Apr. 2, 2015), 18 pages. (IPR Nos. '255 and '256 Exhibit 2132).
Piatek, Presentation entitled 'LiDAR and Other Techniques—Measuring Distance with Light for Automotive Industry', authored by Slawomir Piatek, Technical Consultant, Hamamatsu Corp. (Dec. 6, 2017), 66 pages. (IPR Nos. '255 and '256 Exhibit 2131).
Popper, Guiding Light, The Billion-Dollar Widget Steering the Driverless Car Industry, The Verge (Oct. 18, 2017), 17 pages. (IPR Nos. '255 and '256 Exhibit 2076).
Qing, "Method of 3D visualization using laser radar on board of mobile robot," Journal of Jilin University (Information Science Ed.), vol. 22 (Jul. 2004), 4 pages.
*Quanergy Systems, Inc.* v. *Velodyne LiDAR, Inc.* (N.D. Cal.), Case No. 5:16-cv-05251, "Plaintiff Quanergy Systems, Inc.'s Amended Invalidity Contentions Pursuant to Patent Local Rule 3-3," May 23, 2017, 238 pages.
*Quanergy Systems, Inc.* v. *Velodyne LiDAR, Inc.* (N.D. Cal.), Case No. 5:16-cv-05251, "Plaintiff Quanergy Systems, Inc.'s Invalidity Contentions and Production of Documents Pursuant to Patent Local Rules 3-3 and 3-4," Mar. 27, 2017, 24 pages.
*Quanergy Systems, Inc.* v. *Velodyne LiDAR, Inc.* (N.D. Cal.), Case No. 5:16-cv-05251, Amended Complaint, Nov 18, 2016, 6 pages.
*Quanergy Systems, Inc.* v. *Velodyne LiDAR, Inc.* (N.D. Cal.), Case No. 5:16-cv-05251, Answer to Counterclaim, (Jan. 16, 2017) 9 pages.
*Quanergy Systems, Inc.* v. *Velodyne LiDAR, Inc.* (N.D. Cal.), Case No. 5:16-cv-05251, Defendant Velodyne's Answer and Counterclaim, Dec. 5, 2016, 20 pages.
*Quanergy Systems, Inc.* v. *Velodyne LiDAR, Inc.* (N.D. Cal.), Complaint, Case No. 5:16-cv-05251 (Sep. 13, 2016), 21 pages.
Ramsey et al., Use Scenarios to Plan for Autonomous Vehicle Adoption, Gartner (Jun. 26, 2017), 17 pages. (IPR Nos. '255 and '256 Exhibit 2064).
Reutebuch, "LiDAR: an Emerging Tool for Multiple Resource Inventory," Journal of Forestry (Sep. 2005) 7 pages.
Reymann et al., Improving LiDAR Point Cloud Classification using Intensities and Multiple Echoes, IEE/RSJ International Conference on Intelligent Robots and Systems (Sep. 2015), 8 pages. (IPR Nos. '255 and '256 Exhibit 2167).
Richmond et al., Polarimetric Imaging Laser Radar (PILAR) Program. In Advanced Sensory Payloads for UAV, Meeting Proceedings RTO-MP-SET-092, Paper 19. Neuilly-sur-Seine, France: RTO (May 1, 2005), 35 pages. (IPR Nos. '255 and '256 Exhibit 1129).
RIEGL LMS-Q120, http://web.archive.org/web/20050113054822/http:/www.riegl.com/industrial_scanners_/lms_q120_/q120_all_.htm (2005), 4 pages.
Riegl, "Riegl LMS-Z210" (2003), 8 pages.
Robots for Roboticists, Lidar Fundamentals, http://robotsforroboticists.com/lidar-fundamentals/ (May 5, 2014), 6 pages. (IPR Nos. '255 and '256 Exhibit 1068).
Ros-Drivers—Error in packet rate for the VLP-32C #142, GitHub Forum (Jan. 29, 2018), 1 page. (IPR Nos. '255 and '256 Exhibit 2041).
Saleh, "Fundamentals of Photonics" vol. 2, Wiley-Interscience Publication, 1991, pp. 342-383, 494-541, and 592-695. (IPR Nos. '255 and '256 Exhibit 1008).
Search Report and Opinion, EP App. No. 07840406.8, dated Sep. 8, 2009, 6 pages.
Search Report and Opinion, EP App. No. 11166432.2, dated Jul. 28, 2011, 7 pages.
Search Report and Opinion, EP App. No. 17745112.7, dated Aug. 27, 2019, 8 pages.
Search Report and Opinion, EP App. No. 17770748.6, dated Oct. 22, 2019, 10 pages.
Search Report and Opinion, EP App. No. 17770926.8, dated Oct. 29, 2019, 11 pages.
Search Report and Opinion, EP App. No. 17770928.4, dated Oct. 29, 2019, 10 pages.
Search Report and Opinion, EP App. No. 17807474.6, dated Dec. 9, 2019, 9 pages.
Sensick, "DME 2000 / DME 3000: Precise non-contact distance determination," Sensick Catalogue (2006), pp. 450-457. (IPR Nos. '255 and '256 Exhibit 1073).
Sick DME 2000 Operating Instructions (Excerpt) (Brennan Deposition Exhibit 9) (May 2002), 42 pages. (IPR Nos. '255 and '256 Exhibit 2179).
Sick Laser Triangulation Sensors Product Information (Brennan Deposition Exhibit 6) (Jun. 25, 2018), 76 pages. (IPR Nos. '255 and '256 Exhibit 2176).
Sick LMS 200/ LMS 211/ LMS 220 / LMS 221/ LMS 291 Laser Measurement Systems Technical Description (Brennan Deposition Exhibit 4) (Jun. 2003), 40 pages. (IPR Nos. '255 and '256 Exhibit 2174).
Sick LMS200/211/221/291 Laser Measurement Systems—Technical Description (Brennan Deposition Exhibit 3) (2006), 48 pages. (IPR Nos. '255 and '256 Exhibit 2173).
Sick Sensick Measuring Distance with Light—Distance Sensors Product Overview (Brennan Deposition Exhibit 10) (2004), 12 pages. (IPR Nos. '255 and '256 Exhibit 2180).
Sick, Sick ToF sensors at close range, https://web.archive.org/web/20040607070720/ http:/www.sick.de:80/de/products/categories/industrial/distancesensors/dme2000/en.html (Jun 7, 2004), 2 pages. (IPR Nos. '255 and '256 Exhibit 1082).
Singh, "Cyclone: A Laser Scanner for Mobile Robot Navigation" (Sep. 1991), pp. 1-18.
Skolnik, "Introduction to radar systems," Second edition, McGraw-Hill book company (1980), pp. 1-3.
Skolnik, "Radar Handbook" Second Edition, McGraw-Hill Publishing Company, 1990, pp. 1-1191.
Song et al., Assessing the Possibility of Land-Cover Classification Using LiDAR Intensity Data, Commission III, PCV02 (2002), 4 pages. (IPR Nos. '255 and '256 Exhibit 2169).
Spies, "Extended Eyes—Sense and Avoid," Presented at the 2006 International Aerospace Exhibition, Berlin (May 2006), 22 pages.
Stone, "Performance analysis of next-generation LADAR for manufacturing, construction, and mobility" (May 2004), 198 pages.
Strang, Drawing of cross-section of I-beam by Jonathan Strang (Brennan Deposition Exhibit 5), (2018) 1 page. (IPR Nos. '255 and '256 Exhibit 2175).
STRATA-GEE.COM, Velodyne President Calls Strata-gee to Set the Record Straight, https://www.strata-gee.com/velodyne-president-calls-strata-gee-setrecord-straight/ (Jun. 26, 2014), 6 pages. (IPR Nos. '255 and '256 Exhibit 1137).

(56) References Cited

OTHER PUBLICATIONS

Strawa et al., The Measurement of Aerosol Optical Properties Using Continuous Wave Cavity Ring-Down Techniques, 20 Journal of Atmospheric and Oceanic Technology 454 (Apr. 2003), pp. 454-465. (IPR Nos. '255 and '256 Exhibit 2090).
Tarakanov, et al., "Picosecond pulse generation by internal gain switching in laser diodes," Journal of Applied Physics 95:223 (Mar. 2004), pp. 2223-2229. (IPR Nos. '255 and '256 Exhibit 1044).
Taranovich, Are processor algorithms key to safe self-driving cars? EDN Asia, https://www.ednasia.com/news/article/are-processor-algorithms-key-tosafe-self-driving-cars (Jul. 7, 2016), 11 pages. (IPR Nos. '255 and '256 Exhibit 2206).
Taylor, An Introduction to Error Analysis—The Study of Uncertainties in Physical Measurements, Oxford University Press (1982), pp. 81-137. (IPR Nos. '255 and '256 Exhibit 1138).
The American Heritage Dictionary of the English Language, Houghton Mifflin Company, 3d ed. (1996), pp. 1497, 1570, 1697, 1762, and 1804. (IPR Nos. '255 and '256 Exhibit 1018).
The American Society of Mechanical Engineers, Welded and Seamless Wrought Steel Pipe, ASME B36.10M-2004 (Oct. 25, 2004), 26 pages. (IPR Nos. '255 and '256 Exhibit 2138).
The Laser Institute of America, "American National Standard of Safe Use of Lasers" ANSI Z136.1-2000, Revision of ANSI Z136.1-1993, Second Printing 2003, 32 pages.
Thin Lens Equation, http://hyperphysics.phyastr.gsu.edu/hbase/geoopt/lenseq.html (last visited Dec. 30, 2018) (Brennan Deposition Exhibit 7), 4 pages. (IPR Nos. '255 and '256 Exhibit 2177).
Thomas, "A procedure for multiple-pulse maximum permissible exposure determination under the Z136.1-2000 American national standard for safe use of lasers," Journal of Laser Applications, Aug. 2001, vol. 13, No. 4, pp. 134-140.
Thrun, "Probabilistic Terrain Analysis for High-Speed Desert Driving" (Oct. 2005), 7 pages.
Trepagnier, "Team gray technical paper," DARPA grand challenge 2005 (Aug. 28, 2005), 14 pages.
Turk, et al., VITS—A Vision System for Autonomous Land Vehicle Navigation, 10 IEEE No. 3 (May 1988), pp. 342-361. (IPR Nos. '255 and '256 Exhibit 2147).
U.S. District Court, Claim Construction Order, *Quanergy Systems, Inc.* v. *Velodyne LiDAR, Inc.*, Case No. 5:16-cv-5251-EJD (Oct. 4, 2017), 33 pages. (IPR Nos. '255 and '256 Exhibit 1027).
U.S. International Trade Commission, Investigation No. 337-TA-1173, "Respondent Hesai Photonics Technology Co., Ltd.'s Notice of Prior Art," Nov. 13, 2019, 35 pages.
U.S. International Trade Commission, Investigation No. 337-TA-1173, "Respondent Robosense's Notice of Prior Art," Nov. 13, 2019, 34 pages.
U.S. Patent Office, Information Disclosure Statement, U.S. Appl. No. 10/391,383 (U.S. Pat. No. 7,130,672, Pewzner) (Aug. 3, 2005), 8 pages.
U.S. Patent Office, Information Disclosure Statement, U.S. Appl. No. 10/508,232 (U.S. Pat. No. 7,313,424, Mayevsky) (Apr. 21, 2006), 17 pages.
Ullrich, et al., "High-performance 3D-imaging laser sensor," Proceedings of SPIE vol. 3707 (Jun. 1999), pp. 658-664. (IPR Nos. '255 and '256 Exhibit 1014).
Ultra Puck, VLP-32C Data Sheet (2018), 2 pages. (IPR Nos. '255 and '256 Exhibit 2093).
Urmson, "High speed navigation of unrehearsed terrain: red team technology for grand challenge 2004" (Jun. 1, 2004), 47 pages.
Usgs, EROS CalVal Center of Excellence (Eccoe), https://calval.crusgs.gov/word press/wpcontent/uploads/JACIE_files/JACIE06/Files/312Habib.pdf (Dec. 21, 2018), 3 pages. (IPR Nos. '255 and '256 Exhibit 1071).
Uwinnipeg, Centripetal Acceleration, Uwinnipeg.ca, http://theory.uwinnipeg.ca/physics/circ/node6.html (1997), 2 pages. (IPR Nos. '255 and '256 Exhibit 2157).
Velodyne Acoustics, Inc., Motor Specification, Merlin Project, Rev. E1 Initial Engineering Release (Apr. 29, 2009), 1 page. (IPR Nos. '255 and '256 Exhibit 2020).
Velodyne Acoustics, Inc., Motor Winding Specs., P2.0, E2 Changed Material (Mar. 10, 2010), 1 page. (IPR Nos. '255 and '256 Exhibit 2022).
Velodyne Acoustics, Inc., Outline Drawing HDL-64E S3 Envelope Drawing, Rev. A (Apr. 21, 2015), 1 page. (IPR Nos. '255 and '256 Exhibit 2094).
Velodyne Lidar Products, PowerPoint (Jan. 18, 2017), 9 pages. (IPR Nos. '255 and '256 Exhibit 2031).
Velodyne Lidar, CAD Drawing of MotorStat-38in, HDL-64E (2018), 1 page. (IPR Nos. '255 and '256 Exhibit 2063).
Velodyne Lidar, CAD Drawing of MotorStat3in, HDL-64E(2018), 1 page. (IPR Nos. '255 and '256 Exhibit 2021).
Velodyne Lidar, CAD Drawing of Rotor, HDL-64E (2018), 1 page. (IPR Nos. '255 and '256 Exhibit 2026).
Velodyne Lidar, CAD Drawing of RotorAI, HDL-64E (2018), 1 page. (IPR Nos. '255 and '256 Exhibit 2027).
Velodyne Lidar, Envelope Hi Res VLP-16 Drawings, Rev. A (Jun. 30, 2016), 4 pages. (IPR Nos. '255 and '256 Exhibit 2061).
Velodyne Lidar, Excerpts of VLP-32C User Manual, 63-9325 Rev. B (2018), 26 pages. (IPR Nos. '255 and '256 Exhibit 2034).
Velodyne Lidar, First Sensor Annual Report (2016), pp. 1-143. (IPR Nos. '255 and '256 Exhibit 2038).
Velodyne Lidar, HDL-32E Data Sheet (2017), 2 pages. (IPR Nos. '255 and '256 Exhibit 2042).
Velodyne Lidar, HDL-32E Envelope Drawing (2018), 1 page. (IPR Nos. '255 and '256 Exhibit 2043).
Velodyne Lidar, HDL-32E Supported Sensors, Poly Synch Docs 2.3.2, http://docs.polysync.io/sensors/velodyne-hdl-32e/ (2018), 7 pages. (IPR Nos. '255 and '256 Exhibit 2055).
Velodyne Lidar, HDL-32E User's Manual and Programing Guide (Aug. 2016), 29 pages. (IPR Nos. '255 and '256 Exhibit 2044).
Velodyne Lidar, HDL-64E Data Sheet (2018), 2 pages. (IPR Nos. '255 and '256 Exhibit 2069).
Velodyne Lidar, HDL-64E S2 and S2.1 User's Manual and Programming Guide (Nov. 2012), 43 pages. (IPR Nos. '255 and '256 Exhibit 2050).
Velodyne Lidar, HDL-64E S2 Datasheet (Mar. 2010), 2 pages. (IPR Nos. '255 and '256 Exhibit 2047).
Velodyne Lidar, HDL-64E S3 Data Sheet (2016), 2 pages. (IPR Nos. '255 and '256 Exhibit 2048).
Velodyne Lidar, HDL-64E S3 User's Manual and Programming Guide (May 2013), 54 pages (IPR Nos. '255 and '256 Exhibit 2051).
Velodyne Lidar, HDL-64E User's Manual (Mar. 2008), 21 pages. (IPR Nos. '255 and '256 Exhibit 2052).
*Velodyne Lidar, Inc.* v. *Hesai Photonics Technology Co., Ltd.* (N.D. Cal.), Complaint, Case No. 5:19-cv-04742 (Aug. 13, 2019), 13 pages.
*Velodyne Lidar, Inc.* v. *Sunteng Innovation Technology Co., Ltd.* ("Robosense") (N.D. Cal.), Complaint, Case No. 5:19-cv-04746 (Aug. 13, 2019), 13 pages.
Velodyne Lidar, Inc., Production Worksheet Detector, Item #24-AD5009 in Production, AD500-9 NIR Photodiode (Jan. 18, 2018), 1 page. (IPR Nos. '255 and '256 Exhibit 2024).
Velodyne Lidar, Inc., Production Worksheet, Item #30-AD230CER2 in Production, APD, 230UM, Ceramic Submount (Jan. 17, 2018), 1 pages. (IPR Nos. '255 and '256 Exhibit 2023).
Velodyne LiDAR, It Began With a Race . . . 16 Years of Velodyne LiDAR, Velodyne LiDAR Blog, available at http://velodynelidar.com/blog/it-began-with-a-race/ (2018), 8 pages. (IPR Nos. '255 and '256 Exhibit 2070).
Velodyne LiDAR, Product Guide (2018), 1 page. (IPR Nos. '255 and '256 Exhibit 2058).
Velodyne LiDAR, Puck, Real-time 3D LiDAR Sensor, VLP-16 Data Sheet (2017), 2 pages. (IPR Nos. '255 and '256 Exhibit 2060).
Velodyne Lidar, Ultra Puck™ VLP-32 Data Sheet (2014), 2 pages. (IPR Nos. '255 and '256 Exhibit 2032).
Velodyne LiDAR, Velodyne Donates LiDAR and Robotic Artifacts to Smithsonian, Point of Engineering, Point of Beginning (May 23, 2011), 2 pages. (IPR Nos. '255 and '256 Exhibit 2078).
Velodyne Lidar, VLP-16 User's Manual and Programming Guide (Mar. 2016), 49 pages. (IPR Nos. '255 and '256 Exhibit 2062).

(56) References Cited

OTHER PUBLICATIONS

Velodyne Lidar, VLP-32C User Manual, 63-9325 Rev. B. (Feb. 2, 2018), 136 pages. (IPR Nos. '255 and '256 Exhibit 2114).
Velodyne Lidar, Webserver User Guide VLP-16 & HDL-32E (63-6266 Rev A) (Nov. 2015), 32 pages. (IPR Nos. '255 and '256 Exhibit 2013).
Velodyne Lidar, White Paper, Velodyne's HDL-64E: A High Definition Lidar Sensor for 3-D Applications (Oct. 2007), 7 pages. (IPR Nos. '255 and '256 Exhibit 2059).
Velodyne, Velodyne—High Definition Lidar—Overview https://web.archive.org/web/20071107104255/http://www.velodyne.com:80/lidar/products/overview.aspx (Nov. 7, 2007), 1 page. (IPR Nos. '255 and '256 Exhibit 1091).
Velodyne, Velodyne HDL Applications, https://web.archive.org/web/20080716041931/http://www.velodyne.com:80/lidar/technology/applications.aspx (Jul. 16, 2008), 1 page. (IPR Nos. '255 and '256 Exhibit 1106).
Velodyne, Velodyne HDL-64E user manual, https://web.archive.org/web/20081117092628/http://www.velodyne.com/lidar/products/manual/HDL-64E%20Manual.pdf (Nov. 17, 2008), 23 pages. (IPR Nos. '255 and '256 Exhibit 1090).
Velodynelidar, Data to Improve the Cost, Convenience and Safety of Motor Vehicles, https://velodynelidar.com/industry.html (2018), 6 pages. (IPR Nos. '255 and '256 Exhibit 1125).
Weber, Where to? A History of Autonomous Vehicles, Computer History Museum, https://support.garmin.com/en-US/?faq=IVeHYIKwChAY0qCVhQiJ67 (May 8, 2014), 23 pages. (IPR Nos. '255 and '256 Exhibit 2146).
Westinghouse, "AN/TPS-43 E Tactical Radar System" (1999), pp. 1-14.
Widmann, "Development of Collision Avoidance Systems at Delphi Automotive Systems" (1998), pp. 353-358.
Wikipedia, "Laser" (Nov. 10, 2017), 25 pages. (IPR Nos. '255 and '256 Exhibit 1022).
Willhoeft et al., "Quasi-3D Scanning with Laserscanners," IBEO Automobile Sensor, 8th World Congress on Intelligent Transport Systems—Quasi-3D Scanning (2001), IBEO Automobile Sensor, 8th World Congress on Intelligent Transport Systems—Quasi-3D Scanning (2001), 12 pages. (IPR Nos. '255 and '256 Exhibit 1077).
Williams, Bias Voltage and Current Sense Circuits for Avalanche Photodiodes—Feeding and Reading the APD, Linear Technology AN92-1 (Nov. 2012), 32 pages. (IPR Nos. '255 and '256 Exhibit 2125).
Williams, Driverless cars yield to reality: It's a long road ahead, PC World (Jul. 8, 2013), 6 pages. (IPR Nos. '255 and '256 Exhibit 2073).
Wulf et al., "Fast 3D Scanning Methods for Laser Measurement Systems, CSCS-14, 14th Int'l Conference on Control Systems and Computer Science" (Jul. 2003), pp. 312-317. (IPR Nos. '255 and '256 Exhibit 1078).
Wulf, "2D Mapping of Cluttered Indoor Environments by Means of 3D Perception," Proceedings of the 2004 IEEE International Conference on Robotics & Automation (Apr. 2004), pp. 4204-4209.
Yang, et al., "Performance of a large-area avalanche photodiode at low temperature for scintillation detection," Nuclear Instruments and Methods in Physics Research (2003), pp. 388-393 (IPR Nos. '255 and '256 Exhibit 1034).
Yu et al., A New 3D Map Reconstruction Based Mobile Robot Navigation, IEEE (2006), 4 pages. (IPR Nos. '255 and '256 Exhibit 2189).
Zappa, et al, SPADA: Single-Photon Avalanche Diode Arrays, IEEE Photonics Technology Letters, vol. 17, No. 3 (Mar. 2005), 9 pages. (IPR Nos. '255 and '256 Exhibit 1135).
Zhao, "A vehicle-borne urban 3-D acquisition system using single-row laser range scanners," IEEE transactions on systems, man, and cybernetics, vol. 33, No. 4 (Aug. 2003), pp. 658-666.
Zhao, "Reconstructing Textured CAD Model of Urban Environment Using Vehicle-Borne Laser Range Scanners and Line Cameras," Lecture Notes in Computer Science, vol. 2095 (2001), pp. 284-297.
Zheng, "The Technique of Land 3D Laser Scanning and Imaging Surveying," Railway Aerial Survey, vol. 2 (2003), 3 pages.
U.S. Appl. No. 15/420,384, filed Jan. 31, 2017, Hall et al.
U.S. Appl. No. 16/030,780, filed Jul. 9, 2018, Hall et al.
U.S. Appl. No. 17/355,051, filed Jun. 22, 2021, Hall et al.
U.S. Appl. No. 17/403,776, filed Aug. 16, 2021, Hall et al.
U.S. Appl. No. 17/403,780, filed Aug. 16, 2021, Hall et al.
U.S. Appl. No. 17/357,794, filed Jun. 24, 2021, Hall et al.
U.S. Appl. No. 15/974,527, filed May 8, 2018, Hall et al.
U.S. Appl. No. 17/234,672, filed Apr. 19, 2021, Hall et al.
U.S. Appl. No. 17/392,062, filed Aug. 2, 2021, Pinto et al.
Japanese Patent Office, JP Application No. 2018-563105, Notice of Reasons for Rejection dated Apr. 6, 2021, 6 pages.
European Patent Office, Communication, Application No. 18886541.4 dated Jul. 16, 2021.
European Patent Office, Examination Report, Appl. No. 17745112.7 (dated Aug. 30, 2021), 5 pages.
Canadian Patent Office, Office Action, App. No. CA 3,012,003 (dated Jul. 16, 2021), 4 pages.
Japanese Patent Office, Office Action, App. No. 2019-540039 (dated Dec. 8, 2020), 5 pages.
Japanese Patent Office, Office Action, App. No. 2018-540039 (dated Aug. 17, 2021), 3 pages.
Canadian Patent Office, Office Action, App. No. CA 3,024,510 (dated Jun. 23, 2021), 5 pages.
European Patent Office, Examination Report, Appl. No. 17807474.6 (dated Nov. 24, 2021), 6 pages.
Japanese Patent Office, Office Action, App. No. 2018-563105 (dated Apr. 6, 2021), 6 pages.
Extended Search Report, EP App. No. 18886541.4, dated Jun. 29, 2021, 9 pages.
Supplementary European Search Report EP App. No. 17807474, dated Dec. 9, 2019, 9 pages.
Extended European Search Report, EP Appl. No. 19863803.3, dated Mar. 18, 2022, 12 pages.
Russian Search Report for Appl. No. 2021107542 dated Aug. 13, 2019, 4 pages.
Russian Patent Office, Office Action, App. No. 2021107542 (dated Mar. 23, 2022), 14 pages.
Extended European Search Report of Appl. No. 19875552.2 dated Aug. 23, 2021, 10 pages.
Russian Search Report for Appl. No. 2021110675 dated Feb. 1, 2022, 2 pages.
Japanese Patent Office, JP Application No. 2021-056430, Notice of Reasons for Rejection, dated May 31, 2022, 4 pages.
English Translation of Notice of Reasons for Rejection, JP Application No. 2021-056430, dated May 31, 2022 (5 pages).
European Patent Office, Communication for EP 18 774 795.1-1206, dated May 30, 2022 (8 pages).
Japanese Patent Office, JP Application No. 2019-553816, Notice of Reasons for Rejection, dated Dec. 14, 2021 (4 pages).
English Translation, JP Application No. 2019-553816, Notice of Reasons for Rejection, dated Dec. 14, 2021 (1 page).
Japanese Patent Office, JP Application No. 2018-563105, Notice of Reasons for Rejection dated Feb. 1, 2022, 9 pages.
Indian Patent Office, Office Action, App. No. 201927050170 (dated Feb. 2, 2022), 6 pages.
Chinese Patent Office, CN Application No. 201880045455.1, Office Action dated Feb. 22, 2022, 8 pages.
Chinese Patent Office, CN Application No. 201880045455.1, Notification to Grant Patent dated Jul. 27, 2022, 2 pages.
Japanese Patent Office, JP Application No. 2019-561836, Office Action dated Jul. 12, 2022, 5 pages.
Chinese Patent Office Action, CN Application No. 2017800090974, Office Action dated Nov. 11, 2022, 7 pages.
Chinese Patent Office, CN Application No. 201780030009.9, Office Action dated Sep. 28, 2022, 24 pages.
Japanese Patent Office, Notice of Reasons for Rejections, App. No. 2019-561836 (dated Oct. 4, 2022), 13 pages.
US Non-Final Office Action dated Mar. 20, 2019, from U.S. Appl. No. 15/974,527.
US Final Office Action dated Dec. 3, 2020, from U.S. Appl. No. 16/030,780.

(56) References Cited

OTHER PUBLICATIONS

US Non-Final Office Action dated Mar. 4, 2020, from U.S. Appl. No. 16/030,780.
US Non-Final Office Action dated Jun. 30, 2017, from U.S. Appl. No. 15/420,384.
US Non-Final Office Action dated Feb. 16, 2023, from U.S. Appl. No. 17/355,051.

* cited by examiner

LIDAR DATA ACQUISITION AND CONTROL

CROSS REFERENCE TO RELATED APPLICATION

The present application is a continuation of and claims priority to U.S. patent application Ser. No. 15/974,527, entitled "LIDAR Data Acquisition And Control," filed May 8, 2018, which claims priority under 35 U.S.C. § 119 from U.S. provisional patent application Ser. No. 62/503,237, entitled "LIDAR Data Acquisition And Control," filed May 8, 2017, the subject matter of both which is incorporated herein by reference in its entirety.

TECHNICAL FIELD

The described embodiments relate to LIDAR based 3-D point cloud measuring systems.

BACKGROUND INFORMATION

LIDAR systems employ pulses of light to measure distance to an object based on the time of flight (TOF) of each pulse of light. A pulse of light emitted from a light source of a LIDAR system interacts with a distal object. A portion of the light reflects from the object and returns to a detector of the LIDAR system. Based on the time elapsed between emission of the pulse of light and detection of the returned pulse of light, a distance is estimated. In some examples, pulses of light are generated by a laser emitter. The light pulses are focused through a lens or lens assembly. The time it takes for a pulse of laser light to return to a detector mounted near the emitter is measured. A distance is derived from the time measurement with high accuracy.

Some LIDAR systems employ a single laser emitter/detector combination combined with a rotating mirror to effectively scan across a plane. Distance measurements performed by such a system are effectively two dimensional (i.e., planar), and the captured distance points are rendered as a 2-D (i.e., single plane) point cloud. In some examples, rotating mirrors are rotated at very fast speeds (e.g., thousands of revolutions per minute).

In many operational scenarios, a 3-D point cloud is required. A number of schemes have been employed to interrogate the surrounding environment in three dimensions. In some examples, a 2-D instrument is actuated up and down and/or back and forth, often on a gimbal. This is commonly known within the art as "winking" or "nodding" the sensor. Thus, a single beam LIDAR unit can be employed to capture an entire 3-D array of distance points, albeit one point at a time, in a related example, a prism is employed to "divide" the laser pulse into multiple layers, each having a slightly different vertical angle. This simulates the nodding effect described above, but without actuation of the sensor itself.

In all the above examples, the light path of a single laser emitter/detector combination is somehow altered to achieve a broader field of view than a single sensor. The number of pixels such devices can generate per unit time is inherently limited due limitations on the pulse repetition rate of a single laser. Any alteration of the beam path, whether it is by mirror, prism, or actuation of the device that achieves a larger coverage area comes at a cost of decreased point cloud density.

As noted above, 3-D point cloud systems exist in several configurations. However, in many applications it is necessary to see over a broad field of view. For example, in an autonomous vehicle application, the vertical field of view should extend down as dose as possible to see the ground in front of the vehicle. In addition, the vertical field of view should extend above the horizon, in the event the car enters a dip in the road. In addition, it is necessary to have a minimum of delay between the actions happening in the real world and the imaging of those actions. In some examples, it is desirable to provide a complete image update at least five times per second. To address these requirements, a 3-D LIDAR system has been developed that includes an array of multiple laser emitters and detectors. This system is described in U.S. Pat. No. 7,959,558 issued on Jun. 28, 2011, the subject matter of which is incorporated herein by reference in its entirety.

In many applications, a sequence of pulses is emitted. The direction of each pulse is sequentially varied in rapid succession. In these examples, a distance measurement associated with each individual pulse can be considered a pixel, and a collection of pixels emitted and captured in rapid succession (i.e., "point cloud") can be rendered as an image or analyzed for other reasons (e.g., detecting obstacles). In some examples, viewing software is employed to render the resulting point clouds as images that appear three dimensional to a user. Different schemes can be used to depict the distance measurements as 3-D images that appear as if they were captured by a live action camera.

Some existing LIDAR systems employ an illumination source and a detector that are not integrated together onto a common substrate (e.g., electrical mounting board). Furthermore, the illumination beam path and the collection beam path are separated within the LIDAR device. This leads to opto-mechanical design complexity and alignment difficulty.

In addition, mechanical devices employed to scan the illumination beams in different directions may be sensitive to mechanical vibrations, inertial forces, and general environmental conditions. Without proper design these mechanical devices may degrade leading to loss of performance or failure.

To measure a 3D environment with high resolution and high throughput, the measurement pukes must be very short. Current systems suffer from low resolution because they are limited in their ability to generate short duration pukes and resolve short duration return pulses.

Saturation of the detector limits measurement capability as target reflectivity and proximity vary greatly in realistic operating environments. In addition, power consumption may cause overheating of the LIDAR system.

Light devices, targets, circuits, and temperatures vary in actual systems. The variability of all of these elements limits system performance without proper calibration of the signals detected from each LIDAR device.

Improvements in the illumination drive electronics and receiver electronics of LIDAR systems are desired to improve imaging resolution and range.

SUMMARY

Methods and systems for performing three dimensional LIDAR measurements with an integrated LIDAR measurement device are described herein.

In one aspect, a return signal receiver of a LIDAR measurement device generates a pulse trigger signal that causes an illumination driver to provide electrical power to an illumination source, which causes the illumination source to generate a pulse of illumination light. In addition, the pulse trigger signal directly triggers data acquisition of a return signal and associated time of flight calculation. In this manner, the pulse trigger signal is employed to trigger both pulse generation and return pulse data acquisition. This ensures precise synchronization of pulse generation and return pulse acquisition which enables precise time of flight calculations by time-to-digital conversion.

In another aspect, the return signal receiver identifies one or more return pulses of light reflected from one or more objects in the surrounding environment in response to the pulse of illumination light and determines a time of flight associated with each of the return pulses. The return signal receiver also estimates a width of each return pulse, a peak amplitude of each return pulse, and samples each return pulse waveform individually over a sampling window that includes the peak amplitude of each return pulse waveform. These signal properties and timing information are communicated from the integrated LIDAR measurement device to a master controller.

In a further aspect, the time of flight associated with each return pulse is estimated by the return signal receiver based on a coarse timing module and a fine timing module. In a further aspect, a metastability bit is employed to determine the correct count of the coarse timing module when a hit signal comes in near a clock transition. The value of the metastability bit determines whether the hit signal came in near a high to low transition of the counter signal, or a low to high transition of the counter signal, and thus the correct count value.

In another further aspect, the return pulse receiver IC measures time of flight based on the time elapsed between the detection of a pulse due to internal cross-talk between the illumination source and the photodetector of the integrated LIDAR measurement device and a valid return pulse. In this manner, systematic delays are eliminated from the estimation of time of flight.

In another aspect, a master controller is configured to generate a plurality of pulse command signals, each communicated to a different integrated LIDAR measurement device. Each return pulse receiver IC generates a corresponding pulse trigger signal based on the received pulse command signal.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Figure 1:
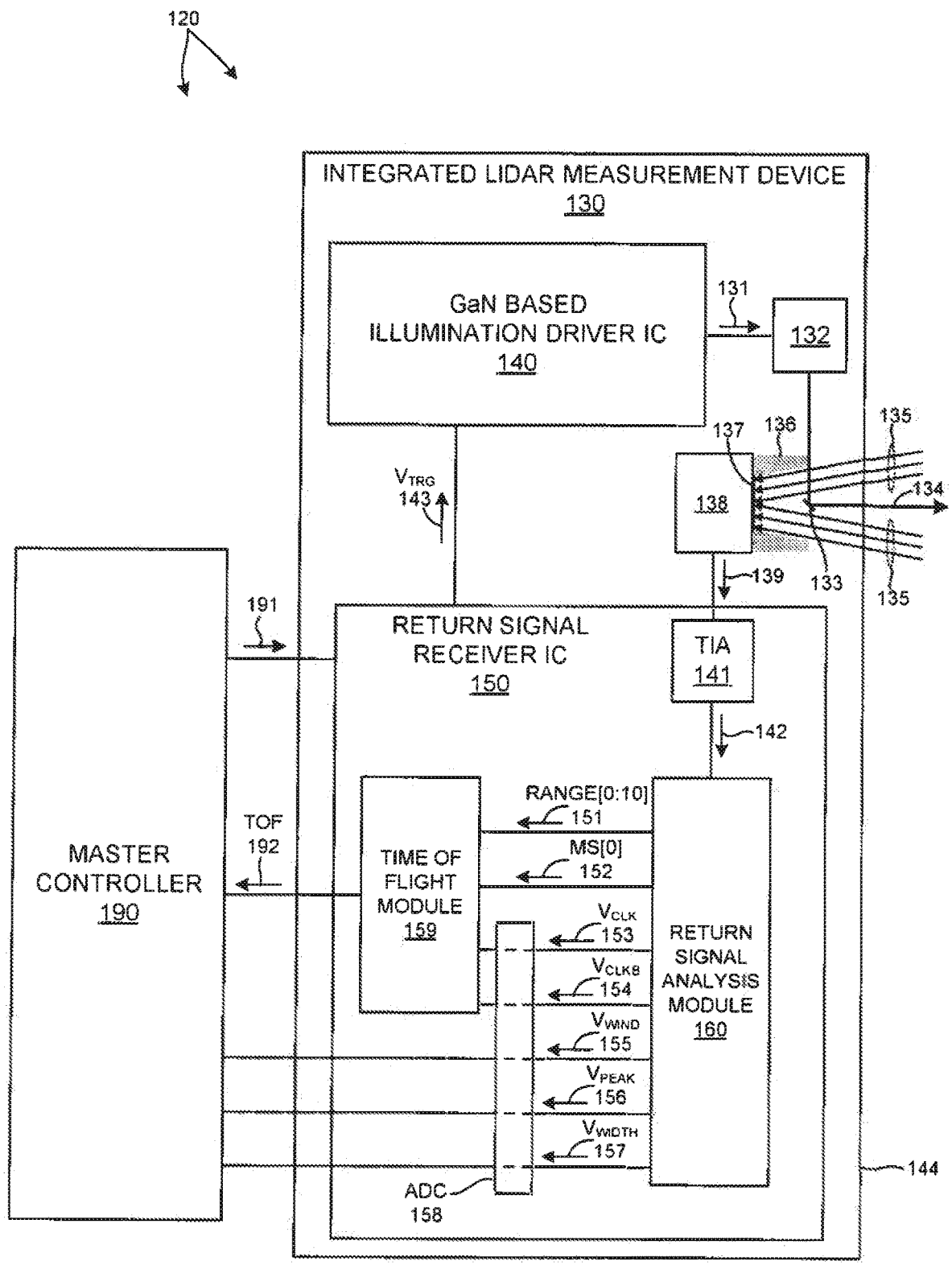
FIG. 1 is a simplified diagram illustrative of one embodiment of a LIDAR measurement system including at least on integrated LIDAR measurement device in at least one novel aspect.

FIG. 1 depicts a LIDAR measurement system 120 in one embodiment, LIDAR measurement system 120 includes a master controller 190 and one or more integrated LIDAR measurement devices 130. An integrated LIDAR measurement device 130 includes a return signal receiver integrated circuit (IC) 150, a Gallium Nitride based illumination driver integrated circuit (IC) 140, an illumination source 132, a photodetector 138, and a trans-impedance amplifier (TIA) 141. Each of these elements is mounted to a common substrate 144 (e.g., printed circuit board) that provides mechanical support and electrical connectivity among the elements.

In addition, in some embodiments, an integrated LIDAR measurement device includes one or more electrical power supplies that provide electrical power to the electronic elements mounted to substrate 144 and electrical power to the illumination device 132. The electrical power supplies may be configured to supply any suitable voltage or current, in some embodiments, one or more of the electrical power supplies are mounted to substrate 144. However, in general, any of the electrical power supplies described herein may be mounted to a separate substrate and electrically coupled to the various elements mounted to substrate 144 in any suitable manner.

Master controller 190 is configured to generate a pulse command signal 191 that is communicated to receiver IC 150 of integrated LIDAR measurement device 130. In general, a LIDAR measurement system includes a number of different integrated LIDAR measurement devices 130. In these embodiments, master controller 190 communicates a distinct pulse command signal 191 to each different integrated LIDAR measurement device, in this manner, master controller 190 coordinates the timing of LIDAR measurements performed by any number of integrated LIDAR measurement devices.

Pulse command signal 191 is a digital signal generated by master controller 190. Thus, the timing of pulse command signal 191 is determined by a clock associated with master controller 190. In some embodiments, the pulse command signal 191 is directly used to trigger pulse generation by illumination driver IC 140 and data acquisition by receiver IC 150. However, illumination driver IC 140 and receiver IC 150 do not share the same clock as master controller 190. For this reason, precise estimation of time of flight becomes much more computationally tedious when pulse command signal 191 is directly used to trigger pulse generation and data acquisition.

In one aspect, receiver IC 150 receives pulse command signal 191 and generates a pulse trigger signal, $V_{TRG}$ 143, in response to the pulse command signal 191. Pulse trigger signal 143 is communicated to illumination driver IC 140 and directly triggers illumination driver IC 140 to provide an electrical pulse 131 to illumination source 132, which causes illumination source 132 to generate a pulse of illumination light 134. In addition, pulse trigger signal 143 directly triggers data acquisition of return signal 142 and associated time of flight calculation. In this manner, pulse trigger signal 143 generated based on the internal clock of receiver IC 150 is employed to trigger both pulse generation and return pulse data acquisition. This ensures precise synchronization of pulse generation and return pulse acquisition which enables precise time of flight calculations.

Illumination source 132 emits a measurement pulse of illumination light 134 in response to a pulse of electrical energy 131. The illumination light 134 is focused and projected onto a particular location in the surrounding environment by one or more optical elements of the LIDAR system.

In some embodiments, the illumination source 132 is laser based (e.g., laser diode). In some embodiments, the illumination source is based on one or more light emitting diodes. In general, any suitable pulsed illumination source may be contemplated.

As depicted in FIG. 1, illumination light 134 emitted from integrated LIDAR measurement device 130 and corresponding return measurement light 135 reflected back toward integrated LIDAR measurement device 130 share a common optical path. Integrated LIDAR measurement device 130 includes a photodetector 138 having an active sensor area 137. As depicted in FIG. 1, illumination source 132 is located outside the field of view of the active area 137 of the photodetector. As depicted in FIG. 1, an overmold lens 135 is mounted over the photodetector 138. The overmold lens 136 includes a conical cavity that corresponds with the ray acceptance cone of return light 135. Illumination light 134 from illumination source 132 is injected into the detector reception cone by a fiber waveguide. An optical coupler optically couples illumination source 132 with the fiber waveguide. At the end of the fiber waveguide, a mirror element 133 is oriented at an angle (e.g., 45 degrees) with respect to the waveguide to inject the illumination light 134 into the cone of return light 135. In one embodiment, the end faces of the fiber waveguide are cut at a 45 degree angle and the end faces are coated with a highly reflective dielectric coating to provide a mirror surface. In some embodiments, the waveguide includes a rectangular shaped glass core and a polymer cladding of lower index of refraction. In some embodiments, the entire optical assembly is encapsulated with a material having an index of refraction that closely matches the index of refraction of the polymer cladding. In this manner, the waveguide injects the illumination light 134 into the acceptance cone of return light 135 with minimal occlusion.

The placement of the waveguide within the acceptance cone of the return light 135 projected onto the active sensing area 137 of detector 138 is selected to ensure that the illumination spot and the detector field of view have maximum overlap in the far field.

As depicted in FIG. 1, return light 135 reflected from the surrounding environment is detected by photodetector 138. In some embodiments, photodetector 138 is an avalanche photodiode. Photodetector 138 generates an output signal 139 that is communicated to return signal receiver IC 150.

Output signal 13 is received and amplified by TIA 141. The amplifier/signal 142 is communicated to return signal analysis module 160. In general, the amplification of output signal 139 may include multiple, amplifier stages. In this sense, an analog trans-impedance amplifier is provided by way of non-limiting example, as many other analog signal amplification schemes may be contemplated within the scope of this patent document. Although TIA 141 is integrated with return signal receiver IC 150 as depicted in FIG. 1, in general, TIA 141 may be implemented as a discrete device separate from the receiver IC 150. In some embodiments, it is preferable to integrate TIA 141 with receiver IC 150 to save space and reduce signal contamination.

Return signal receiver IC 150 performs several functions. In one aspect, receiver IC 150 identifies one or more return pulses of light reflected from one or more objects in the surrounding environment in response to the pulse of illumination light 134, and determines a time of flight associated with each of these return pulses. In general, the output signal 139 is processed by return signal receiver IC 150 for a period of time that corresponds with the time of flight of light from the LIDAR measurement device 130 to a distance equal to the maximum range of the device 130, and back to the device 130. During this period of time, the illumination pulse 134 may encounter several objects at different distances from the integrated LIDAR measurement device 130. Thus, output signal 139 may include several pulses, each corresponding to a portion of the illumination beam 134 reflected from different reflective surfaces located at different distances from device 130. In another aspect, receiver IC 150 determines various properties of each of the return pulses. As depicted in FIG. 1, receiver IC 150 determines an indication of a width of each return pulse, determines the peak amplitude of each return pulse, and samples each return pulse waveform individually over a sampling window that includes the peak amplitude of each return pulse waveform. These signal properties and timing information are communicated from integrated LIDAR measurement device 130 to master controller 190. Master controller 190 may further process this data, or communicate this data directly to an external computing device for further image processing (e.g., by a user of the LIDAR measurement system 120).

Figure 2:
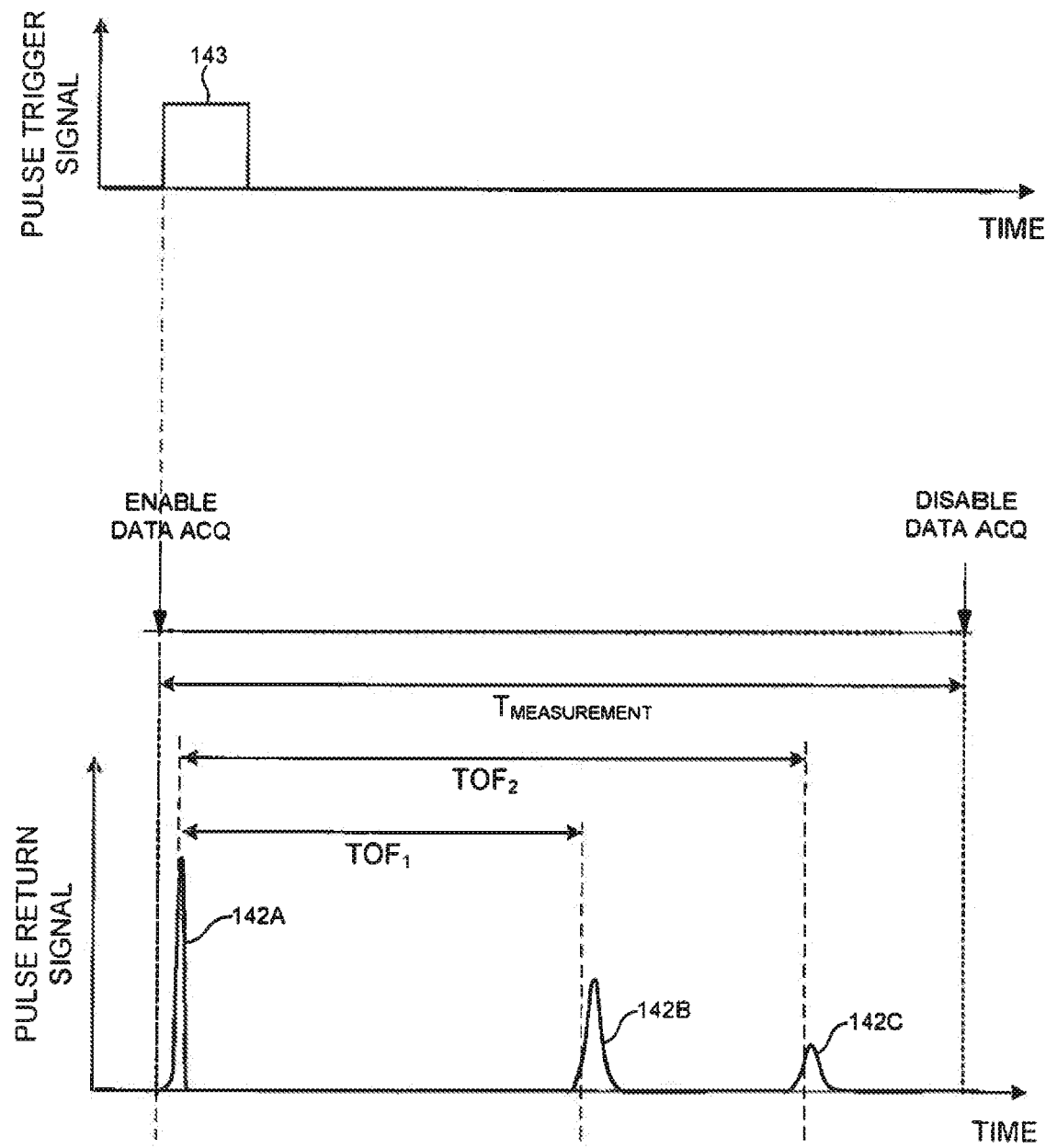
FIG. 2 depicts an illustration of the timing associated with the emission of a measurement pulse from an integrated LIDAR measurement device 130 and capture of returning measurement pulses.

FIG. 2 depicts an illustration of the timing associated with the emission of a measurement pulse from an integrated LIDAR measurement device 130 and capture of the returning measurement pulse(s). As depicted in FIG. 2, a measurement is initiated by the rising edge of pulse trigger signal 134 generated by receiver IC 150. As depicted in FIGS. 1 and 2, an amplified, return signal 142 is generated by TIA 141. As described hereinbefore, a measurement window (i.e., a period of time over which collected return signal data is associated with a particular measurement pulse) is initiated by enabling data acquisition at the rising edge of pulse trigger signal 143. Receiver IC 150 controls the duration of the measurement window, $T_{measurement}$, to correspond with the window of time when a return signal is expected in response to the emission of a measurement pulse sequence.

In some examples, the measurement window is enabled at the rising edge of pulse trigger signal 143 and is disabled at a time corresponding to the time of flight of light over a distance that is approximately twice the range of the LIDAR system, in this manner, the measurement window is open to collect return light from objects adjacent to the LIDAR system (i.e., negligible time of flight) to objects that are located at the maximum range of the LIDAR system. In this manner, all other light that cannot possibly contribute to useful return signal is rejected.

As depicted in FIG. 2, return signal 142 includes three return measurement pulses that correspond with the emitted measurement pulse. In general, signal detection is performed on all detected measurement pulses, in one example, signal analysis may be performed to identify the closest valid signal 142B (i.e., first valid instance of the return measurement pulse), the strongest signal, and the furthest valid signal 142C (i.e., last valid instance of the return measurement pulse in the measurement window). Any of these instances may be reported as potentially valid distance measurements by the LIDAR system.

Internal system delays associated with emission of light from the LIDAR system (e.g., signal communication delays and latency associated with the switching elements, energy storage elements, and pulsed light emitting device) and delays associated with collecting light and generating signals indicative of the collected light (e.g., amplifier latency, analog-digital conversion delay, etc.) contribute to errors in the estimation of the time of flight of a measurement pulse of light. Thus, measurement of time of flight based on the elapsed time between the rising edge of the pulse trigger signal 143 and each valid return pulse (i.e., 142B and 142C) introduces undesireable measurement error. In some embodiments, a calibrated, pre-determined delay time is employed to compensate for the electronic delays to arrive at a corrected estimate of the actual optical time of flight. However, the accuracy of a static correction to dynamically changing electronic delays is limited. Although, frequent re-calibrations may be employed, this comes at a cost of computational complexity and may interfere with system up-time.

The another aspect, receiver IC 150 measures time of flight based on the time elapsed between the detection of a detected pulse 142A due to internal cross-talk between the illumination source 132 and photodetector 138 and a valid return pulse (e.g., 142B and 142C). In this manner, systematic delays are eliminated from the estimation of time of flight. Pulse 142A is generated by internal cross-talk with effectively no distance of light propagation. Thus, the delay in time from the rising edge of the pulse trigger signal and the instance of detection of pulse 142A captures all of the systematic delays associated with illumination and signal detection. By measuring the time of flight of valid return pulses (e.g., return pulses 142B and 142C) with reference to detected pulse 142A, all of the systematic delays associated with illumination and signal detection due to internal cross-talk are eliminated. As depicted in FIG. 2, receiver IC 150 estimates the time of flight, $TOF_1$, associated with return pulse 142B and the time of flight, $TOF_2$, associated with return pulse 142C with reference to return pulse 142A.

In some embodiments, the signal analysis is performed by receiver IC 150, entirely. In these embodiments, time of flight signals 192 communicated from integrated LIDAR measurement device 130 include an indication of the time of flight of each return pulse determined by receiver IC 150. In some embodiments, signals 155-157 include waveform information associated with each return pulse generated by receiver IC 150. This waveform information may be processed further by one or more processors located on board the 3-D LIDAR system, or external to the 3-D LIDAR system to arrive at another estimate of distance, an estimate of one of more physical properties of the detected object, or a combination thereof.

Return signal receiver IC 150 is a mixed analog/digital signal processing IC. In the embodiment depicted in FIG. 1, return signal receiver IC 150 includes TIA 141, a return signal analysis module 160, a time of flight calculation module 159, and an analog to digital conversion module 158.

Figure 3:
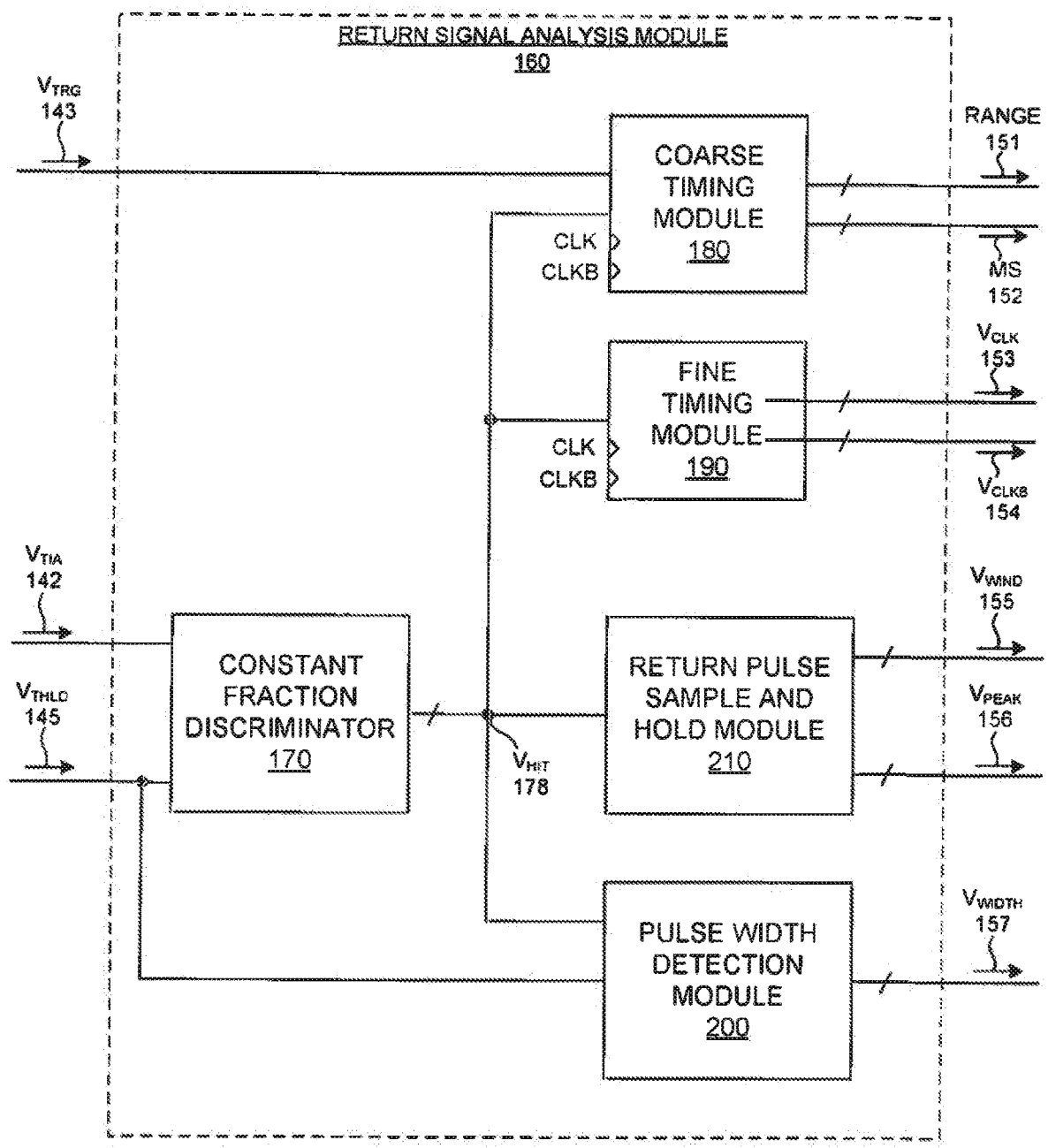
FIG. 3 depicts a simplified diagram illustrative of one embodiment of a portion of a return signal receiver IC including a return signal analysis module 160 in one embodiment.

FIG. 3 depicts return signal analysis module 160 in one embodiment, in the embodiment depicted in FIG. 3, return signal analysis module 160 includes constant fraction discriminator (CFD) circuitry 170, a coarse timing module 180, a fine timing module 190, a pulse width detection module 200, and a return pulse sample and hold module 210.

Amplified return signal, $V_{TIA}$ 142, and threshold signal, $V_{THLD}$ 145, are received by CFD 170. CFD 170 identifies a valid return pulse when return signal 142 exceeds a threshold value (i.e., the value of threshold signal 145). In addition, CFD 170 repeatably determines when a valid return pulse is detected and generates a hit signal, $V_{HIT}$ 178, that sharply transitions at the time of detection. Hit signal 178 signals the detection of a valid return pulse and triggers each of the timing and waveform acquisition and analysis functions of return signal analysis module 160.

For example, coarse timing module 180 determines a digital signal (i.e., range 151) indicative of the number of digital clock cycles that have elapsed from a transition of the pulse trigger signal 143 that triggers illumination pulse 134 and the transition of hit signal 178 associated with a particular valid return pulse. Coarse timing module 180 also generates a digital signal (i.e., MS 152) that is the digital clock signal time shifted by half of the period of the digital clock signal.

In addition, fine timing module 190 determines an analog signal (i.e., $V_{CLK}$ 153) having a voltage value indicative of a time elapsed between the transition of hit signal 178 associated with a particular valid return pulse and the next transition of the digital clock signal, CLK. Similarly, fine timing module 190 determines an analog signal (i.e., $V_{CLKB}$ 154) having a voltage value indicative of a time elapsed between the transition of hit signal 178 associated with a particular valid return pulse and the next transition of the inverse of the digital clock signal, CLKB. Range 151, MS 152, $V_{CLK}$ 153, and $V_{CLKB}$ 154 are employed by time of flight module 159 to determine the time of flight associated with each detected return pulse.

Return pulse sample and hold module 210 generates an analog signal (i.e., $V_{PEAK}$ 156) having a signal value (e.g., voltage) indicative of a peak amplitude of each valid return pulse, In addition, return pulse sample and hold module 210 generates a set of analog signals (i.e., $V_{WIND}$ 155) each having a signal value (e.g., voltage) indicative of an amplitude associated with a sampling point of each valid return pulse waveform. In some embodiments, the number of sampling points before and after the peak amplitude of the waveform is programmable.

Pulse width detection module 200 generates an analog signal (i.e., $V_{WIDTH}$ 157) having a signal value (e.g., voltage) indicative of a width of each valid return pulse waveform. In the depicted embodiment, the value of $V_{WIDTH}$ 157 is Indicative of the time elapsed between a time when return pulse signal 142 exceeds the value of $V_{THLD}$ 145 and the time of transition of hit signal 178 associated with a particular valid return pulse. $V_{WIND}$ 155, $V_{PEAK}$ 156, and $V_{WIDTH}$ 157 are each converted to digital signals by analog to digital converter (ADC) 158 of return signal receiver IC 150 before communication from return signal receiver IC to master controller 190.

Figure 4:
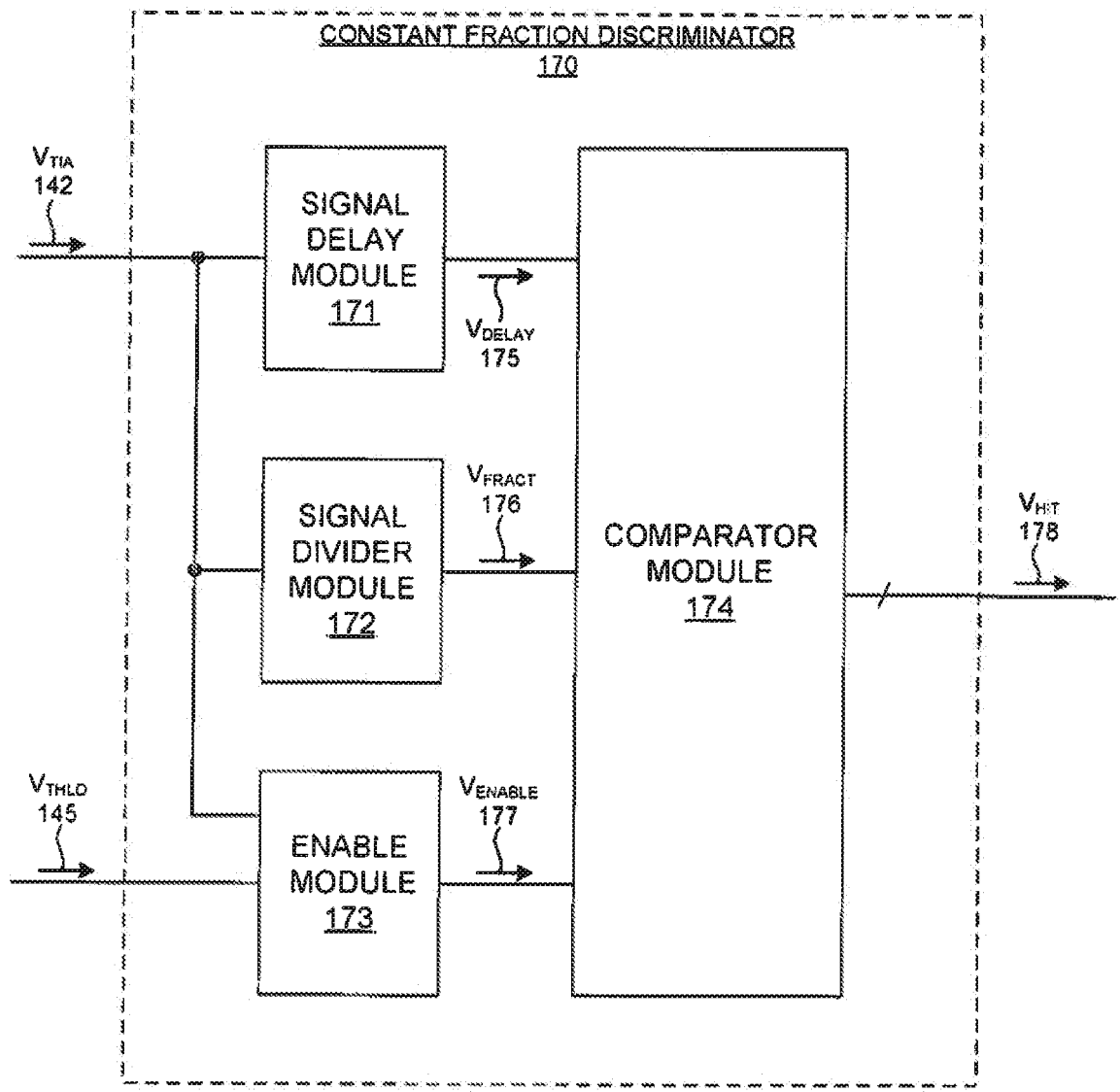
FIG. 4 depicts a simplified diagram illustrative of one embodiment of a portion of a return signal receiver IC including a constant fraction discriminator module 170 in one embodiment.

FIG. 4 depicts constant fraction discriminator 170 in one embodiment. As depicted in FIG. 4 constant fraction discriminator 170 includes signal delay module 171, signal divider module 172, enable module 173, and comparator module 174. Analog output signal 142 generated by TIA 141 is communicated to signal delay module 171, signal module 172, and enable module 173. Signal delay module 171 introduces a fixed delay to signal 142 and to generate $V_{DELAY}$ 175. At the same time signal divider module 172 includes a voltage divider circuit that divides $V_{TIA}$ 142 by a constant fraction (e.g., divide by 2) to generate $V_{FRACT}$ 176. The values of $V_{DELAY}$ 175 and $V_{FRACT}$ 176 are compared by comparator 174. In one example, hit signal, $V_{HIT}$ 178 is driven to a high state when $V_{DELAY}$ 175 is greater than $V_{FRACT}$ 176, and $V_{HIT}$ 178 is driven to a low state when $V_{DELAY}$ 175 is less than $V_{FRACT}$ 176. In this manner, $V_{HIT}$ 178 indicates when a return pulse has arrived and when it has passed in a consistent manner. If an arbitrary threshold value were employed to determine the arrival of a return pulse, the timing of the arrival would be inconsistent because different return pulses are not similarly shaped. However, by employing a constant fraction discriminator, the timing of the arrival and passing of return pulses is identified consistently among multiple return pulses. Enable module 173 receives a threshold voltage value, $V_{THLD}$ 145 and generates an enable signal, $V_{ENABLE}$ 177, when the value of return signal $V_{TIA}$ 142 exceeds $V_{THLD}$ 145. In this manner, comparator module 174 is enabled only when return signal 142 exceeds a threshold value. This ensures that spurious spikes in return signal 142 are ignored, and valid return pulses are processed by comparator module 174. In general, CFD 170 is configured to generate a hit signal 178 associated with each valid return pulse that arrives during a measurement window. Thus, $V_{HIT}$ 178 includes multiple hit signals, each associated with a different return pulse.

Figure 5:
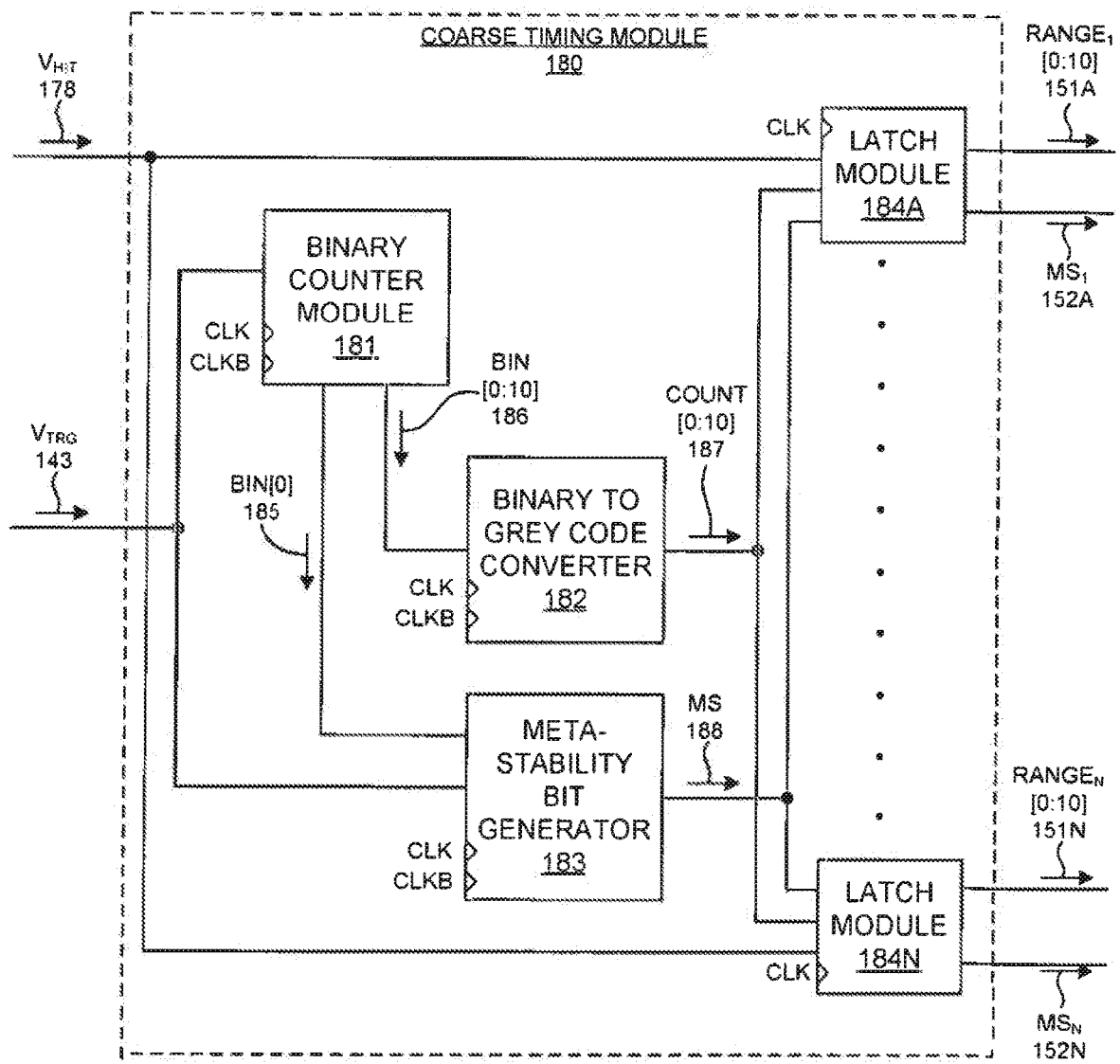
FIG. 5 depicts a simplified diagram illustrative of one embodiment of a portion of a return signal receiver IC including a coarse timing module in one embodiment.

FIG. 5 depicts an embodiment of coarse timing module 180. As depicted in FIG. 5, coarse timing module 180 includes a binary counter module 181, a binary code to grey code converter 182, a metastability bit generator 183, and one or more latch modules 184A-N. As depicted in FIG. 5, a digital clock signal, CLK, and the inverse of the digital clock signal, CLKB, are received by the modules of coarse timing module 180. In one embodiment, the digital clock signal is generated by a phase locked loop (PLL) on board return signal receiver IC 150. In one embodiment, the digital clock signal has a frequency of one gigahertz. Thus, in this particular embodiment, coarse timing module 180 is able to determine a time of flight associated with a particular return pulse to the nearest one nanosecond.

Binary counter module 181, receives pulse trigger signal 143 and begins counting in response to the pulse trigger. Digital signal BIN [0:10] 186 indicative of the running count is communicated to binary to grey code converter 182. Binary to grey code converter 182 converts the binary count signal BIN [0:10] 186 to a grey code equivalent digital signal COUNT[0:10]. COUNT [0:10] is communicated to each of the latch modules 184A-N. In addition, the first bit of running binary count BIN[0] is communicated to metastability bit generator 183. Metastability bit generator 183 generates metastability bit MS 188 by introducing a half period shift to BIN[0]. MS 188 is also communicated to each of the latch modules 184A-N.

In addition, each hit signal 178 associated with a different return pulse is communicated to a different latch module (i.e., one of latch modules 184A-N). Each of latch modules 184A-N latch the last known value of COUNT [0:10] and MS at the transition of the corresponding hit signal indicating the identification of a return pulse. The resulting latched values, RANGE[0:10] 151 and MS 152, respectively, are communicated to time of flight module 159 depicted in FIG. 1.

Figure 6:
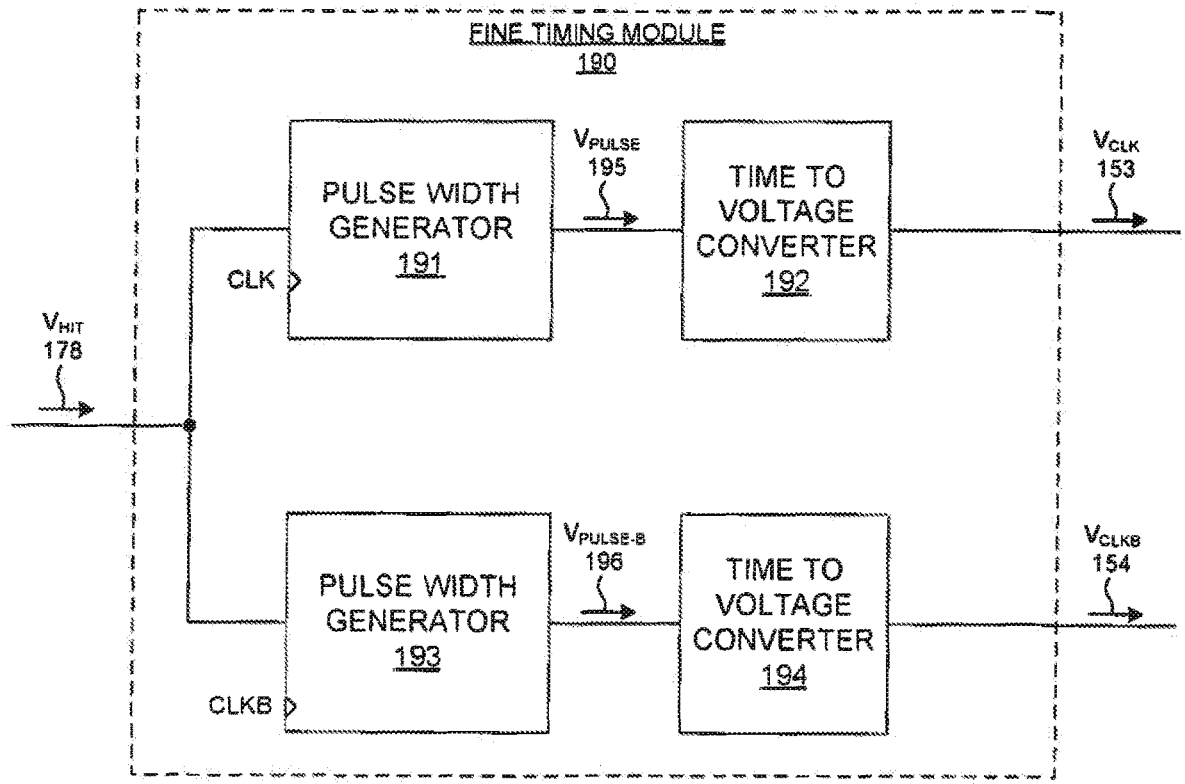
FIG. 6 depicts a simplified diagram illustrative of one embodiment of a portion of a return signal receiver IC including fine timing module in one embodiment.

FIG. 6 depicts fine timing module 190 in one embodiment. Fine timing module 190 includes two pulse width generators 191 and 193 and two time to voltage converters 192 and 194. Pulse width generator 191 receives each hit signal 178 and clock signal, CLK. Similarly, pulse width generator 193 receives each hit signal 178 and clock signal, CLKB. Pulse width generator 191 generates a pulse having a duration that matches the time between a rising edge of a hit signal 178 and the next rising edge of the clock signal, CLK. This pulse signal, $V_{PULSE}$ 195 is communicated to time to voltage converter 192. In response to $V_{PULSE}$ 195, time to voltage converter 192 generates a current ramp through a capacitor for the duration of the pulse. The voltage across the capacitor is indicative of the duration of the pulse. This voltage signal, $V_{CLK}$ 153 is communicated to ADC 158 for conversion to a digital signal, and onto time of flight module 159. Similarly, pulse width generator 193 generates a pulse having a duration that matches the time between a rising edge of a hit signal 178 and the next rising edge of the dock signal, CLKB. This pulse signal, $V_{PULSE-B}$ 198 is communicated to time to voltage converter 194. In response to $V_{PULSE-B}$ 196, time to voltage converter 194 generates a current ramp through a capacitor for the duration of the pulse. The voltage across the capacitor is indicative of the duration of the pulse. This voltage signal, $V_{CLKB}$ 154 is communicated to ADC 158 for conversion to a digital signal, and onto time of flight module 159. Since the pulse width generators 191 and 193 and time to voltage converters 192 and 194 are analog modules, the uncertainty associated with the estimate of time elapsed between the rising edge of a hit signal and the next clock signal is less than 10 picoseconds. Thus, the fine timing module enables a high precision estimate of the time of flight associated with a particular return pulse.

In another aspect, the determination of the time of flight associated with each return pulse is determined based on the output of both the coarse timing module and the fine timing module. In the embodiment depicted in FIG. 1, time of flight module 159 is implemented digitally. Time of flight module 159 determines the time of flight associated with a particular return pulse based on the coarse time estimate, RANGE[0:10], associated with that return pulse and the fine time estimate. Time of flight module 159 determines whether $V_{CLK}$ or $V_{CLKB}$ is used as the fine time estimate based on whether the hit signal came in near a transition of the CLK signal or the CLKB signal. For example, if the hit signal came in near a transition of the CLK signal, $V_{CLKB}$ will be used as the basis for the fine time estimate because the CLKB signal was stable at that time. Similarly, if the hit signal came in near a transition of the CLKB signal, $V_{CLK}$ will be used as the basis for the fine time estimate because the CLK signal was stable at that time. In one example, the estimated time of flight is the sum of the coarse time estimate and the selected fine time estimate.

In a further aspect, the metastability bit MS[0] is employed to determine the correct count of RANGE[0:10] when a hit signal comes in near a clock transition, and thus a transition of counter module 181. For example, if a hit signal 178 transitions near a transition of the counter 181, it is unclear which count is associated with that hit signal. For a 1 gigahertz clock, the error could be one count, or one nanosecond. In these scenarios, the value of the metastability bit is employed to resolve which count is associated with a particular hit. The value of the metastability bit determines whether the hit signal came in near a high to low transition of the counter signal, or a low to high transition of the counter signal, and thus the correct count value.

Figure 7:
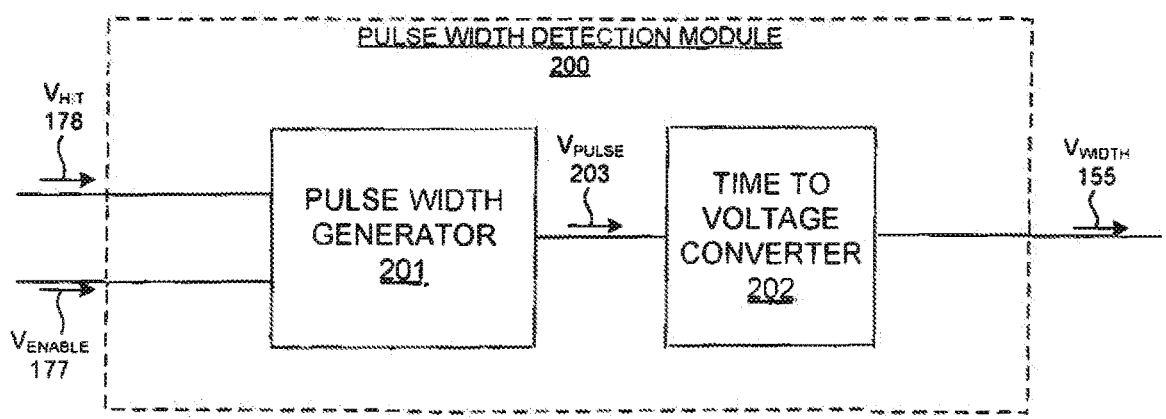
FIG. 7 depicts a simplified diagram illustrative of one embodiment of a portion of a return signal receiver IC including a pulse width detection module in one embodiment.

FIG. 7 depicts pulse width detection module 200 in one embodiment. Pulse width detection module 200 includes a pulse width generator 201 and a time to voltage converter 202. Pulse width generator 201 generates a pulse having a duration that matches the time between and a rising edge of enable signal, $V_{ENABLE}$ 177, depicted in FIG. 4, and a falling edge of a hit signal 178. This pulse signal, $V_{PULSE}$ 203 is communicated to time to voltage converter 202, in response to $V_{PULSE}$ 203, time to voltage converter 202 generates a current ramp through a capacitor for the duration of the pulse. The voltage across the capacitor is indicative of the duration of the pulse. This voltage signal, $V_{WIDTH}$ 155 is communicated to ADC 158 for conversion to a digital signal.

Pulse width detection module 200 is depicted by way of non-limiting example. In general, pulse width detection module 200 may be configured to operate on different input signals to generate $V_{PULSE}$ 203 and $V_{WIDTH}$ 155. In one example, pulse width generator 201 generates a pulse having a duration that matches the time between a rising edge of a hit signal 178 and a time when $V_{TIA}$ 142 falls below $V_{THLD}$ 145. The time when $V_{TIA}$ 142 falls below $V_{THLD}$ 145 may be determined by a separate comparator, or may be determined by the output of comparator module 174 without having the output latched like $V_{HIT}$. In another example, pulse width generator 201 generates a pulse having a duration that matches the time between a time when $V_{TIA}$ 142 rises above $V_{THLD}$ 145 and a time when $V_{TIA}$ 142 falls below $V_{THLD}$ 145. In one example, $V_{ENABLE}$ 177 is employed in lieu of pulse width generator 201, and $V_{ENABLE}$ 177 is provided as input to time to voltage converter 202. Time to voltage converter 202 generates a current ramp through a capacitor for the duration of the pulse. The voltage across the capacitor is indicative of the duration of the $V_{ENABLE}$ pulse.

In another aspect, a master controller is configured to generate a plurality of pulse command signals, each communicated to a different integrated LIDAR measurement device. Each return pulse receiver IC generates a corresponding pulse control signal based on the received pulse command signal.

Figure 8:
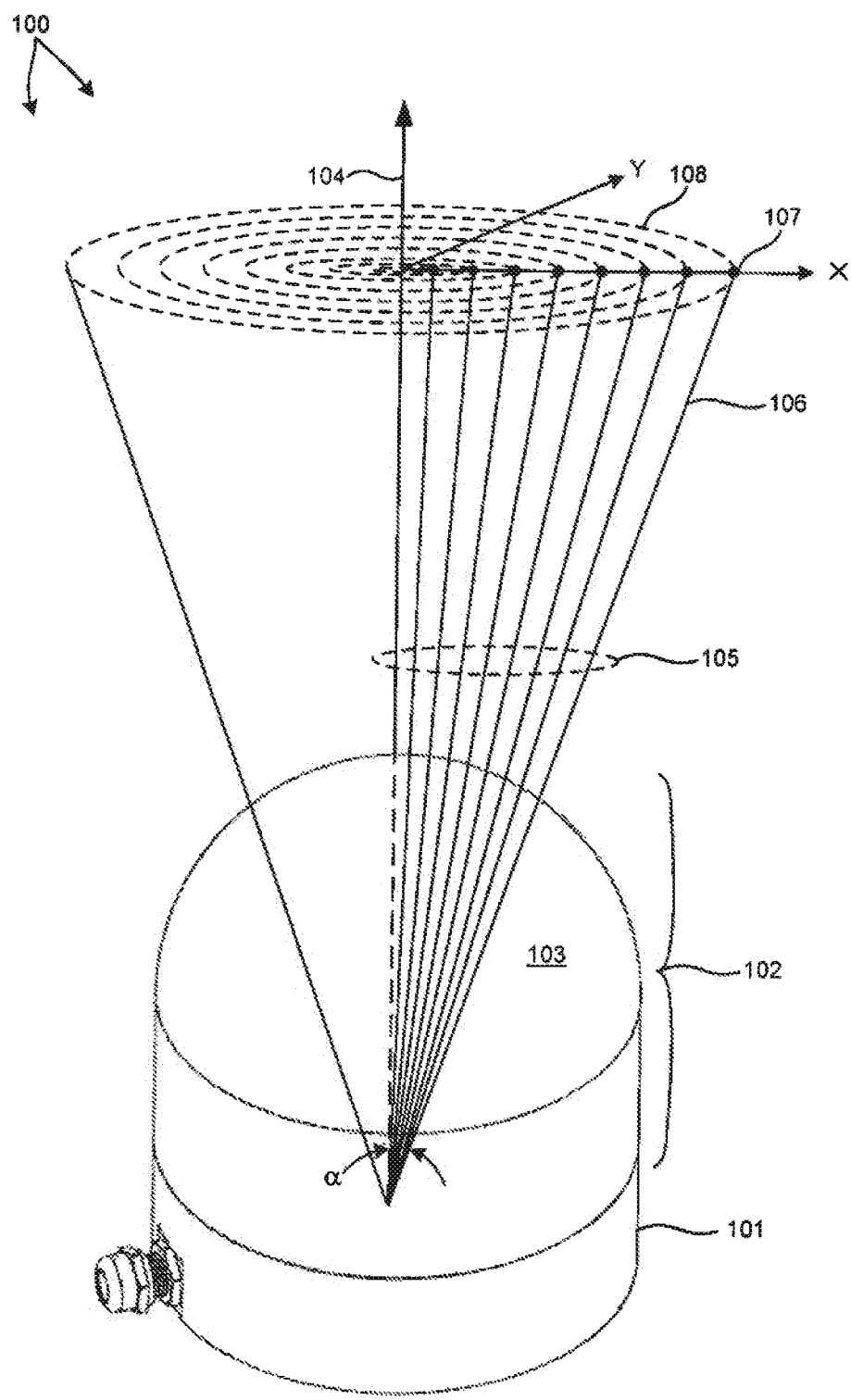
FIG. 8 is a diagram illustrative of an embodiment of a 3-D LIDAR system 100 in one exemplary operational scenario.
Figure 9:
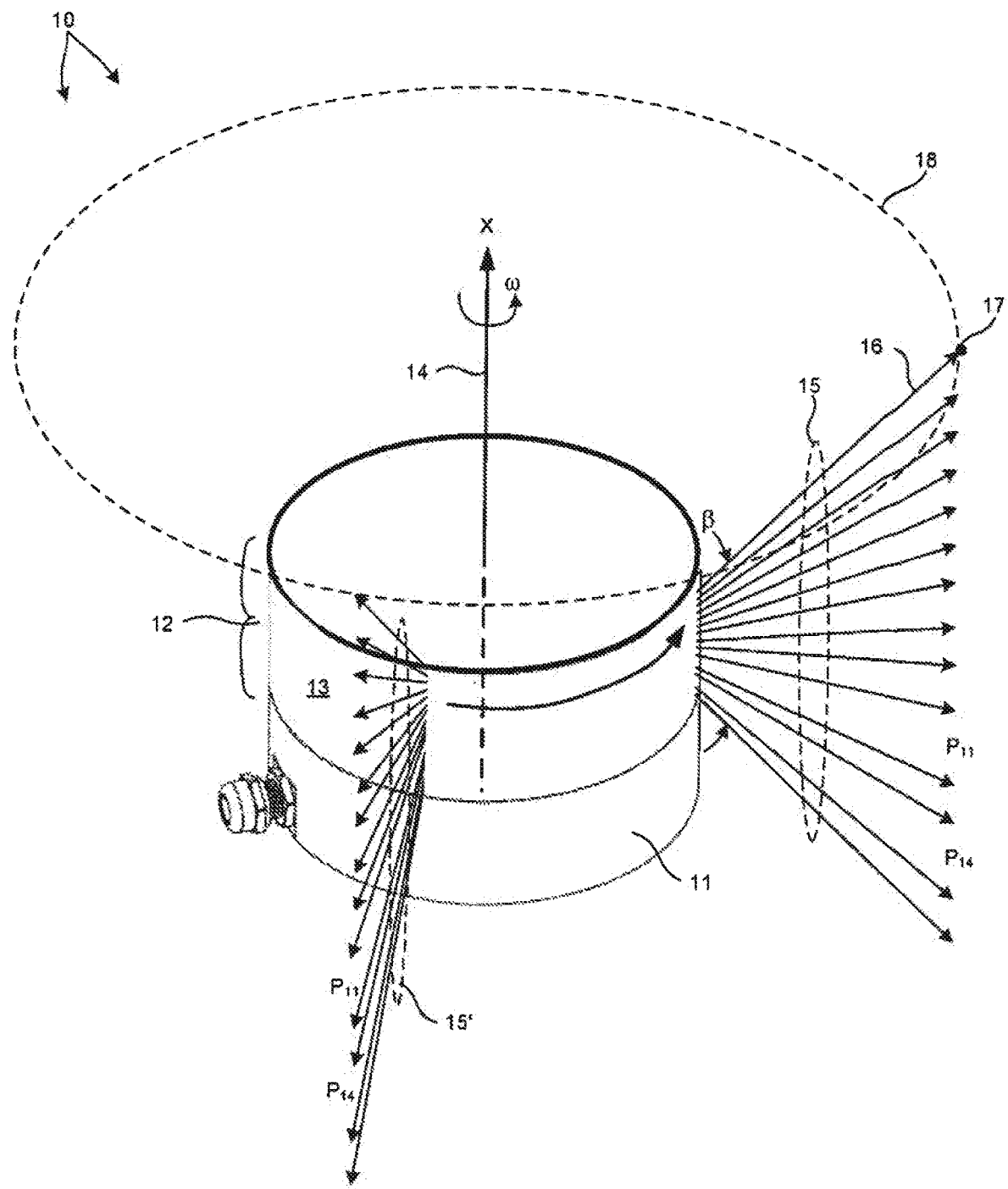
FIG. 9 is a diagram illustrative of another embodiment of a 3-D LIDAR system 10 in one exemplary operational scenario.
Figure 10:
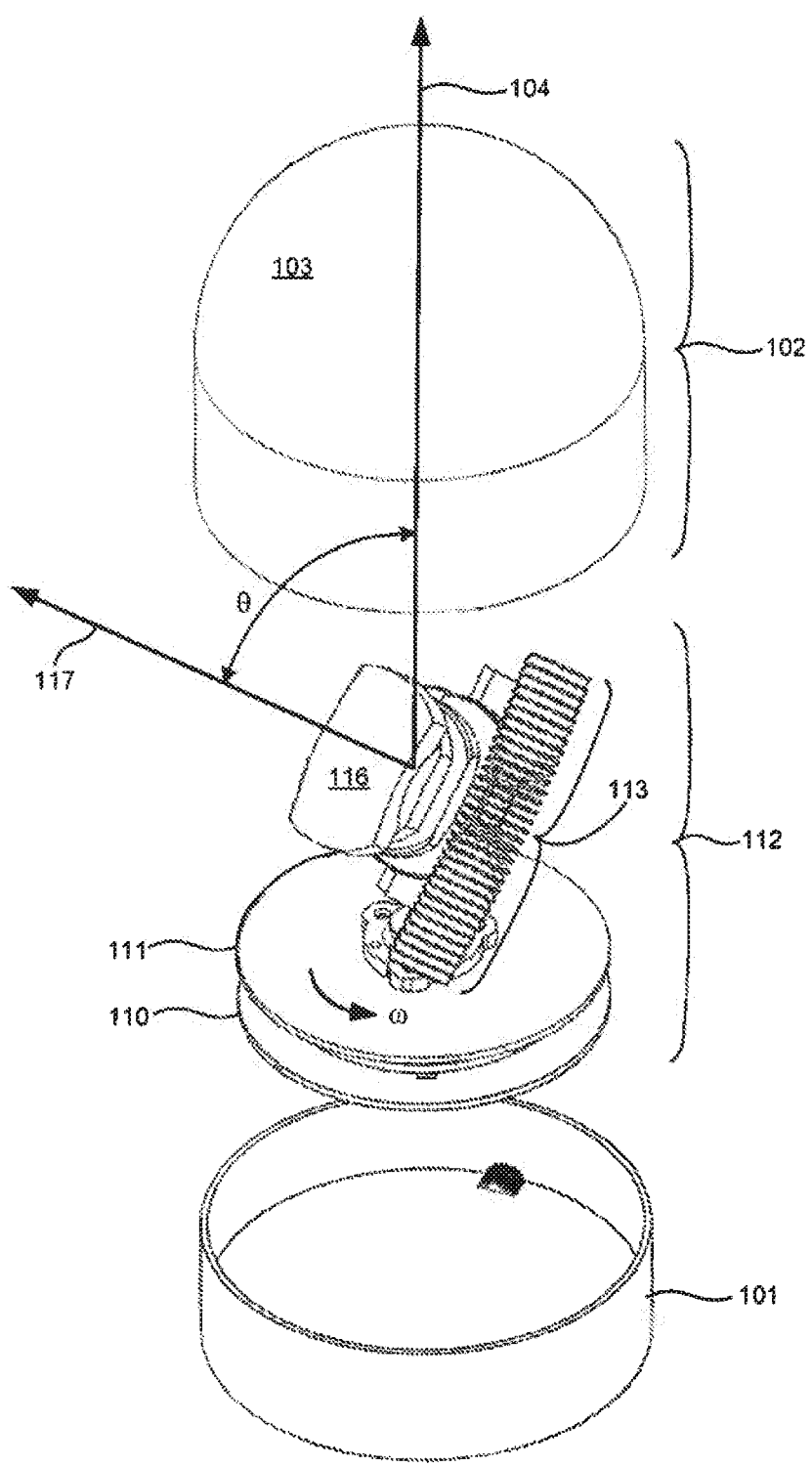
FIG. 10 depicts a diagram illustrative of an exploded view of 3-D LIDAR system 100 in one exemplary embodiment.

FIGS. 8-10 depict 3-D LIDAR systems that include multiple integrated LIDAR measurement devices. In some embodiments, a delay time is set between the firing of each integrated LIDAR measurement device. In some examples, the delay time is greater than the time of flight of the measurement pulse sequence to and from an object located at the maximum range of the LIDAR device. In this manner, there is no cross-talk among any of the integrated LIDAR measurement devices. In some other examples, a measurement pulse is emitted from one integrated LIDAR measurement device before a measurement pulse emitted from another integrated LIDAR measurement device has had time to return to the LIDAR device. In these embodiments, care is taken to ensure that there is sufficient spatial separation between the areas of the surrounding environment interrogated by each beam to avoid cross-talk.

FIG. 8 is a diagram illustrative of an embodiment of a 3-D LIDAR system 100 in one exemplary operational scenario. 3-LIDAR system 100 includes a lower housing 101 and an upper housing 102 that includes a domed shell element 103 constructed from a material that is transparent to infrared light (e.g., light having a wavelength within the spectral range of 700 to 1,700 nanometers). In one example, domed shell element 103 is transparent to light having a wavelengths centered at 905 nanometers.

As depicted in FIG. 8, a plurality of beams of light 105 are emitted from 3-D LIDAR system 100 through domed shell element 103 over an angular range, α, measured from a central axis 104. In the embodiment depicted in FIG. 8, each beam of light is projected onto a plane defined by the x and y axes at a plurality of different locations spaced apart from one another. For example, beam 106 is projected onto the xy plane at location 107.

In the embodiment depicted in FIG. 8, 3-D LIDAR system 100 is configured to scan each of the plurality of beams of light 105 about central axis 104. Each beam of light projected onto the xy plane traces a circular pattern centered about the intersection point of the central axis 104 and the xy plane. For example, over time, beam 106 projected onto the xy plane traces out a circular trajectory 108 centered about central axis 104.

FIG. 9 is a diagram illustrative of another embodiment of a 3-D LIDAR system 10 in one exemplary operational scenario. 3-D LIDAR system 10 includes a lower housing 11 and an upper housing 12 that includes a cylindrical shell element 13 constructed from a material that is transparent to infrared light (e.g., light having a wavelength within the spectral range of 700 to 1,700 nanometers). In one example, cylindrical shell element 13 is transparent to light having a wavelengths centered at 905 nanometers.

As depicted in FIG. 9, a plurality of beams of light 15 are emitted from 3-D LIDAR system 10 through cylindrical shell element 13 over an angular range, in the embodiment depicted in FIG. 9 the chief ray of each beam of light is illustrated. Each beam of light is projected outward into the surrounding environment in a plurality of different directions. For example, beam 16 is projected onto location 17 in the surrounding environment. In some embodiments, each beam of light emitted from system 10 diverges slightly. In one example, a beam of light emitted from system 10 illuminates a spot size of 20 centimeters in diameter at a distance of 100 meters from system 10. In this manner, each beam of illumination light is a cone of illumination light emitted from system 10.

In the embodiment depicted in FIG. 9, 3-D LIDAR system 10 is configured to scan each of the plurality of beams of light 15 about central axis 14. For purposes of illustration, beams of light 15 are illustrated in one angular orientation relative to a non-rotating coordinate frame of 3-D LIDAR system 10 and beams of light 15' are illustrated in another angular orientation relative to the non-rotating coordinate frame. As the beams of light 15 rotate about central axis 14, each beam of light projected into the surrounding environment (e.g., each cone of illumination light associated with each beam) illuminates a volume of the environment corresponding the cone shaped illumination beam as it is swept around central axis 14.

FIG. 10 depicts an exploded view of 3-D LIDAR system 100 in one exemplary embodiment. 3-D LIDAR system 100 further includes a light emission/collection engine 112 that rotates about central axis 104. In the embodiment depicted in FIG. 10, a central optical axis 117 of light emission/collection engine 112 is tilted at an angle, θ, with respect to central axis 104. As depicted in FIG. 10, 3-D LIDAR system 100 includes a stationary electronics board 110 mounted in a fixed position with respect to lower housing 101. Rotating electronics board 111 is disposed above stationary electronics board 110 and is configured to rotate with respect to stationary electronics board 110 at a predetermined rotational velocity (e.g., more than 200 revolutions per minute). Electrical power signals and electronic signals are communicated between stationary electronics board 110 and rotating electronics board 111 over one or more transformer, capacitive, or optical elements, resulting in a contactless transmission of these signals. Light emission/collection engine 112 is fixedly positioned with respect to the rotating electronics board 111, and thus rotates about central axis 104 at the predetermined angular velocity, ω.

As depicted in FIG. 10, light emission/collection engine 112 includes an array of integrated LIDAR measurement devices 113. In one aspect, each integrated LIDAR measurement device includes a light emitting element, a light detecting element, and associated control and signal conditioning electronics integrated onto a common substrate (e.g., printed circuit board or other electrical circuit board).

Figure 11:
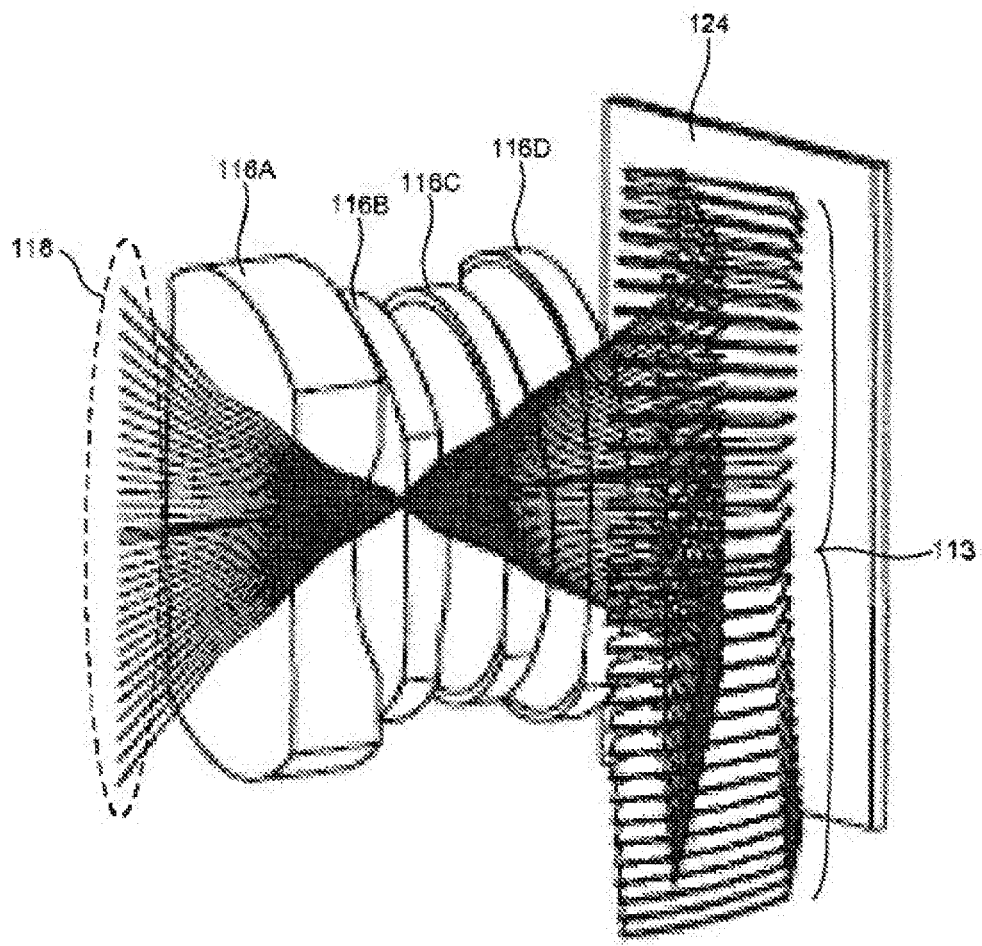
FIG. 11 depicts a view of optical elements 116 in greater detail.

Light emitted from each integrated LIDAR measurement device passes through a series of optical elements 116 that collimate the emitted light to generate a beam of illumination light projected from the 3-D LIDAR system into the environment. In this manner, an array of beams of light 105, each emitted from a different LIDAR measurement device are emitted from 3-D LIDAR system 100 as depicted in FIG. 11. In general, any number of LIDAR measurement devices can be arranged to simultaneously emit any number of light beams from 3-D LIDAR system 100. Light reflected from an object in the environment due to its illumination by a particular LIDAR measurement device is collected by optical elements 116. The collected light passes through optical elements 116 where it is focused onto the detecting element of the same, particular LIDAR measurement device. In this manner, collected light associated with the illumination of different portions of the environment by illumination generated by different LIDAR measurement devices is separately focused onto the detector of each corresponding LIDAR measurement device.

FIG. 11 depicts a view of optical elements 116 in greater detail. As depicted in FIG. 11, optical elements 116 include four lens elements 116A-D arranged to focus collected light 118 onto each detector of the array of integrated LIDAR measurement devices 113. In the embodiment depicted in FIG. 11, light passing through optics 116 is reflected from mirror 124 and is directed onto each detector of the array of integrated LIDAR measurement devices 113. In some embodiments, one or more of the optical elements 116 is constructed from one or more materials that absorb light outside of a predetermined wavelength range. The predetermined wavelength range includes the wavelengths of light emitted by the array of integrated LIDAR measurement devices 113. In one example, one or more of the lens elements are constructed from a plastic material that includes a colorant additive to absorb light having wavelengths less than infrared light generated by each of the array of integrated LIDAR measurement devices 113. In one example, the colorant is Epolight 7276A available from Aako BV (The Netherlands). In general, any number of different colorants can be added to any of the plastic lens elements of optics 116 to filter out undesired spectra.

Figure 12:
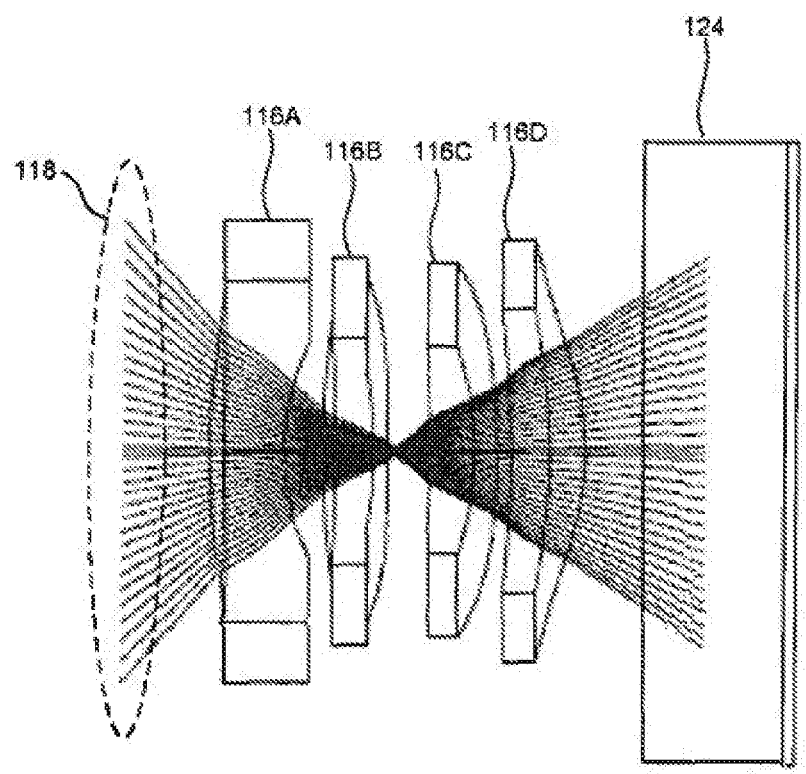
FIG. 12 depicts a cutaway view of optics 116 to illustrate the shaping of each beam of collected light 118.

FIG. 12 depicts a cutaway view of optics 116 to illustrate the shaping of each beam of collected light 118.

In this manner, a LIDAR system, such as 3-D LIDAR system 10 depicted in FIG. 9, and system 100, depicted in FIG. 8, includes a plurality of integrated LIDAR measurement devices each emitting a pulsed beam of illumination light from the LIDAR device into the surrounding environment and measuring return light reflected from objects in the surrounding environment.

In some embodiments, such as the embodiments described with reference to FIG. 8 and FIG. 9, an array of integrated LIDAR measurement devices is mounted to a rotating frame of the LIDAR device. This rotating frame rotates with respect to a base frame of the LIDAR device. However, in general, an array of integrated LIDAR measurement devices may be movable in any suitable manner (e.g., gimbal, pan/tilt, etc.) or fixed with respect to a base frame of the LIDAR device.

In some other embodiments, each integrated LIDAR measurement device includes a beam directing element (e.g., a scanning mirror, MEMS mirror etc.) that scans the illumination beam generated by the integrated LIDAR measurement device.

In some other embodiments, two or more integrated LIDAR measurement devices each emit a beam of illumination light toward a scanning mirror device (e.g., MEMS mirror) that reflects the beams into the surrounding environment in different directions.

In a further aspect, one or more integrated LIDAR measurement devices are in optical communication with an optical phase modulation device that directs the illumination beam(s) generated by the one or more integrated LIDAR measurement devices in different directions. The optical phase modulation device is an active device that receives a control signal that causes the optical phase modulation device to change state and thus change the direction of light diffracted from the optical phase modulation device. In this manner, the illumination beam(s) generated by the one or more integrated LIDAR devices are scanned through a number of different orientations and effectively interrogate the surrounding 3-D environment under measurement. The diffracted beams projected into the surrounding environment interact with objects in the environment. Each respective integrated LIDAR measurement device measures the distance between the LIDAR measurement system and the detected object based on return light collected from the object. The optical phase modulation device is disposed in the optical path between the integrated LIDAR measurement device and an object under measurement in the surrounding environment. Thus, both illumination light and corresponding return light pass through the optical phase modulation device.

Figure 13:
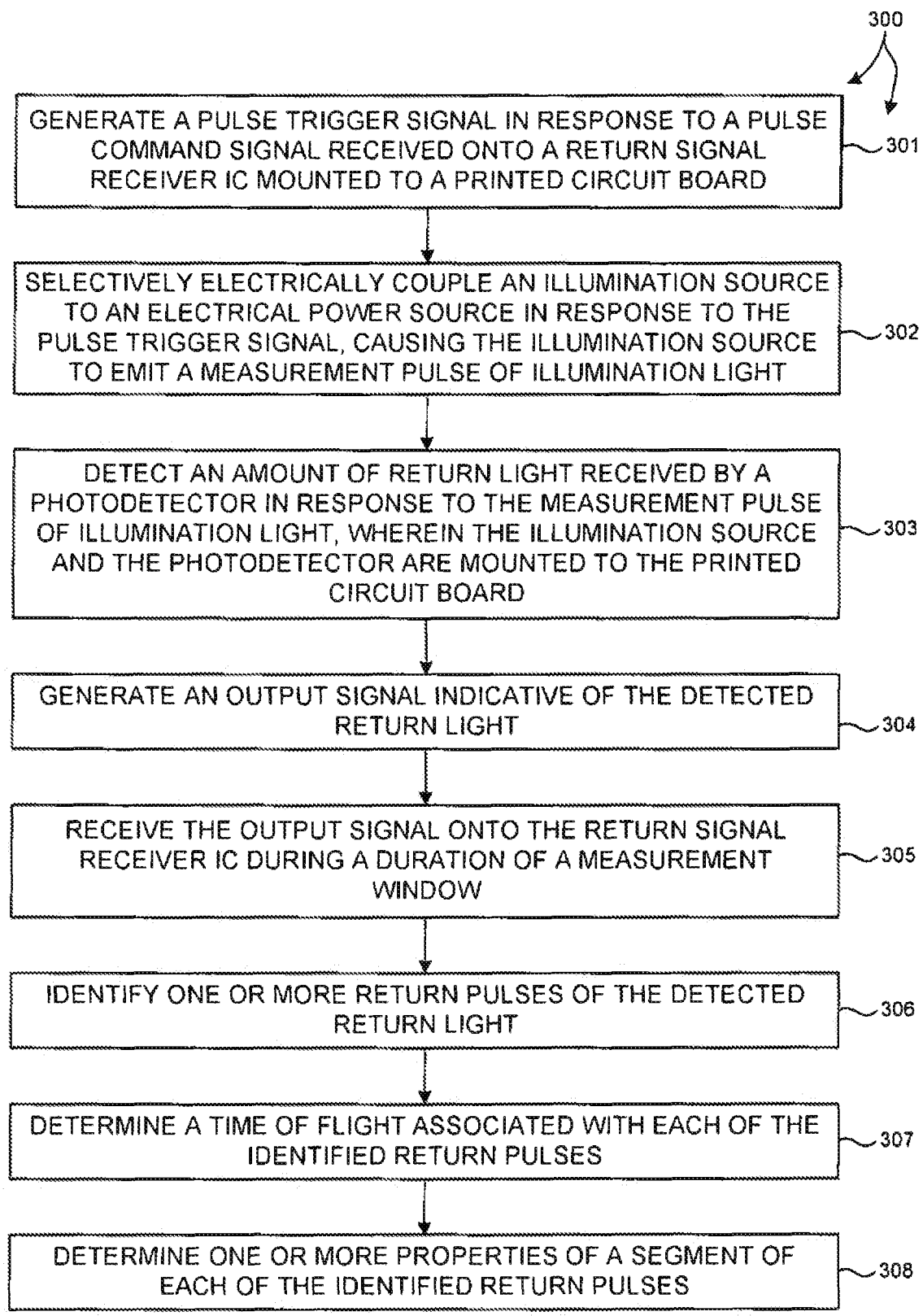
FIG. 13 depicts a flowchart illustrative of a method 300 of performing a LIDAR measurement by an integrated LIDAR measurement device in at least one novel aspect.

FIG. 13 illustrates a flowchart of a method 300 suitable for implementation by an integrated LIDAR measurement device as described herein. In some embodiments, integrated LIDAR measurement device 130 is operable in accordance with method 300 illustrated in FIG. 13. However, in general, the execution of method 300 is not limited to the embodiments of integrated LIDAR measurement device 130 described with reference to FIG. 1. These illustrations and corresponding explanation are provided by way of example as many other embodiments and operational examples may be contemplated.

In block 301, a pulse trigger signal is generated in response to a pulse command signal received onto a return signal receiver IC mounted to a printed circuit board.

In block 302, an illumination source is selectively electrically coupled to an electrical power source in response to the pulse trigger signal, causing the illumination source to emit a measurement pulse of illumination light.

In block 303, an amount of return light received by a photodetector is detected in response to the measurement pulse of illumination light. The illumination source and the photodetector are mounted to the printed circuit board.

In block 304, an output signal indicative of the detected return light is generated.

In block 305, the output signal is received onto the return signal receiver IC during a duration of a measurement window.

In block 306, one or more return pukes of the detected return light are identified.

In block 307, a time of flight associated with each of the identified return pulses is determined.

In block 308, one or more properties of a segment of each of the identified return pukes is determined.

A computing system as described herein may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions implementing methods such as those described herein may be transmitted over a transmission medium such as a wire, cable or wireless transmission link. Program instructions are stored in a computer readable medium. Exemplary computer-readable media include read-only memory, a random access memory, a magnetic or optical disk, or a magnetic tape.

In general, any electrical power supply described herein may be configured to supply electrical power specified as voltage or current. Hence, any electrical power source described herein as a voltage source or a current source may be contemplated as an equivalent current source or voltage source, respectively. Similarly, any electrical signal described herein may be specified as a voltage signal or a current signal. Hence, any electrical signal described herein as a voltage signal or a current signal may be contemplated as an equivalent current signal or voltage signal, respectively.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An integrated LIDAR measurement device, comprising:
   a printed circuit board having an illumination driver mounted thereto; and
   a return signal receiver mounted to the printed circuit board,
   wherein the return signal receiver is configured to, in response to receiving a command signal, generate a trigger signal and communicate the trigger signal to the illumination driver;
   wherein the return signal receiver is configured to determine a time of flight associated with each of one or more return light signals.

2. The integrated LIDAR measurement system of claim 1, further comprising
   an illumination source mounted to the printed circuit board; and
   a photodetector mounted to a substrate, the photodetector configured to detect an amount of return light received by the photodetector in response to a measurement beam of illumination light and generate an output signal indicative of the detected amount of return light;
   wherein the illumination driver is configured to selectively couple the illumination source to an electrical power source in response to the trigger signal, to cause the illumination source to emit the measurement beam of illumination Ii alit.

3. The integrated LIDAR measurement device of claim 2, wherein the return signal receiver includes a return signal analysis module, wherein the return signal analysis module comprises:
   a constant fraction discriminator module having a first input node, a second input node, and an output node, wherein the output signal is received on the first input node, and wherein the constant fraction discriminator module is configured to switch a hit signal at the output node to a different value when the output signal exceeds a threshold voltage value on the second input node.

4. The integrated LIDAR measurement device of claim 3, wherein the return signal analysis module further comprises:
   a coarse timing module having a first input node coupled to the output node of the constant fraction discriminator, a second input node, and an output node, wherein the second input node of the coarse timing module is coupled to receive the trigger signal, and wherein the coarse timing module is configured to generate a digital value at the output node of the coarse timing module indicative of a time elapsed between a transition of the trigger signal and a transition of the hit signal.

5. The integrated LIDAR measurement device of claim 4, wherein the digital value is a count of a number of transitions of a digital clock signal that occur between the transition of the trigger signal and the transition of the hit signal.

6. The integrated LIDAR measurement device of claim 5, wherein the return signal analysis module further comprises:

a fine timing module having a first input node, a first output node, and a second output node, wherein the first input node of the fine timing module is coupled to receive the hit signal, wherein the fine timing module is configured to generate (i) a first electrical signal at the first output node of the fine timing module indicative of a time difference between the transition of the hit signal and a subsequent transition of the digital clock signal and (ii) a second electrical signal at the second output node of the fine timing module indicative of a time difference between the transition of the hit signal and a subsequent transition of an inverse of the digital clock signal.

7. The integrated LIDAR measurement device of claim 5, wherein the coarse timing module is configured to generate a metastability signal, wherein the metastability signal is the digital clock signal shifted by half of a period of the digital clock signal.

8. The integrated LIDAR measurement device of claim 7, further comprising:
a time of flight module configured to estimate a value of a time of flight of the measurement beam of illumination light based at least in part on the digital value indicative of the time elapsed between the transition of the trigger signal and the transition of the hit signal, the time difference between the transition of the hit signal and the subsequent transition of the digital clock signal, the time difference between the transition of the hit signal and the subsequent transition of the inverse of the digital clock signal, and the metastability signal.

9. The integrated LIDAR measurement device of claim 3, the return signal analysis module further comprising:
a pulse width detection module including:
a first input node coupled to receive the hit signal,
a second input node coupled to receive an enable signal, and
an output node, wherein the pulse width detection module is configured to generate an electrical signal at the output node of the pulse width detection module that is indicative of a time difference between a transition of the enable signal and a time when an amplitude of the hit signal falls below a threshold value.

10. The integrated LIDAR measurement device of claim 3, the return signal analysis module further comprising:
a return signal sample and hold module configured to generate an amplitude signal indicative of a peak amplitude of the output signal after the transition of the hit signal.

11. The integrated LIDAR measurement device of claim 10, wherein the return signal sample and hold module is further configured to generate a plurality of output signal samples each indicative of a respective amplitude of the output signal before or after the peak amplitude.

12. The integrated LIDAR measurement device of claim 11, wherein a number of output signal samples before or after the peak amplitude is programmable.

13. The integrated LIDAR measurement device of claim 2, wherein a first of the one or more return light signals is due to optical crosstalk between the illumination source and the photodetector, and wherein the time of flight associated with each subsequent return light signal of the one or more return light signals is determined with reference to the first return light signal.

14. The integrated LIDAR measurement device of claim 1, wherein a duration of a measurement window is approximately a time of flight of light from the LIDAR measurement device to a specified range of the LIDAR measurement device and back to the LIDAR measurement device.

15. A method comprising:
communicating, by a return signal receiver a trigger signal to an illumination driver mounted to a printed circuit board, the trigger signal configured to cause the illumination driver to selectively electrically couple an illumination source to an electrical power source, to cause the illumination source to emit a measurement beam of illumination light;
receiving, by the return signal receiver MCA during a duration of a measurement window, from a photodetector mounted to a substrate, an output signal indicative of a detected amount of return light received by the photodetector in response to the measurement beam of illumination light;
identifying, by the return signal receiver, one or more return light signals of the detected return light; and
determining, by the return signal receiver, a time of flight associated with each of the one or more return light signals.

16. The method of claim 15, further comprising:
generating a hit signal that switches to a different value when the output signal exceeds a threshold voltage value; and
generating a digital value indicative of a time elapsed between a transition of the trigger signal and a transition of the hit signal, wherein the digital value is a count of a number of transitions of a digital clock signal that occur between the transition of the trigger signal and the transition of the hit signal.

17. The method of claim 16, further comprising:
generating (i) a first electrical signal indicative of a time difference between the transition of the hit signal and a subsequent transition of the digital clock signal and (ii) a second electrical signal indicative of a time difference between the transition of the hit signal and a subsequent transition of an inverse of the digital clock signal; and
generating a metastability signal, wherein the metastability signal is the digital clock signal shifted by half of a period of the digital clock signal.

18. The method of claim 17, further comprising:
estimating a value of a time of flight of the measurement beam of illumination light based at least in part on the digital value indicative of the time elapsed between the transition of the trigger signal and the transition of the hit signal, the time difference between the transition of the hit signal and the subsequent transition of the digital clock signal, the time difference between the transition of the hit signal and the subsequent transition of the inverse of the digital clock signal, and the metastability signal.

19. The method of claim 16, further comprising:
generating an electrical signal indicative of a time difference between a transition of an enable signal and a time when an amplitude of the hit signal falls below a threshold value.

20. The method of claim 16, further comprising:
generating an amplitude signal indicative of a peak amplitude of the output signal after the transition of the hit signal.

21. The method of claim 20, further comprising:
generating a plurality of output signal samples each indicative of a respective amplitude of the output signal before or after the peak amplitude, wherein a number of output signal samples before or after the peak amplitude is programmable.

22. The method of claim 15, further comprising:
  receiving, by the return signal receiver mounted to the printed circuit board, a command signal; and
  generating, by the return signal receiver the trigger signal in response to receiving the command signal.

23. An integrated LIDAR measurement device, comprising:
  a photodetector mounted to a substrate, the photodetector configured to detect (i) a first amount of a measurement beam of illumination light due to crosstalk between an illumination source and the photodetector and (ii) a return light signal reflected from a location in a surrounding environment illuminated by a second amount of the measurement beam; and
  a return signal receiver mounted to a printed circuit board and configured to, in response to receiving a command signal, generate a trigger signal, and estimate a time between when the first amount of the measurement beam of illumination light due to the crosstalk is detected and when the return pulse of light signal is detected.

24. The integrated LIDAR measurement device of claim 23, further comprising:
  an illumination source mounted to the printed circuit board; and
  an illumination driver mounted to the printed circuit board, the illumination driver IC configured to selectively couple the illumination source to an electrical power source in response to the trigger signal, to cause the illumination source to emit the measurement beam of illumination light.

* * * * *